(12) United States Patent
Laron

(10) Patent No.: US 8,768,962 B2
(45) Date of Patent: Jul. 1, 2014

(54) REVISION CONTROL SYSTEM AND METHOD

(75) Inventor: Etamar Laron, Maggal (IL)

(73) Assignee: Daj Asparna Ltd., Maggal (IL)

( * ) Notice: Subject to any disclaimer, the term of this patent is extended or adjusted under 35 U.S.C. 154(b) by 46 days.

(21) Appl. No.: 13/516,180

(22) PCT Filed: Dec. 13, 2010

(86) PCT No.: PCT/IL2010/001049
§ 371 (c)(1),
(2), (4) Date: Jun. 14, 2012

(87) PCT Pub. No.: WO2011/073976
PCT Pub. Date: Jun. 23, 2011

(65) Prior Publication Data
US 2013/0173530 A1    Jul. 4, 2013

Related U.S. Application Data

(60) Provisional application No. 61/286,093, filed on Dec. 14, 2009.

(51) Int. Cl.
*G06F 17/30*    (2006.01)
(52) U.S. Cl.
USPC ........... 707/781; 707/758; 707/736; 707/722; 707/713; 707/706
(58) Field of Classification Search
CPC ................................................. G06F 17/30557
USPC .................. 707/706, 713, 722, 736, 758, 781
See application file for complete search history.

(56) References Cited

U.S. PATENT DOCUMENTS

| | | |
|---|---|---|
| 2002/0156975 A1 | 10/2002 | Staub et al. |
| 2004/0162871 A1 | 8/2004 | Pabla et al. |
| 2004/0260974 A1 | 12/2004 | Livshits |
| 2006/0265508 A1 | 11/2006 | Angel et al. |
| 2008/0040151 A1* | 2/2008 | Moore ............................ 705/2 |
| 2009/0172773 A1* | 7/2009 | Moore ............................ 726/1 |
| 2013/0104251 A1* | 4/2013 | Moore et al. .................... 726/30 |

* cited by examiner

*Primary Examiner* — Sana Al Hashemi
(74) *Attorney, Agent, or Firm* — Browdy and Neimark, PLLC

(57) ABSTRACT

There is provided a file revision-control system, method and apparatus configured for storing and managing a revision history log, and for enabling to track and manage, compare and retrieve revisions including, current-revisions stored on a designated reference area, past-revisions stored in a predefined storage area and also past-revisions which were previously on a reference area. According to certain embodiments of the invention, each revision of a file is represented by a revision entry in a revision history log, which can be stored and managed in a designated data-repository. A revision entry stores data corresponding to at least one revision, while the revisions themselves may be stored on a designated data-repository. A progression path refers to one or more revision entries which represent the progression of a file over time. In case that a revision is branched into more than one revisions, each such revision will constitute a different progression path.

28 Claims, 16 Drawing Sheets

REVISION CONTROL SYSTEM AND METHOD

FIELD OF THE INVENTION

This invention relates to the field of file-revision control and also to the field of file-revision control and file update in a file sharing environment.

BACKGROUND

Today there are many types of systems for enabling file-sharing between users. Often in such systems a single progression of revisions exists in respect of each file. Thus, while one user is connected to the system and is working on a file, located on a file-sharing server of the system, different methods can be implemented for preventing concurrent access to the file by other users (e.g. file locking). If other users work on a copy of the same file while being offline and a new revision of the file is created by each user, once the users reconnects to the system a conflict resolution process is executed where one revision is maintained and the other revisions are discarded.

Prior art references considered to be relevant as a background to the invention are listed below. Acknowledgement of the references herein is not to be inferred as meaning that these are in any way relevant to the patentability of the invention disclosed herein.

U.S. Pat. No. 6,938,042 by Aboulhosn et al. discloses a method and system for sharing files between a group of computer systems. The file sharing system allows a group of computer systems to be defined. The files shared by a group are associated with a group folder. A group folder is represented by a folder created by the file system of each member of the group. The folder at each member contains a file for each file that is shared by the group. The files in the folder of a member may be actual files stored at that member, which contains the content of the shared file, or virtual files identifying the actual file that is stored at another member. When a member accesses a virtual file, the file sharing system detects the access and requests that the file owner provide a copy of the file to the accessing member on a peer-to-peer basis. Whenever a shared file is modified, the file owner sends updated metadata for that file to the other members of the group.

US Patent application Publication No. 2008/0005188 by Li et al. discloses content synchronization in a file sharing environment. A node in a circle share maintains a version vector that represents that node's knowledge of file synchronization events. Version vector data may be transmitted between nodes of the circle share via a presence service in the form of short notification messages. The version vector data is compared to identify one or more nodes to be synchronized. A resource-aware overlay representing the circle share is computed, and is used to initiate communication to determine which of the available nodes with which to synchronize will provide the most synchronization value to other nodes in the circle share.

US Patent application publication No. 2008/0005195 by Li Jin, discloses a "mass file sharer" (MFS). The MFS provides a mass P2P file sharing protocol with optional on-demand file access across a P2P network. According to US2008/0005195 Unlike conventional P2P file sharing, the MFS simultaneously asynchronously shares large numbers of files, while providing optional on-demand (synchronous) access to shared files. According to US2008/0005195 The MFS uses a unique metadata structure in combination with an inter-peer file/folder version analysis and an inter-peer file/folder availability analysis to share complex directory structures that may include any number of folders, sub-folders, and files. Sharing may be asynchronous and/or synchronous. Specifically, file sharing is generally accomplished as an asynchronous distribution across the network. However, when a particular peer wants direct access particular files, an on-demand access mode is used to enable synchronous delivery of shared files. This combination of asynchronous and synchronous file distribution enables the MFS to support a number of applications, such as on-demand movie viewing, file/folder browsing, etc.

US Patent application Publication No. 2009/0172201, Sharon Carmel, discloses a method and system for enabling peer to peer synchronization between members of a synchronized network. A predefined synchronization reference area on each member of the network is provided. A common identifier associated with the synchronization network is provided to each member. Changes are detected on a member regarding a data item. A unique identifier of a synchronization module is obtained. A relative path to the data item within the predefined synchronization reference area is obtained. A unique value is calculated based upon a content of a version of the data item that is associated with the change. A log number counter is incremented. A log representing the data item and the chance is created. The log includes data regarding the type of change, the network identifier, the unique identifier of the synchronization module, the relative path, the unique value, and the log number.

U.S. Pat. No. 7,523,146 discloses an apparatus and method of synchronizing a datum between a plurality of stores is disclosed. A version history is associated with the datum in each store. The version history has one or more entries, and each entry has an identifier and a value. The identifier identifies a store that has modified the datum, and the value indicates a number of modifications to the datum made by the store. When synchronizing the datum between stores, the version histories of the datum are compared to determine whether one version history is subordinate to another version history. The datum in the store having the subordinate version history is then replaced with the datum having the dominant version history. When compared, a conflict resolution by a user is required if the version histories are not identical, if the version histories do not have all the same identifiers, and if one version history does not contain all of the identifiers with equal or greater values of those in the other version history.

SUMMARY

According to a first aspect of the invention there is provided a revision control system comprising: a revision engine associated with at least one data repository and operable to enable to define at least one reference area within a file-system implemented on the at least one data repository and comprising: a file-system monitor capable of communication with the file system to identify a modification event in respect of a file or folder within the file system; a revision manager responsive to the modification event for:

creating a new revision entry in a revision history log, the new revision entry corresponding to the modification event; identifying a relevant revision entry in the revision history log corresponding to a revision of the file or folder with respect to which the modification event was implemented; and linking the new revision entry with the relevant revision entry, thereby extending a progression path representing a progression of revisions of the file or folder.

The revision control system in accordance with the presently disclosed subject matter being further responsive to identifying that along a progression path associated with the relevant revision entry, a further revision entry exists which corresponds to a modification of a revision associated with the relevant revision entry, for extending a new progression path including the relevant revision entry and the new revision entry.

The revision control system in accordance with the presently disclosed subject matter, wherein each revision entry in the revision history log includes at least one data-element and wherein the revision engine is further operable to utilize the at least one data-element for locating within the revision history log, two or more revision entries with one or more identical data-elements; and indicate an association based on the one or more data-elements, between two or more revisions corresponding to the two or more revision-entries, respectively.

The revision control system in accordance with the presently disclosed subject matter wherein the at least one data-element is a content hash-code calculated from at least part of the content of a corresponding revision and the association indicates that the at least part of the content of the two or more revision is identical.

The revision control system in accordance with the presently disclosed subject matter wherein the at least one data-elements includes one or more metadata elements characterizing a corresponding revision and wherein the association indicates that one or more metadata element of the two or more revisions is identical.

The revision control system in accordance with the presently disclosed subject matter wherein the revision engine is further operable to determine whether the two or more revision entries are located on the same progression path.

The revision control system in accordance with the presently disclosed subject matter wherein the revision engine is further operable to handle a revert-command executed in respect of a first revision; the revert-command including at least an identifier for identifying a second revision entry corresponding to a second revision, and one or more types of data elements characterizing the revision; the second revision entry is located within the same progression path of a first revision entry associated with the first revision; the revision manager being responsive to the revert-command for: replacing one or more data elements, corresponding to said one or more type of data elements, in the first revision with corresponding data elements of the second revision, thereby creating a new revision; creating a new revision entry in respect of the new revision; and storing the new revision entry in the revision history log.

The revision control system in accordance with the presently disclosed subject matter wherein the revision manager is configured to link the new revision entry to the second revision entry corresponding to the second revision, thereby extending a new progression path including the second revision entry and the new revision entry.

The revision control system in accordance with the presently disclosed subject matter wherein the one or more data elements are the contents of the second revision.

The revision control system in accordance with the presently disclosed subject matter wherein the revision engine is further operable to handle a copy-command executed in respect of a first revision; the copy-command including at least an identifier for identifying a second revision entry corresponding to a second revision, and one or more types of data elements characterizing the revision; the second revision entry is located on a different progression path than a first revision entry associated with the first revision; the revision manager being responsive to the copy-command for: replacing one or more data elements, corresponding to said one or more types of data elements, in the first revision with corresponding data elements of the second revision, thereby creating a new revision; creating a new revision entry in respect of the new revision; and linking the new revision entry to the revision history log.

The revision control system in accordance with the presently disclosed subject matter wherein the revision manager is configured to link the new revision entry to the second revision entry corresponding to the second revision, thereby extending a new progression path including the second revision entry and the new revision entry.

The revision control system in accordance with the presently disclosed subject matter wherein the revision engine is further operable to handle a merge-command executed in respect of a two or more progression paths in the revision history log; the merge-command includes at least information identifying two or more progression paths within the revision history log and information identifying a merged revision-entry; the revision manager being responsive to the merge-command for: converging the two or more progression paths into the merged revision-entry and to have the two or more progression paths continue in a single progression path.

The revision control system in accordance with the presently disclosed subject matter wherein each revision entry in the revision history log is uniquely identified by a universally unique identifier (UUID).

The revision control system in accordance with the presently disclosed subject matter wherein each revision entry is the revision history log is uniquely identified by a combination of two or more metadata elements computing to a unique value.

The revision control system in accordance with the presently disclosed subject matter wherein a new revision is created in the reference area in response to the modification event. The revision control system in accordance with the presently disclosed subject matter wherein the modification event is triggered in response to a new file created on the reference area.

The revision control system in accordance with the presently disclosed subject matter wherein the modification event is triggered by one or more of a list consisting of: deleting part or all of a content of a revision; changing one or more metadata element in respect of a revision; renaming a revision; moving a revision to a new location; and deleting a revision.

The revision control system according to a further aspect of the present invention wherein the revision engine is adapted to communicate with a second revision engine associated with a second data repository; the second data repository is defined with a second reference area; the revision engine being operable to receive from the second revision engine an indication with respect to a first revision entry in a second revision history log, the second revision history log associated with the second revision engine; the first revision entry representing a revision, generated in response to a modification event in the second reference area; the revision manager being responsive to the indication with respect to the first revision entry for: identifying whether the first revision entry is missing from the revision history log associated with the revision engine, and in case it is, creating a second revision entry, the second revision entry corresponding to the revision; and linking the second revision entry to a third revision entry within the revision history log, thereby extending a progression path representing a progression of revisions generated in response to modification events in the first reference area and in the second reference area.

The revision control system according to the further aspect of the present invention, wherein the revision manager is further responsive for identifying that along a progression path associated with the third revision entry, a further revision entry exists which corresponds to a modification of a revision associated with the third revision entry, and wherein the linking of the second revision entry extends a new progression path including the third revision entry and the second revision entry.

The revision control system according to the further aspect of the present invention wherein the revision engine is operable to request, from the second revision engine, the revision represented by the first revision entry.

The revision control system according to the further aspect of the present invention wherein the revision is retrieved from the second reference area.

The revision control system according to the further aspect of the present invention wherein the reference area is within a file-system implemented on the second data repository.

The revision control system according to the further aspect of the present invention wherein the indication includes data identifying the third revision entry.

The revision control system according to the further aspect of the present invention wherein in case the revision manager fails to identify the third revision entry in the revision history log, the revision engine is operable to: create a query requesting for missing information in respect of at least one additional revision entry in a progression path of the first revision entry and the second revision entry; send the query to at least the second revision engine; and receive a new indication from the at least the second revision engine indicative of the at least one additional revision entry.

The revision control system according to the further aspect of the present invention further comprising a network control unit operable to enable communication with the second revision engine.

The revision control system according to the further aspect of the present invention wherein the revision engine and the second revision engine are connected via a direct connection. The revision control system in accordance with the presently disclosed subject matter wherein the revision engine and the second revision engine are connected via peer-to-peer network.

According to a second aspect of the present invention there is provided a revision control system comprising: a first revision engine associated with a first storage area and adapted to receive from a second revision engine associated with a second storage area an indication with respect to a first revision entry in a second revision history log, the second revision history log associated with the second revision engine; the first revision entry representing a first revision generated in response to a modification event in the second storage area; the first revision engine comprising: a revisions manger adapted to manage a first revision history log for storing at least one revision entry in respect of revision generated in response to modification events in the first storage area; the revision manger being responsive to the indication with respect to the first revision entry for: identifying whether the first revision entry is missing from the first revision history log associated with the first revision engine, and in case it is, creating a second revision entry, the second revision entry corresponding to the first revision; and linking the second revision entry to a third revision entry within the first revision history log, thereby extending a progression path representing a progression of revisions within the first and the second storage areas; wherein the revision manager is further responsive for identifying that along a progression path associated with the third revision entry, a further revision entry exists which corresponds to a modification of a revision associated with the third revision entry, and wherein the linking of the second revision entry extends a new progression path including the third revision entry and the second revision entry.

The revision control system in accordance with the presently disclosed subject matter wherein the indication includes information identifying the third revision entry. The revision control system in accordance with the presently disclosed subject matter wherein the third revision entry represents a previous revision of the first revision.

The revision control system in accordance with the presently disclosed subject matter wherein the first revision engine is operable to request, from the second revision engine, the first revision represented by the first revision entry, and store the revision in a data repository associated with the first revision engine.

The revision control system in accordance with the presently disclosed subject matter wherein the first revision is retrieved from a reference area defined in a file system in the second storage area.

The revision control system in accordance with the presently disclosed subject matter further comprising a network revision control unit, and wherein in case the revision manager fails to identify the third revision entry in the first revision history log, the first revision engine operates the network revision control unit to create a query requesting for missing information in respect of at least one additional revision entry in a progression path of the first revision entry in the second revision history log, and send the query to at least the second revision engine.

The revision control system in accordance with the presently disclosed subject matter wherein the indication includes information in respect of a plurality of revision entries in the second revision history log.

The revision control system in accordance with the presently disclosed subject matter wherein said first storage area is defined within a file-system implemented on a data-repository associated with said first revision engine.

The revision control system in accordance with the presently disclosed subject matter wherein the indication is received in response to a pull type update query generated by the revision manager and transmitted to the second revision engine.

The revision control system in accordance with the presently disclosed subject matter wherein the indication is a push type update message generated by the second revision engine.

The revision control system in accordance with the presently disclosed subject matter, further comprising a network control unit operable to enable communication with at least the second revision engine.

The revision control system in accordance with the presently disclosed subject matter being a member in a channel and is operable to connect to a presence service for obtaining a list of one or more other members in the channel.

The revision control system in accordance with the presently disclosed subject matter wherein the first revision engine and second revision engine are connected via a direct connection. The revision control system in accordance with the presently disclosed subject matter wherein the first revision engine and the second revision engine are connected via a peer-to-peer network.

The revision control system in accordance with the presently disclosed subject matter further comprising a channel overlay manager operable to manage the a peer-to-peer network overlay of the peer to peer network in a distributed hash table architecture.

The revision control system in accordance with the presently disclosed subject matter wherein each revision entry in the first revision history log includes at least one data-element and wherein the first revision engine is further operable to utilize the at least one data-element for locating within the first revision history log, two or more revision entries with one or more identical data-elements; and indicate an association based on the one or more data-elements between two or more revisions corresponding to the two or more revision-entries, respectively.

The revision control system in accordance with the presently disclosed subject matter wherein the at least one data-element is a content hash-code calculated from at least part of the content of a corresponding revision and the association indicates that the at least part of the content of the two or more revision is identical.

The revision control system in accordance with the presently disclosed subject matter wherein the at least one data-elements includes one or more metadata elements characterizing a corresponding revision and wherein the association indicates that one or more metadata element of the two or more revisions is identical.

The revision control system in accordance with the presently disclosed subject matter wherein the first revision engine is further operable to handle a revert-command executed in respect of a first revision; the revert-command including at least an identifier for identifying a second revision entry corresponding to a second revision, and one or more types of data elements characterizing the revision; the second revision entry is located within the same progression path of a first revision entry associated with the first revision; the revision manager being responsive to the revert-command for: replacing one or more data elements, corresponding to said one or more types of data elements, in respect of the first revision with corresponding data elements of the second revision, thereby creating a new revision; creating a new revision entry in respect of the new revision; and linking the new revision entry to the first revision history log.

The revision control system in accordance with the presently disclosed subject matter wherein the revision manager is configured to link the new revision entry to the second revision entry corresponding to the second revision entry, thereby creating a new progression path including the second revision entry and the new revision entry.

The revision control system in accordance with the presently disclosed subject matter wherein the one or more data elements is the contents of the second revision.

The revision control system in accordance with the presently disclosed subject matter wherein the first revision engine is further operable to handle a copy-command executed in respect of a first revision; the copy-command including at least an identifier for identifying a second revision entry corresponding to a second revision, and one or more types of data elements characterizing the revision; the second revision entry is located on a different progression path than a first revision entry associated with the first revision; the revision manager being responsive to the copy-command for: replacing one or more data elements, corresponding to said one or more types of data elements, in the first revision with corresponding data elements of the second revision, thereby creating a new revision; creating a new revision entry in respect of the new revision; and linking the new revision entry to the first revision history log.

The revision control system in accordance with the presently disclosed subject matter wherein the revision manager is configured to link the new revision entry to the second revision entry corresponding to the second revision, thereby creating a new progression path including the second revision entry and the new revision entry.

The revision control system in accordance with the presently disclosed subject matter wherein the first revision engine is further operable to handle a merge-command executed in respect of a two or more progression paths in the first revision history log; the merge-command includes at least information identifying two or more progression paths within the first revision history log and information identifying a merged revision-entry; the revision manager being responsive to the merge-command for: converging the two or more progression paths into the merged revision-entry and to have the two or more progression paths all continue in a single progression path.

The revision control system in accordance with the presently disclosed subject matter wherein each revision entry in the first revision history log is uniquely identified by a universally unique identifier (UUID).

The revision control system in accordance with the presently disclosed subject matter wherein each revision entry is the first revision history log is uniquely identified by a combination of metadata elements computing to a unique value.

According to a third aspect of the present invention there is provided a method of operating a revision control system comprising a revision engine, the method comprising: defining, at least one reference area within a file-system, the file system being implemented on a data repository; communicating with the file-system and identifying a modification event in respect of a file or folder within the file system; in response to the modification event: creating a new revision entry in a revision history log, the new revision entry corresponding to the modification event; identifying a relevant revision entry in the revision history log corresponding to a revision of the file or folder with respect to which the modification event was implemented; and linking the new revision entry with the relevant revision entry, thereby extending a progression path representing a progression of revisions of the file or folder.

The method in accordance with the presently disclosed subject matter, further comprising: identifying that along a progression path associated with the relevant revision entry, a further revision entry exists which corresponds to a modification of a revision associated with the relevant revision entry; and extending a new progression path including the relevant revision entry and the new revision entry.

The method in accordance with the presently disclosed subject matter, wherein each revision entry in the revision history log includes at least one data-element, the method further comprising: utilizing the at least one data-element for locating within the revision history log, two or more revision entries with one or more identical data-elements; and indicating an association based on the one or more data-elements, between two or more revisions corresponding to the two or more revision-entries, respectively.

The method in accordance with the presently disclosed subject matter, wherein the at least one data-element is a content hash-code calculated from at least part of the content of a corresponding revision and the association indicates that the at least part of the content of the two or more revision is identical.

The method in accordance with the presently disclosed subject matter, wherein the at least one data-elements includes one or more metadata elements characterizing a corresponding revision and wherein the association indicates that one or more metadata element of the two or more revisions is identical.

The method in accordance with the presently disclosed subject matter, further comprising: determining whether the two or more revision entries are located on the same progression path.

The method in accordance with the presently disclosed subject matter, further comprising: handling a revert-command executed in respect of a first revision; the revert-command including at least an identifier for identifying a second revision entry corresponding to a second revision, and one or more types of data elements characterizing the revision; the second revision entry is located within the same progression path of a first revision entry associated with the first revision; the handling comprising: replacing one or more data elements, corresponding to said one or more types of data elements, in respect of the first revision with corresponding data elements of the second revision, thereby creating a new revision; creating a new revision entry in respect of the new revision; and storing the new revision entry in the revision history log.

The method in accordance with the presently disclosed subject matter, wherein further comprising: linking the new revision entry to the second revision entry corresponding to the second revision, thereby extending a new progression path including the second revision entry and the new revision entry.

The method in accordance with the presently disclosed subject matter, wherein the one or more data elements are the contents of the second revision.

The method in accordance with the presently disclosed subject matter, further comprising: handling a copy-command executed in respect of a first revision; the copy-command including at least an identifier for identifying a second revision entry corresponding to a second revision, and one or more types of data elements characterizing the revision; the second revision entry is located on a different progression path than a first revision entry associated with the first revision; the handling comprising: replacing one or more data elements, corresponding to said one or more types of data elements, in the first revision with corresponding data elements of the second revision, thereby creating a new revision; creating a new revision entry in respect of the new revision; and linking the new revision entry to the revision history log.

The method in accordance with the presently disclosed subject matter, further comprising: linking the new revision entry to the second revision entry corresponding to the second revision, thereby extending a new progression path including the second revision entry and the new revision entry.

The method in accordance with the presently disclosed subject matter, wherein further comprising: handling a merge-command executed in respect of a two or more progression paths in the revision history log; the merge-command includes at least information identifying two or more progression paths within the revision history log and information identifying a merged revision-entry; the handling comprising: converging the two or more progression paths into the merged revision-entry and to have the two or more progression paths continue in a single progression path.

The method in accordance with the presently disclosed subject matter, wherein each revision entry in the revision history log is uniquely identified by a universally unique identifier (UUID).

The method in accordance with the presently disclosed subject matter, wherein each revision entry is the revision history log is uniquely identified by a combination of two or more metadata elements computing to a unique value.

The method in accordance with the presently disclosed subject matter, wherein a new revision is created in the reference area in response to the modification event.

The method in accordance with the presently disclosed subject matter, wherein the modification event is triggered in response to a new file created on the reference area.

The method in accordance with the presently disclosed subject matter, wherein the modification event is triggered by one or more of a list consisting of: deleting part or all of a content of a revision; changing one or more metadata element in respect of a revision; renaming a revision; moving a revision to a new location; and deleting a revision.

The method in accordance with the presently disclosed subject matter, further comprising: enabling communication between the revision engine and a second revision engine associated with a second data repository; the second data repository is defined with a second reference area; receiving from the second revision engine an indication with respect to a first revision entry in a second revision history log, the second revision history log associated with the second revision engine; the indication including data in respect of a revision, generated in response to a modification event in the second reference area; in response to the indication with respect to the first revision entry: identifying whether the first revision entry is missing from the revision history log associated with the revision engine, and in case it is, creating a second revision entry, the second revision entry corresponding to the revision; and linking the second revision entry to a third revision entry within the revision history log, thereby extending a progression path representing a progression of revisions generated in response to modification events in the first reference area and in the second reference area.

The method in accordance with the presently disclosed subject matter, further comprising: identifying that along a progression path associated with the third revision entry, a further revision entry exists which corresponds to a modification of a revision associated with the third revision entry, and wherein the linking of the second revision entry extends a new progression path including the third revision entry and the second revision entry.

The method in accordance with the presently disclosed subject matter, further comprising: requesting a revision represented by the second revision entry from the second revision engine.

The method in accordance with the presently disclosed subject matter, wherein the reference area is within a filesystem implemented on the second data repository.

The method in accordance with the presently disclosed subject matter, wherein the indication includes data identifying the third revision entry.

The method in accordance with the presently disclosed subject matter, wherein in case the third revision entry is not identified in the revision history log, the method further comprising: creating a query requesting for missing information in respect of at least one additional revision entry in a progression path of the first revision entry and the second revision entry; sending the query to at least the second revision engine; and receiving a new indication from the at least the second revision engine indicative of the at least one additional revision entry.

The method in accordance with the presently disclosed subject matter, wherein the communication between the revision engine and the second revision engine is via a direct connection.

The method in accordance with the presently disclosed subject matter, wherein the communication between the revision engine and the second revision engine is via peer-to-peer network.

According to a forth aspect of the present invention there is provide a method of operating a revision control system comprising a revision engine associated with a first storage area, the revision engine comprising a revisions manger adapted to manage a first revision history log for storing at least one revision entry in respect of revision, generated in response to a modification event in the first storage area, the method comprising: receiving from a second revision engine associated with a second storage area an indication with respect to a first revision entry in a second revision history log, the second revision history log associated with the second revision engine; the indication including data in respect of a first revision generated in response to a modification event in the second storage area; and in response to the indication with respect to the first revision entry: identifying whether the first revision entry is missing from the first revision history log associated with the first revision engine, and in case it is, creating a second revision entry, the second revision entry corresponding to the first revision; and linking the second revision entry to a third revision entry within the first revision history log, thereby extending a progression path representing a progression of revisions within the first and the second storage areas; and identifying that along a progression path associated with the third revision entry, a further revision entry exists which corresponds to a modification of a revision associated with the third revision entry, and wherein the linking of the second revision entry extends a new progression path including the third revision entry and the second revision entry.

The method in accordance with the presently disclosed subject matter, wherein the indication includes information identifying the third revision entry.

The method in accordance with the presently disclosed subject matter, wherein the third revision entry represents a previous revision of the first revision.

The method in accordance with the presently disclosed subject matter, further comprising: requesting a revision represented by the second revision entry from the second revision engine and storing the revision in a data repository associated with the first revision engine.

The method in accordance with the presently disclosed subject matter, wherein in case, the third revision entry is not identified in the first revision history log, the method further comprising: creating a query requesting for at least one additional revision entry in a progression path of the first revision entry in the second revision history log, and sending the query to at least the second revision engine.

The method in accordance with the presently disclosed subject matter, wherein the indication includes information in respect of a plurality of revision entries in the second revision history log.

The method in accordance with the presently disclosed subject matter wherein the indication is received in response to a pull type update query generated by the revision manager and transmitted to the second revision engine.

The method in accordance with the presently disclosed subject matter, wherein the indication is a push type update message generated by the second revision engine.

The method in accordance with the presently disclosed subject matter, wherein the communication between the revision engine and the second revision engine is via a direct connection.

The method in accordance with the presently disclosed subject matter, wherein the communication between the revision engine and the second revision engine is via a peer-to-peer network.

The method in accordance with the presently disclosed subject matter, further comprising: managing a peer-to-peer network overlay of the peer to peer network in a distributed hash table architecture.

The method in accordance with the presently disclosed subject matter, wherein each revision entry in the first revision history log includes at least one data-element and wherein the method further comprising: locating within the first revision history log, two or more revision entries with one or more identical data-elements with the help of the at least one data-element for; and indicating an association based on the one or more data-elements between two or more revisions corresponding to the two or more revision-entries, respectively.

The method in accordance with the presently disclosed subject matter, wherein the at least one data-element is a content hash-code calculated from at least part of the content of a corresponding revision and the association indicates that the at least part of the content of the two or more revision is identical.

The method in accordance with the presently disclosed subject matter, wherein the at least one data-elements includes one or more metadata elements characterizing a corresponding revision and wherein the association indicates that one or more metadata element of the two or more revisions is identical.

The method in accordance with the presently disclosed subject matter, further comprising: handling a revert-command executed in respect of a first revision; the revert-command including at least an identifier for identifying a second revision entry corresponding to a second revision, and one or more types of data elements characterizing the revision; the second revision entry is located within the same progression path of a first revision entry associated with the first revision; the handling comprising: replacing one or more data elements, corresponding to said one or more types of data elements, in the first revision with corresponding data elements of the second revision, thereby creating a new revision; creating a new revision entry in respect of the new revision; and linking the new revision entry to the first revision history log.

The method in accordance with the presently disclosed subject matter, further comprising: linking the new revision entry to the second revision entry corresponding to the second revision entry, thereby creating a new progression path including the second revision entry and the new revision entry.

The method in accordance with the presently disclosed subject matter, wherein the one or more data elements is the contents of the second revision.

The method in accordance with the presently disclosed subject matter, further comprising: handling a copy-command executed in respect of a first revision; the copy-command including at least an identifier for identifying a second revision entry corresponding to a second revision, and one or more types of data elements characterizing the revision; the second revision entry is located on a different progression path than a first revision entry associated with the first revision; the handling comprising: replacing one or more data elements, corresponding to said one or more types of data elements, in the first revision with corresponding data elements of the second revision, thereby creating a new revision; creating a new revision entry in respect of the new revision; and linking the new revision entry to the first revision history log.

The method in accordance with the presently disclosed subject matter, further comprising: linking the new revision entry to the second revision entry corresponding to the second revision, thereby creating a new progression path including the second revision entry and the new revision entry.

The method in accordance with the presently disclosed subject matter, further comprising: handling a merge-command executed in respect of a two or more progression paths in the first revision history log; the merge-command includes at least information identifying two or more progression paths within the first revision history log and information identifying a merged revision-entry; the handling comprising: converging the two or more progression paths into the merged revision-entry and to have the two or more progression paths all continue in a single progression path.

The method in accordance with the presently disclosed subject matter, wherein each revision entry in the first revision history log is uniquely identified by a universally unique identifier (UUID).

The method in accordance with the presently disclosed subject matter, wherein each revision entry is the first revision history log is uniquely identified by a combination of metadata elements computing to a unique value.

According to a fifth aspect of the present invention there is provided a program storage device readable by machine, tangibly embodying a program of instructions executable by the machine to perform method steps of operating a revision control system comprising a revision engine, the method comprising: defining, at least one reference area within a file-system, the file system being implemented on a data repository; communicating with the file-system and identifying a modification event in respect of a file or folder within the file system; in response to the modification event: creating a new revision entry in a revision history log, the new revision entry corresponding to the modification event; identifying a relevant revision entry in the revision history log corresponding to a revision of the file or folder with respect to which the modification event was implemented; and linking the new revision entry with the relevant revision entry, thereby extending a progression path representing a progression of revisions of the file or folder.

According to a sixth aspect of the present invention there is provided a program storage device readable by machine, tangibly embodying a program of instructions executable by the machine to perform method steps of A method of operating a revision control system comprising a revision engine associated with a first storage area, the revision engine comprising a revisions manger adapted to manage a first revision history log for storing at least one revision entry in respect of revision, generated in response to a modification event in the first storage area, the method comprising: receiving from a second revision engine associated with a second storage area an indication with respect to a first revision entry in a second revision history log, the second revision history log associated with the second revision engine; the indication including data in respect of a first revision generated in response to a modification event in the second storage area; and in response to the indication with respect to the first revision entry: identifying whether the first revision entry is missing from the first revision history log associated with the first revision engine, and in case it is, creating a second revision entry, the second revision entry corresponding to the first revision; and linking the second revision entry to a third revision entry within the first revision history log, thereby extending a progression path representing a progression of revisions within the first and the second storage areas; and identifying that along a progression path associated with the third revision entry, a further revision entry exists which corresponds to a modification of a revision associated with the third revision entry, and wherein the linking of the second revision entry extends a new progression path including the third revision entry and the second revision entry.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION

Figure 1:
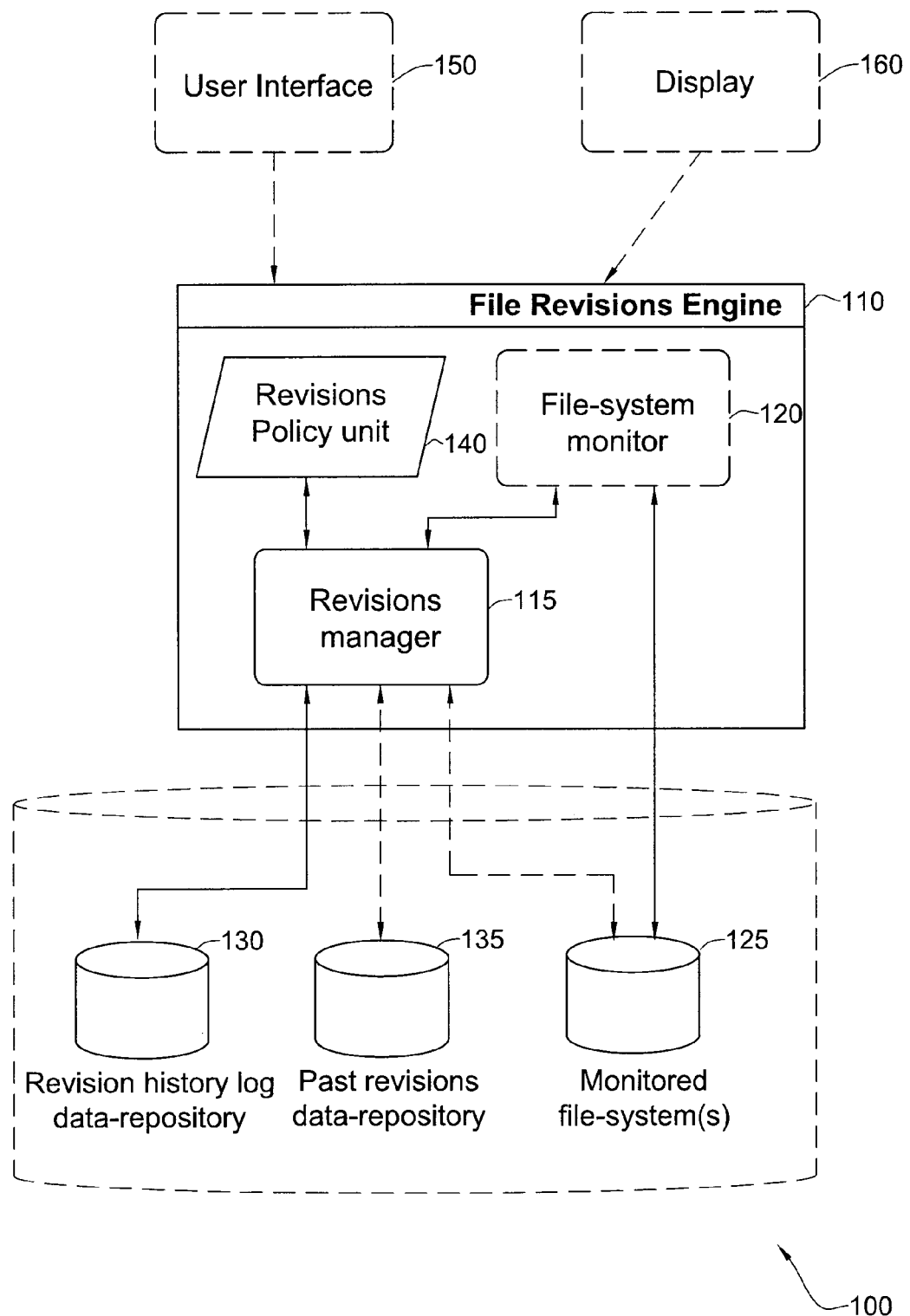
FIG. 1 is a block diagram of a revision control system, in accordance with an embodiment of the invention.

Unless specifically stated otherwise, as apparent from the following discussions, it is appreciated that throughout the specification discussions utilizing terms such as "processing", "computing", "calculating", "determining", "generating", "identifying", "setting", "configuring", "adapting" or the like, refer to the action and/or processes of a computer that manipulate and/or transform data into other data, said data represented as physical, e.g. such as electronic, quantities and representing the physical objects. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

The operations in accordance with the teachings herein may be performed by a computer specially constructed for the desired purposes or by a general purpose computer specially configured for the desired purpose by a computer program stored in a computer readable storage medium. In addition, embodiments of the present invention are not described with reference to any particular programming language. It will be appreciated that a variety of programming languages may be used to implement the teachings of the inventions as described herein.

The terms "computer memory", "machine-readable memory" or the like includes magnetic cassettes, flash memory cards, digital video disks, Bernoulli cartridges, random access memories (RAMs), read only memories (ROMs) etc.

As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments", "certain embodiment" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments", "certain embodiments" or variations thereof do not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the invention will now occur to the reader.

Figure 2:
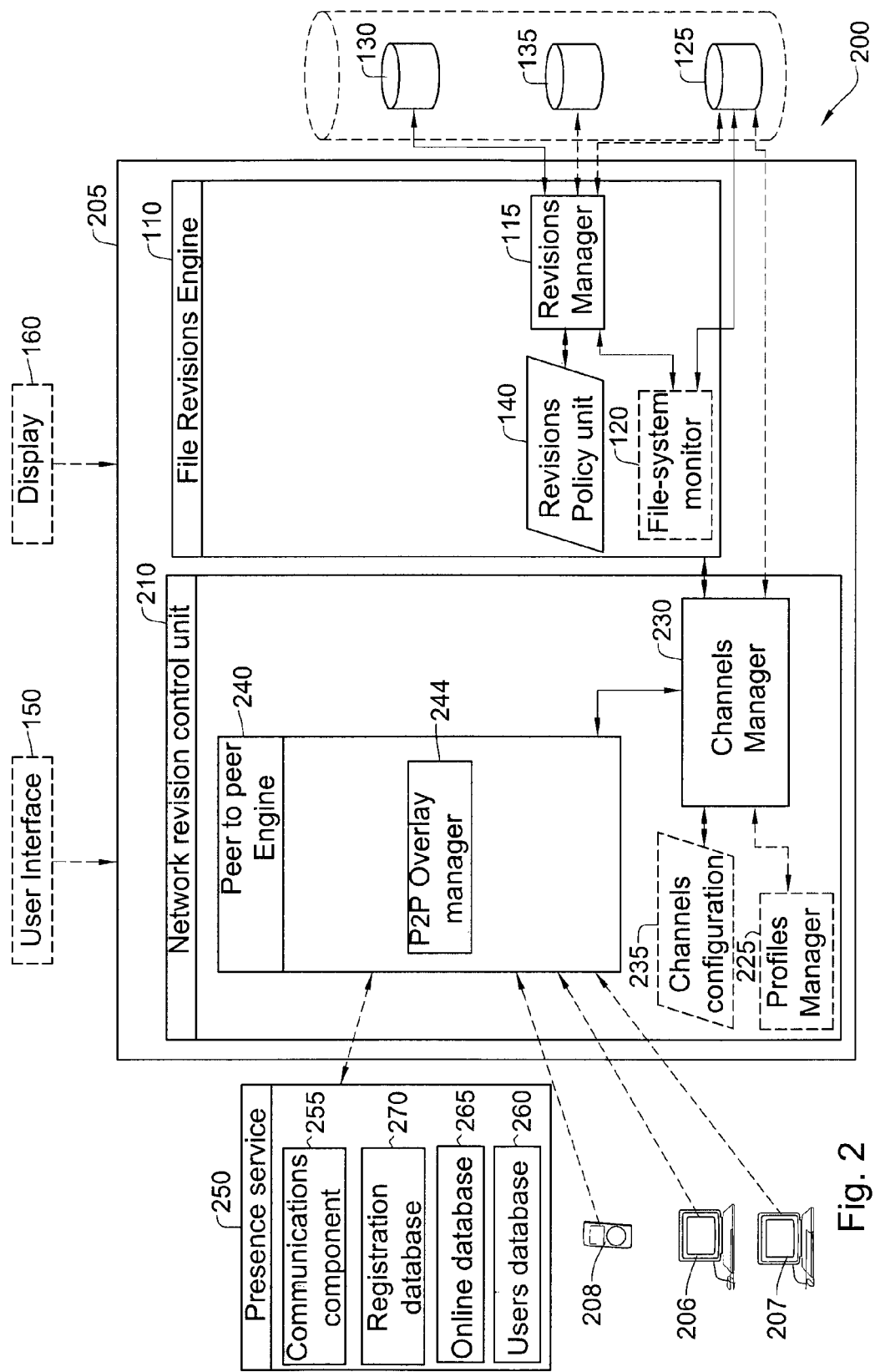
FIG. 2 illustrates a block diagram of a revision control system 100 in a context of a network 200, in accordance with an embodiment of the invention.
Figure 4:
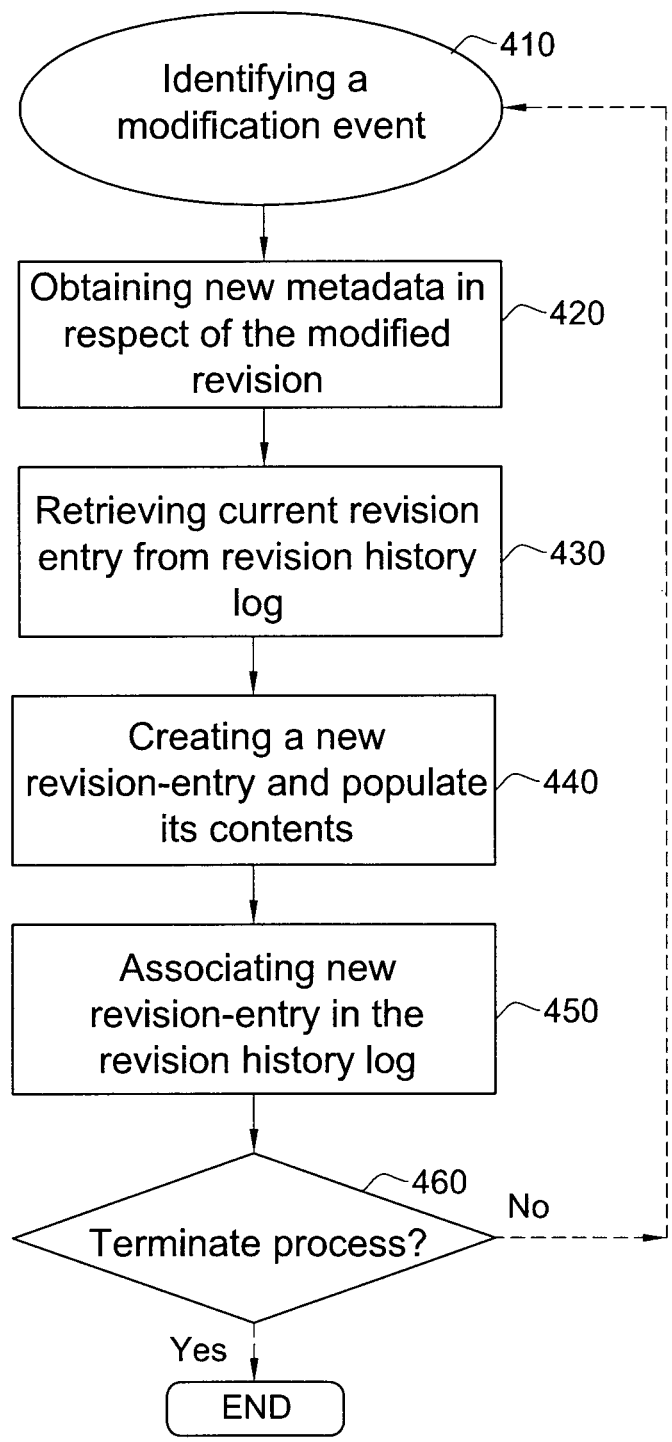
FIG. 4 is a flowchart showing a revision history log update, in accordance with an embodiment of the invention.
Figure 5:
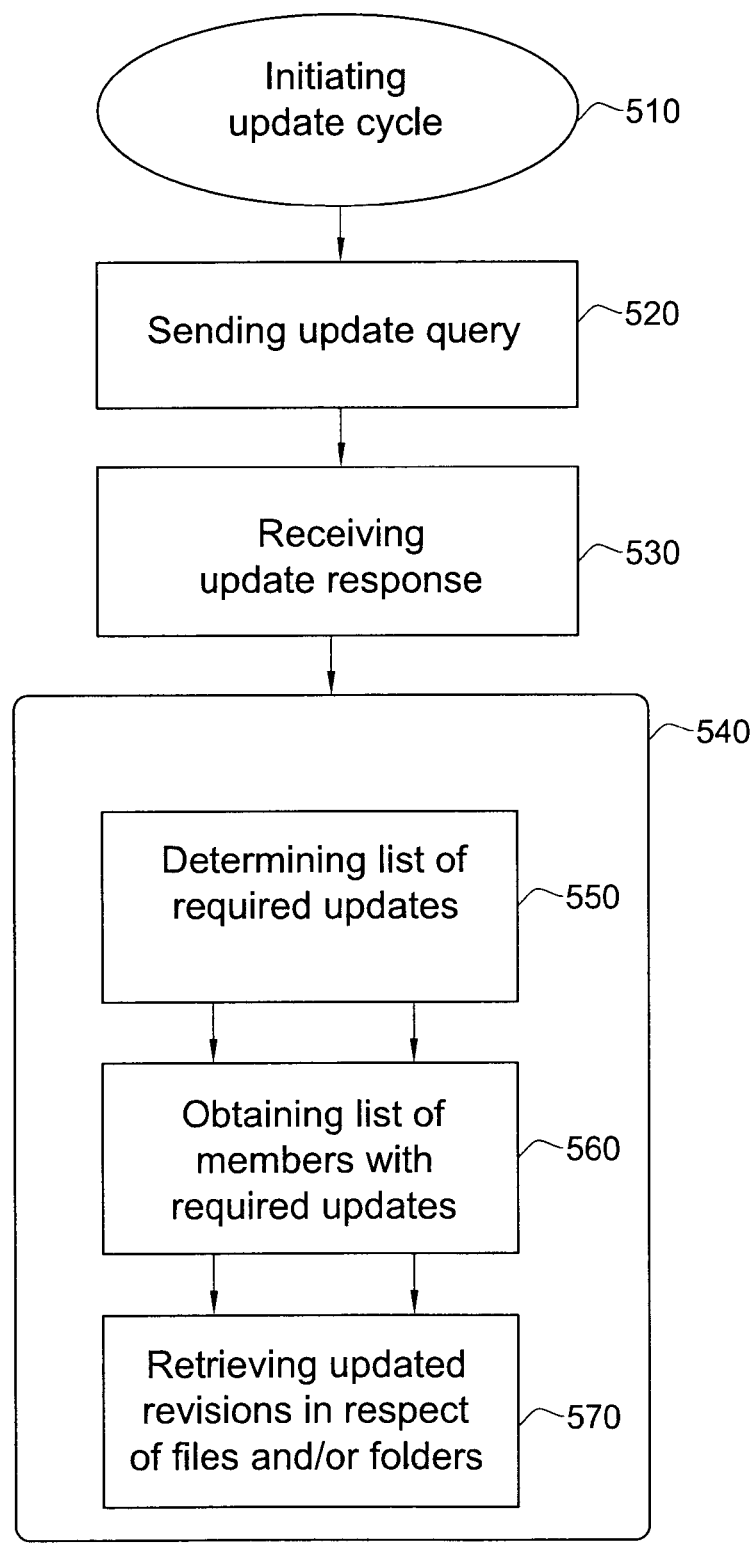
FIG. 5 is a flowchart 500 showing operations of an update cycle in the context of a P2P network, in accordance with an embodiment of the invention.

In embodiments of the invention, fewer, more and/or different stages than those shown in FIGS. 4 and 5 may be executed. In embodiments of the invention one or more stages illustrated in FIG. 4 and FIG. 5 may be executed in a different order and/or one or more groups of stages may be executed simultaneously. FIG. 1 and FIG. 2 illustrate a general schematic of the system architecture in accordance with an embodiment of the invention. Each module in FIG. 1 and FIG. 2 can be made up of any combination of software, hardware and/or firmware that performs the functions as defined and explained herein. The modules in FIG. 1 and FIG. 2 may be centralized in one location or dispersed over more than one location. In other embodiments of the invention, the system may comprise fewer, more, and/or different modules than those shown in FIG. 1 and FIG. 2.

Bearing the above in mind the detailed description of different aspects of the disclosed subject matter now follow. Both the content and the metadata (both referred herein as data elements characterizing a file) of computer files (such as documents), stored on a computer file-system are very often modified in various ways. A computer file (or file) is a stream of binary data stored on a file-system. In the context of the present invention, the term "file-system" refers to a special-purpose data-repository for the storage, organization, manipulation, and retrieval of data, or more specifically, computer files. A logical file-system is usually defined on one or more storage device, and is organized into folders, which may in turn contain additional sub-folders, and files. Some types of file-system types include, for example, NTFS, ufs, HPFS, JFS, FAT (16/32), ext2, ext3 to name a few.

When such a file is modified, either by a user or by a software program or in another way, this modification may be typically captured in a modification event. In the context of the present invention, modification events describe events which are aimed at modifying either the content or the metadata of a file (or folder). Examples of such events include, but are not limited to the following events: creation of a new file, deletion of an entire file from the file-system, overwriting previously existing data in a file, deleting data from a file, renaming a file, moving a file to a different location (e.g. another folder in the same file-system or in another file-system), modifying existing metadata of a file, and adding metadata to a file. By way of example, modifications are managed by one of the following: by a file-system in which the files are stored, by a file-system driver, by the operating system which is responsible for managing the files, by a file-server or a network attached file-system or by a hardware device managing the files.

Generally, a modification event describes the creation of a new revision of the file on the file-system. The new revision is usually represented by the now-modified file, and is stored on the file-system, while the old revision of the file is often discarded. Such file-systems do not regard new modifications of a file as a "revision" of a file, do not keep track of changes in a current-revision in respect of its previous state and its previously included data, and do not enable users to interact with previous revisions of a file. In order to keep track of the history of modification events and the resulting file-revisions, the present invention makes use of revision control.

According to certain embodiments of the invention there is provided a file revision-control system, method and apparatus configured for storing and managing a revision history log, and for enabling to track and manage, compare and retrieve revisions, including current-revisions stored on a designated reference area, past-revisions of files (or file revisions) stored in a predefined storage area and also past-revisions of files which were previously on a reference area.

In the context of the present invention the term "reference area" refers to a predefined storage space within at least one file-system, which may be designated for storing current-revisions, and is accessible to file-revision control as explained in more detail below. In the context of the present invention the term "current revision" refers to the most updated revision in respect of an earliest file (or earliest revision), which is currently available, for a given progression path. The current revision may be currently stored in the file system being monitored via the reference area.

The term "progression path" refers to one or more revision entries which represent the progression (or evolution) of a file over time, where each revision is created by modifying the content and/or metadata and/or state of at least one past revision. As explained in more detail below, in case that a revision is branched into more than one revision, each such revision will constitute a different progression path.

The term "past-revision" refers to a revision which is other than a current-revision. Past-revisions may be stored in a designated data-repository for past-revisions. The term "previous revision", a relative term, refers to a revision immediately linked with a more current one.

According to certain embodiments, the present invention operates by computing and associating a set of additional data to actual files. This additional data provides information inter alia, regarding modification events that occurred in respect of files on a file-system and enables to store, track, retrieve and/or display the progression of a file as it is manifested by its changing revisions.

According to certain embodiments of the invention, each revision of a file is represented by a revision entry (e.g. as a vertex, graph-node or record) in a revision history log, which can be stored and managed in a designated data-repository. A revision entry, in the revision history log, stores data corresponding to at least one revision, while the revisions themselves may be stored on the monitored file-system (e.g. which is monitored via the reference area) and/or in a past-revisions repository.

Each revision-entry is a data entity (e.g. object, or records in a relational database) representing a modification of a file, and is associated with a revision. Each revision-entry contains a compilation of attributes (or data elements) which identify and characterize a specific revision. For example, a revision-entry may include a part or the entire following list of attributes:

Identifier of the revision; Hash-code corresponding to the content of the file-version; identifier of the parent revision-entry; one or more time stamps (e.g. time of creation of current-revision); hash-code corresponding to part or all of the revision meta-data; hash-code of the parent meta-data; hash-code corresponding to the earliest known revision of this file; identifier of the earliest known revision of this file; name of the file within a file system; relative path to the file within a file system, absolute path to the file; a link to the location of the current-revision within the relevant file data-repository; a link to the parent revision-entry; a list of links to the descendant of the revision-entry; a unique user identifier who created a revision.

A common approach in file-systems is to identify a file by a file name in the form of a path directing to the file's unique location in the file-system. According to this approach, a file is uniquely identified by a combination of its name and a path of folders and sub-folders, pointing to a sub-folder containing the file, together termed the "full-path" of a file. Internally, within the file-system and/or file-system drivers, and/or an operating system facilitating it, files may be identified by further identifiers. These additional identifiers may point to the beginning of the file on the file system and/or storage device, to an ID number of the file, to its first i-node, and so on. These additional identifiers are commonly used by a file-system, by a software application program running on a computer, and by operating system acting on a computer, while accessing a file for any purpose.

While identifying files using their name and path may be the most common approach today, this approach is problematic and may be inapplicable when a file is to be considered in respect of its history, and in respect of its contained data ("content"). For example, two files may contain the exact same data, and still be regarded as two separate files on a given file-system, and the file-system may be unable to identify that these two files have identical content and associate between the files. Furthermore, some file systems may not be able to determine whether two files have any historical relationship between them. For example, file-systems may be unable to identify whether a certain file represents a modified revision of an earlier file. In another example, after the content of one file is copied into a second file, file-systems may not be able indicate that the first file is the source of the second file.

Thus, according to certain embodiments, the system, method and apparatus of the present invention may utilize computed hash codes, in addition to or instead of file identifiers such as the full path of the file, for a variety of tasks and purposes.

Each revision-entry may be associated with a unique identifier, which uniquely identifies a revision at least within the domain of the revision history log. This identifier enables, for example, to associate the revision-entry with the corresponding revision in the data repositories.

In addition, a revision-entry may include hash codes which enable to associate revisions to corresponding revision-entries according to the revision's content and/or metadata. The computed hash-code can be utilized for locating relevant revision-entries, based on the content and/or metadata of the relevant revision, which in turn are associated with a revision's unique identifier and enable to retrieve the corresponding revision (e.g. by associating file names in the file system to the unique identifier within the revision-entry, optionally together with the hash-codes).

Hash codes may be produced, for example, by a computation performed on the entire file content or parts thereof. Such codes are referred to herein as content-hash. Common algorithms for producing hash-codes from a binary stream include, for example, MD5 and SHA1. A hash-code can be computed for a given file, and may be utilized to identify a given file by its actual contents, rather than its file name. Thus, for example, when a computed content-hash is used to identify a current-revision, or a past-revision of a file, the hash codes can be used for locating other revisions within the revision history log with identical content.

In the example of a content-hash, a new revision with an unfamiliar file name which is introduced to the file-system may be first identified by its contents, and then associated to other revisions which are recorded in the revision history log by a calculated content-hash. Once the revision-entries of revisions having identical content are identified, certain operations may be performed with the matched revision-entries. For example, the file names of these revisions can be retrieved, from the corresponding revision-entries, or from the file system based on the unique identifier associating the revision-entry with the revision itself.

As mentioned above, modification events may include modifications on the content of the file and/or modifications on the metadata related to a file. In the context of the present invention the term "metadata" refers to any information regarding the file which is not the actual data contents stored within the file. File metadata may include, but is not limited to the following data elements: the file name, different time stamps e.g. last modification time or creation time, file's size, file's contents hash-code, owner of the file, an ID of last the user who modified the file, and so on. Each revision-entry may store both of the content-hash and metadata-hash, and thus represent the revision data in respect of a file. In some embodiments, separate revision-entries may be constructed for separately storing modifications made to the content of a file and modifications made to the metadata of a file. Optionally, a time stamp indicating the time of a certain modification event has occurred is updated with each revision of the file. Accordingly, depending on the specific embodiment, files may be distinguished and tracked based on their content and/or their metadata.

Similar to the content of a file, a hash-code may also be computed for a binary stream containing metadata of a given file. This hash-code is referred to herein as "metadata hash-code". Metadata hash-codes can also be used to identify a current-revision or a past-revision of a file. Similar to content hash-codes, metadata hash-codes can be used to identify certain revision-entries (as a key), and be utilized for accessing these entries and for associating between revision-entries and the corresponding revisions.

In some embodiments, metadata hash codes can be used for uniquely identifying a specific revision of a file (e.g. for the purpose of associating a revision with its corresponding revision entry as described below), at least within a given reference area. This can be done by a metadata hash code which is computed from a set of specifically selected meta-data elements. For example, by including a combination of metadata elements which provide a sufficiently unique hash-code (e.g. the local date and time, a random number of sufficient bit-length, and so on), specific revisions can be uniquely identified. For example, in the context of a Microsoft Windows-NT system, a file can be uniquely identified by a metadata hash code which is computed from a binary stream containing meta-data including a user SID (Security Identifier), the relative path of the file being tracked, the filename of the file being tracked, a UUID generated at the moment of computing the hash-code, the timestamp designating the current clock, a time-stamp counter of a processor, and so on.

A hash-code may also be computed for a part of a file, and a part of metadata associated with the file. When a hash-code is computed for a part of a file, it is referred to herein as a "partial hash-code". A plurality of partial hash-codes can be used to refer to different parts of a file. For example, if partial hash-codes are computed for each 1 kilobyte block of a file of 1 megabyte file, this will result in one thousand (1000) such hash-codes, each pertaining to a specific portion of the file. Partial hash-codes may be utilized to determine that specific blocks within a file were modified, while other blocks remained unchanged relative to a previous revision or past revisions in general. The use of partial hash-codes may be utilized in the context of several operations and scenarios, including the gathering of modification statistics on a given file; determining whether one modification or more have occurred within a given file; the minimization of storage space in past previous file revisions; the minimization of traffic when communicating file modifications between nodes that refer to the same files and more.

A revision history log may be implemented as any type of data structure which is suitable for storing and tracking information in respect of one or more revisions of a file. For example, a revision history log can be constructed by linking together multiple vertices, each vertex representing a revision of a file, and the edges, also commonly referred to as links, between the vertices representing the relationships or progression between the different revisions of any single file. For example, a revision history log may be represented as a set of trees, a tree, as a set of relational tables in an RDBMS, data in a NoSQL database, or as a directed graph.

A progression path can be represented in a revision history log by revision entries linked by edges in one direction. In a progression path each revision-entry may have at most one previous revision-entry and act as the previous revision-entry of at most one other revision-entry. In this manner multiple progressions paths are created when a revision-entry (a "junction" revision entry) branches into more than one revision-entry.

According to some embodiments, a revision history log may be implemented as a unique data structure created for each file within the reference area, representing the revision history of a single file. According to other embodiments, a revision history log may be implemented as a single data structure representing the revision history of more than one file. According to certain embodiments, a revision history log is implemented as a unique data structure (or data entity) representing progression-paths of all files in one reference area, wherein each file (i.e. the most up to date revision) which is stored on the reference area is represented by one "current-revision-entry".

Multiple copies of the same file (e.g. each file having a different name) may be associated with the same contents-hash, and may also be associated with the same metadata hash-code (e.g. where the hash is computing without considering the differentiating elements such as a different name). Multiple copies of the same file may be also associated with a similar revision-entry, or optionally even the same revision-entry.

According to certain embodiments of the present invention, if two or more current-revisions on a reference area comprise the exact same content, then one or more revision-entries are created for each current-revision, each revision-entry including at least an identical content-hash. The revision-entries are added to each of the relevant progression paths in the relevant revision history log. In this manner, each current-revision is represented by a different progression path, and when one of the current-revisions is further modified, its progression path can be correctly retained and tracked.

According to other embodiments, different current-revisions having identical content may be associated with a single revision-entry, instead of creating revision entries for each revision. In this case, further information may be stored in order to identify which files are associated with the revision-entry, and to enable to keep track as to which and in what manner, the associated current-revisions are subsequently modified.

FIG. 1 illustrates a block diagram of a revision control system 100, in accordance with an embodiment of the invention. The revision control system 100 in FIG. 1 may be implemented on a single device or node where modifications to files on one or more file-systems accessible to file revision engine 110 take place. The term "node" as used herein may refer to the entire hardware device implementing the logic of the system and method of the present invention. Alternatively or additionally a node may refer to a hardware device including a processor coupled to a bus and computer memory where the processor is adapted to implement (or simulate) the logic of the revision control system and method of the present invention, as described herein. Nodes may be, but are not limited to, personal or portable computers, PDAs, cellular phones or any other apparatus having the appropriate processing power and memory and capable of operating and accessing an appropriate file-system. According to certain embodiments, revision control system 100 comprises or is associated with at least one processor configured to manage, execute and control its relevant components and operations.

According to certain embodiments, a single node configured as revision control system 100 may be adapted to serve one or more users, where each user is associated with a specific user profile which specifies the preferences, and system configurations of that specific user. Thus, each node, implementing system 100, can be used by multiple users where each user is associated with a specific user profile, defining the preferences and configuration of that user and relating to specific data in respect of that user for example: specific reference areas, system configuration (policy), revision history log, channels etc.

According to certain embodiments, revision control system 100 comprises a file revision engine 110. In general, the file revision engine 110 is configured to maintain revision history logs in respect of one or more reference areas, and to update each revision history log according to a predefined policy, in response to modification events which occur in respect of the files within the relevant reference area. In case each node is configured to serve more than one user, each user-profile may be associated with different revision history logs corresponding to the relevant reference areas of that specific user. A reference area refers to at least one specific storage space in a file-system, which is accessible to the file revision engine 110. File modification events which occur in respect of files and/or folders in the reference area are monitored by revision engine 110.

Files (e.g. current-revisions) and file systems may be stored in a file data-repository 125 comprised within (or associated with) revision control system 100 Revision control system 100 may also be associated with a revision history log data-repository 130 which is configured to store one or more revision history logs. In some embodiments, revision control system 100 may be also associated with past-revisions data-repository 135 which is a data repository designated for storing past revisions of files which are being monitored by the file revision engine 110, or which were monitored by a file revision engine 110 in the past. Part or all of data-repositories 125, 130 and 135 may be directly associated with revision control system 100, for example they may be embedded on the same device as the revision control system 100, or directly connected to the device of revision control system 100. Alternatively or additionally, data-repositories 125, 130 and 135 may be located on a remote device which is accessible to revision control system 100 via any type of communication facility or network (e.g. wired or wireless network). In some embodiments, the data within data-repositories 125, 130 and 135, may be organized as relational databases accessible to revision control system 100 via any type of communication facility or network. Data-repositories 125, 130 and 135 may be configured as a document management system, accessible to revision control system 100 via any type of communication means or network. Data-repositories 125, 130 and 135 may be configured as a number of distributed data-repositories units or as a single data-repository unit. Data within data-repositories 125, 130 and 135 may be organized in a database for example, as a relational database, a NoSQL database in a file-system, e.g. as files on a file-system and so forth.

According to certain embodiments, file revision engine 110 comprises a revisions manager 115, a file system monitor 120 and revision policy unit 140. According to certain embodiments, the revision manager 115 is configured to create and manage a revision history log for the files (and folders) which are stored within the reference area and are being monitored by system 100.

According to certain embodiments, file system monitor 120 is connected to one or more file systems (e.g. stored on data-repository 125) and configured to monitor modification events performed in the file system, in respect of files which are being monitored by system 100 (e.g. located within the reference area). When a file modification event is identified, file system monitor 120 alerts the revision manager 115 either directly or through an intermediary agent such as for example, an operating system. Alternatively, revision manager 115 may retrieve recorded events from file system monitor 120 or from an intermediary agent as specified above. According to some embodiments, an alert (or the event), includes the full name and path of a file, or alternatively some type of a file identifier which can be translated into a full-path and file name. In some embodiments, the file-system and/or operating system also allows the file-system monitor 120 to identify the types of the modification event that occur (e.g. modify, create, delete, or rename event).

It should be noted that in some embodiments, system 100 may not include a file-system monitor 120. In these embodiments, system 100 may be updated of modification events by other means, for example, the user may manually notify system 100 whenever a modification event is performed, or possibly by a scanning operation, performed for example by revision manager 115, on the file-system directed for identifying modification events.

File system monitor 120 may perform a scanning operation, during which file system monitor 120 scans (e.g. in response to a command issued by file revision engine 110) one or more reference areas. In a scanning operation, reference areas are traversed, for example from a top-level folder to its contained sub-folders, searching for modifications that satisfy certain predetermined criteria. Criteria are defined in terms of metadata fields and/or the actual contents of scanned files and folders. Such criteria may, for example, specify a modification-time stamp which tells monitor 120 to search for files which were modified after a specified modification time and date (i.e. files modified after 1 Nov. 2009). In case the scanning operation locates files that satisfy the predefined criteria, file-system monitor 120 may alert revision manager 115 as described above. Alternatively, file-system monitor 120 may indicate the located files e.g. as files with pending alerts, instead of actually alerting revision manager 115.

The revision manager 115 receives information indicating that a file modification event has occurred in respect of a file stored on the reference area. This information may come for example, as a notification issued by the file system monitor 120, or retrieved by reading pending alerts on the file-system monitor 120. In response, revision manager 115 updates the revision history log containing revision-entries of the relevant file. A modification event typically results in the creation of a new revision of the file on the file-system. Therefore, for example, if the content of a file has been changed and a new revision of the file is available on the reference area, the revision manager 115 creates a new revision-entry for the new file revision, containing the relevant information regarding the modification, and links the revision-entry in the appropriate position in the revision history log (e.g. according to a previously known revision-entry of this file, according to its modification time stamp, and so forth, as will be explained below).

According to certain embodiments, a revision policy unit 140 is connected to revision manager 115 and comprises the operation rules and configurations of the revision manager 115. The revision manager operation rules and configuration include for example, reference area configurations, revision history log configurations and revision history log update policy.

According to certain embodiments, the revision policy unit 140 is configured to enable defining reference areas within the data-repository of a device which are accessible to the revision control system 100. In some embodiments, the reference area may be defined for example, by selecting specific folders or files within the file-system. In other embodiments, the reference may be defined, for example as the entire storage space of file data-repository 125.

According to certain embodiments, more than one reference area may be defined for a given node. In case each node is configured to serve more than one user, each user profile may be configured with different reference areas. Different users may have reference areas with overlapping storage space. In case two or more reference areas on a single node are defined with overlapping storage space (e.g. different reference areas are associated with the same folders to be monitored), revision manager 115 may resort to maintaining only one revision history log for the overlapping storage space. In this case, revision manager 115 may also optimize its operations in order to save resources such as computation time, bandwidth, and storage space, by consolidating operations for multiple overlapping reference areas, folders and files into fewer operations. Reference area configurations may also include for example: a list of folders and files within the reference area that should be monitored by system 100 ("inclusion list"), a list of files and folders which should not be monitored by system 100 ("exclusion list"), whether or not to recursively monitor sub-folders contained in the reference area, etc.

Revision history log configurations refer to the different attributes and settings of the revision history log. According to certain embodiments, the revision policy unit 140 is configured to enable to define, retrieve and store the history log configurations. History log configurations may include for example: the maximal storage space which is allocated for storing past-revisions of files which are being monitored by system 100; maximal number of past-revisions which may be stored for each file which is being monitored by system 100;

mandatory and/or optional attributes which are defined in each revision-entry; a time interval (i.e. 3 months, 1 week, 2 years) to maintain past-revisions in past-revisions repository 135, etc. Revision history log configurations may also include for example: the storage location for revision history log, revision history log growth limitations such as maximum number of revisions to store or maximum storage space to allocate for log growth, etc.

Revision history log update policy refers to the update rules of the file revision manager 115. According to certain embodiments, the revision policy unit 140 is configured to enable to define, and store the revision manager 115 update-policy. Revision manager 115 update policy may include parameters such as, for example: the types of events and operations which initiate a revision history log update; whether an update is triggered automatically by system 100 or it is triggered by an explicit request of the user. In case of an automatic scheduled update it may include a minimal and maximal time interval between updates of the revision history log; whether the update should occur immediately after each modification event, or whether an update occurs after a pre-defined number of modification events, and/or other policy parameters. Revision history log update policy may also include for example: parameters such as a minimal time to wait before a modification event is handled to create a new revision-entry (for example, to allow addressing frequent modification events as a single revision), a time interval after which the revision engine 110 begins scanning for modifications, etc.

According to certain embodiments, system 100 further comprises a user interface 150 configured to enable a user to interact with system 100. User interface 150 may include a user interface hardware and/or software component specifically configured for accessing revision control system 100 (e.g. mouse and keyboard). Alternatively or additionally, user interface 150 may be a user interface of another computer or device which may be utilized for accessing revision control system 100. According to certain embodiments system 100 further comprises a display 160, such as, for example, an LCD screen, for displaying data by system 100. Display 160 may be utilized, for example, for presenting a visual representation of revision history log of a given file, displaying results of queries performed on system 100, presenting error messages, presenting results of different operations performed on system 100 and so forth.

According to certain embodiments, the data encoded in revision policy unit 140 may be configured by a user of system 100 where the revision policy unit 140 can be accessed and configured via user interface 150. According to certain embodiments, the data encoded in revision policy unit 140 may be configured by utilizing an interacting element (such as user interface 150 and display 160), as further explained below. According to other embodiments, some or all of the data encoded in revision policy unit 140 may be implemented and/or hard-coded and/or programmed into system 100 in advance.

According to certain embodiments, interacting elements such as display 160, user interface 150, and possibly other hardware and/or software elements configured to interact with revision engine 110 may be used for interacting with revision engine 110. Revision engine 110 may be configured to enable issuing queries with the help of one or more interacting elements. Queries may be used for requesting information regarding a revision history log. Such queries may include, for example, retrieval of revision-entries, retrieval of progression paths, retrieval of parts of progression paths, retrieval of revision entries according to certain criteria (e.g. a query to return all revision-entries that contain the same contents hash code), retrieval of the full revision history log. Revision engine 110 may be configured to enable issuing commands with the help of one or more interacting elements. Display 160 may be used for displaying query results, for example, in the form of tables, graphically drawn progression-paths and directed graphs, and so on.

FIG. 2 is a block diagram of a revision control system 100 in a context of a network 200, constituting a network revision control system 205, in accordance with an embodiment of the invention. Revision control system 205 may be implemented on a device operating as a node in file sharing environments.

One example of a file sharing environment is a Microsoft Windows Network (SMB) controlled by an Active-Directory and/or Domain, where files on a network file-server may be accessed by client computers. Additional file sharing environments include for example, a NETBIOS based network, an NFS based network, and AppleTalk based network to name a few. In the context of such a file sharing environment a file revision engine 110 may be configured on one node (e.g. on the file server node), to track reference areas on its locally associated storage space, or storage space accessible via the network (e.g. via UNC share-name). File modification events which are tracked and recorded by revision engine 110 may include information in respect of modifications made to files on the server's shared file system and a revision history log can be generated and managed (by revision engine 110) for maintaining the corresponding revision-entries representing the information in respect of these events.

In some embodiments, the revision engine 110 can be distributed on more than one node. For example, file system monitor 120 resides on a file-server configured as described above, while other components of revision engine 110 (e.g. revision manager 115 and revision policy unit 140) are located on a different node which is operable to communicate with the file-server. File system monitor 120 can thus keep track of file modification events initiated by different users, and send this information to revision manager 115, located on a different node, to enable the management and update of a revision history log.

In some embodiments, the access of the node accommodating revision manager 115 to the file server can be limited only for the communication of modification events for the purpose of management and update of the revision history log. In other embodiments, the communication can be less restrictive and include communication for other purposes as well.

Another example of a file sharing environment is a peer-to-peer (P2P) network, where nodes which act as peers are commonly managed by a peer-to-peer overlay, and attempt to keep all or part of their files, revision history logs and possibly current and past-revisions updated with changes administered by other peers of the same overlay. In general, a peer to peer (P2P) network is a model of a distributed network architecture linking nodes (e.g. computers) into a communication system where typically each node is configured to have similar capabilities, and is adapted to operate both as a client and a server. According to certain embodiments, the system and method of the present invention enable to create and manage P2P networks that enable the revision history log to be updated according to revisions on the local node and on other peers to whom the node is connected via the P2P network, and to allow peers of such a network to share files and to keep track of any changes or updates which are made to the files in other peers.

FIG. 2 depicts an example of a revision control system 100 in the context of a network 200 (constituting network revision control system 205) where revision control system 100 comprises a network revision control unit 210 which is connected to file revision engine 110 and configured, in general, to enable communication with a P2P network and exchange information between peers in a P2P network. Revision control unit 210 is further configured to enable exchanging information between peers in a P2P network regarding available updates. When configured in this manner, information with regard to modification events tracked by file revision engine 110 on one node can be sent to other nodes connected to the same overlay via peer-to-peer messages. This configuration facilitates maintaining up to date copies of the revision history log and files and folders shared by a plurality of peers in the same network. In the example shown in FIG. 2 revision control system 100 is connected to 3 other peers 206, 207, 208 and to a presence service 250.

According to certain embodiments, network revision control unit 210 comprises a channel manager 230, a channel configuration unit 235, and P2P engine 240. The channel manager 230 is connected to the revision engine 110 and is configured for performing operations in the context of channels, within the P2P network.

According to certain embodiments, it should be noted that network revision control unit 210 can be configured to enable communication and exchange information between peers connected by a local area network (LAN), for example, configured in the context of a Windows Domain file-sharing environment as described above.

In the context of the present invention, a "Channel" defines a set of one or more specific reference areas (e.g. folder(s)) on a node, which are accessible for sharing and updating by a group of peers that are subscribed to a respective channel in a P2P network. For each peer, files and folders associated with a channel are monitored by a file revision engine 110, within the peer's corresponding node, and a revision history log is maintained for all the relevant files which are stored within the reference area associated with the channel. In accordance with certain embodiments of the invention, peers which subscribe to the same channel are designated as members of a channel and are referred to herein as "members".

As described in more detail below, operations performed by channel manager 230 may include e.g. requesting updates from other members of the channel and informing other members of a channel of new available updates. In some embodiments, a channel may be created or initialized by any peer on a P2P network who wishes to make part or all of her files accessible to other peers of the same network.

A peer-to-peer overlay can be described as an application-layer mesh of connections between networked nodes, constituting peers in the resulting mesh. The overlay architecture in a P2P network is typically administered by the peers themselves, ultimately removing the need of coordinating every communication through a central overlay authority such as a communications server. An overlay may be dynamically reconstructed and updated according to the changing requirements and conditions within the P2P network, including by way of non-limiting example, changing the overlay when peers join the overlay and leave it, and/or when the workload on a specific peer is changed, which may be transmitted to other peers for optimization purposes. Overlay management algorithms are well known in the art and therefore will not be discussed any further. Examples of known overlay management algorithms include PASTRY, TAPESTRY, CHORD, KADEMLIA, and GNUTELLA to name a few. For further information see Buford, Yu and Lua, 2009, pp. 12, 139-140, 146-148, 140-146f ("P2P Networking and Applications", Morgan Kaufmann). P2P overlay management can be performed for example by a P2P overlay manager 244.

In general, in a P2P network, nodes which are connected, either directly or indirectly (e.g. through their connection with other intermediate peers) are considered peers of the same network or overlay. A channel overlay is the overlay (mesh of connections) defining the connections between members of the same channel. Messages communicated between members in a channel-overlay are routed only between members subscribed to the same channel.

According to certain embodiments, the channel manager 230 is configured to receive from channel configuration unit 235 the information with regard to the channels which are associated with the revision control system 205, and information with regard to the members of each channel. Channel manager 230 is further configured to determine, based on the information received from channel configuration unit 235, the channel overlay requirements for establishing connectivity and communication with other members of a channel. According to certain embodiments, channel manager 230 is connected to P2P engine 240 which is configured to establish and manage the network overlay of the node with the P2P network. The P2P engine 240 may be configured to receive from channel manager 230 information pertaining to the relevant channel(s) members and to a requested operation (e.g. a request for an update-query as described below) and to establish communication and/or interact with other members of the channel. P2P engine 240 may be further configured to assist other peers in maintaining the overlay, by applying relevant overlay-maintenance techniques and handling overlay-maintenance communication messages, as described in the prior art reference mentioned above, with regard to overlay management.

Channel configuration unit 235 may also include part or all of the following examples of attributes that may be used to define a channel: globally unique channel identifier (in respect to all other channels on the network); the owner of the channel, (e.g. the user who created the channel); reference areas on the disk storage space which are accessible to a channel; specific update policy, which is a set of rules which define parameters used to perform updates of files between different peers of the same channel, as explained in more detail below; a list of subscribers; etc.

According to certain embodiments, channel configuration unit 235 is adapted for setting and storing the channel attributes and configuration.

According to certain embodiments, peers of P2P network may become members of a channel, by first issuing a subscription-request to the channel owner (or administrators) requesting to be granted with access to the channel. Then, the requesting peer should be approved by the channel owner. Alternatively or additionally, peers may be invited by a channel owner (or administrator) to become a member of the channel, and then typically the peer should approve the invitation. In general, any user of a node may become a member of more than one channel, either as an owner of a channel (e.g. by initiating a channel) or as a subscriber to an existing channel. Each channel may be defined with different reference areas, allowing members of each of the different channels to share and update a specific group of files and folders. Once a peer has connected to at least one channel overlay, it may share and update with other members of the channel which are currently connected to the overlay, files, folders and revision history log of the files and folders, within the predefined reference areas which are associated with the channel.

According to certain embodiments, network revision control unit 210 is connected to a presence service 250 which provides a variety of services to network peers. For example such services may include registration and tracking of peers and users on the network, authentication of peers and users, tracking of currently online peers and users, registration of channels, etc. Presence service 250 may be implemented on one or more server computers. Additionally or alternatively, presence service 250 may be implemented on one or more nodes within the P2P network (e.g. in a distributed hash table—DHT) on a single hardware device or a plurality of hardware devices, and/or on one or more virtualized computers. Different components of Presence Service 250 may be implemented on one or more server computers, while other components may be implemented by one or more nodes within the P2P network, e.g. by a distributed hash table. Presence service 250 may be connected to network revision control unit 210 via any type of communication means or network (e.g. via wire or wireless network).

According to certain embodiments, presence service 250 facilitates peers identity management. Peers are allowed to log on to the presence service 250, for example by assuming a username and password or other identification data. The identity of such peers may be authenticated by the presence service 250, which may assist in restricting communication between peers only to authenticated peers. Presence service 250 may also validate, provide and exchange encryption keys between peers, to facilitate encrypted data communications between presence service 250 and the peers, and to facilitate encrypted data communications between the peers themselves. For example, the identity of a peer attempting to connect as a member to a certain channel may be authenticated before the peer is allowed to communicate with other members of the channel.

According to certain embodiments, presence service 250 comprises communications component 255, which is configured for managing communications between system 205, presence service 250 and other peers in a P2P network. According to certain embodiments presence service 250 may also include the following data-repositories: users-database 260, online-database 265, and registrations-database 270. Users-database 260 contains entries corresponding to users and/or peers which are registered to, or provided access to the P2P network. Users-database 260 may contain authentication information and security information of the registered users in order to provide a log on facility. For example, one peer (e.g. a channel owner or administrator) attempting to authenticate another peer requesting to join a channel, may contact presence service 250 to query the users-database 260 in order to authenticate the identity of the peer which is attempting to join a channel.

According to certain embodiments, online-database 265 contains a list of peers which are currently connected (i.e. online) to the P2P network. This list is updated after peers join and leave the network. Each such entry may contain address information (e.g. an Internet protocol (IP) address) of the peers. The entry may also include contact information of the connected peers, which may be needed in order to communicate with a peer. For example, the online-database 265 may hold IP addresses and port addresses in case of TCP/IP communications.

According to certain embodiments, registration-database 270 comprises entries for each existing channel in the P2P network. Registration database 270 is updated with information regarding the creation and cancellation of channels in the P2P network. Each channel represented in the registration-database 270 may include information with regard to members of the channel and optionally other information such as, for example, information indicating which members were invited to subscribe to the channel and which members have requested to join the channel. Consider for example a peer that wishes to update its files which are associated with a certain channel. In response to the request, channel manager 230 may be configured to receive from presence service 250 contact information of members of the relevant channel that are currently online. This information may be utilized for creating the channel overlay, if needed for communicating with these members and updating the revision history log, and the files stored in association with the peer. This may be accomplished by utilizing information stored in e.g. registration-database 270 and in the online-database 265.

Figure 3:
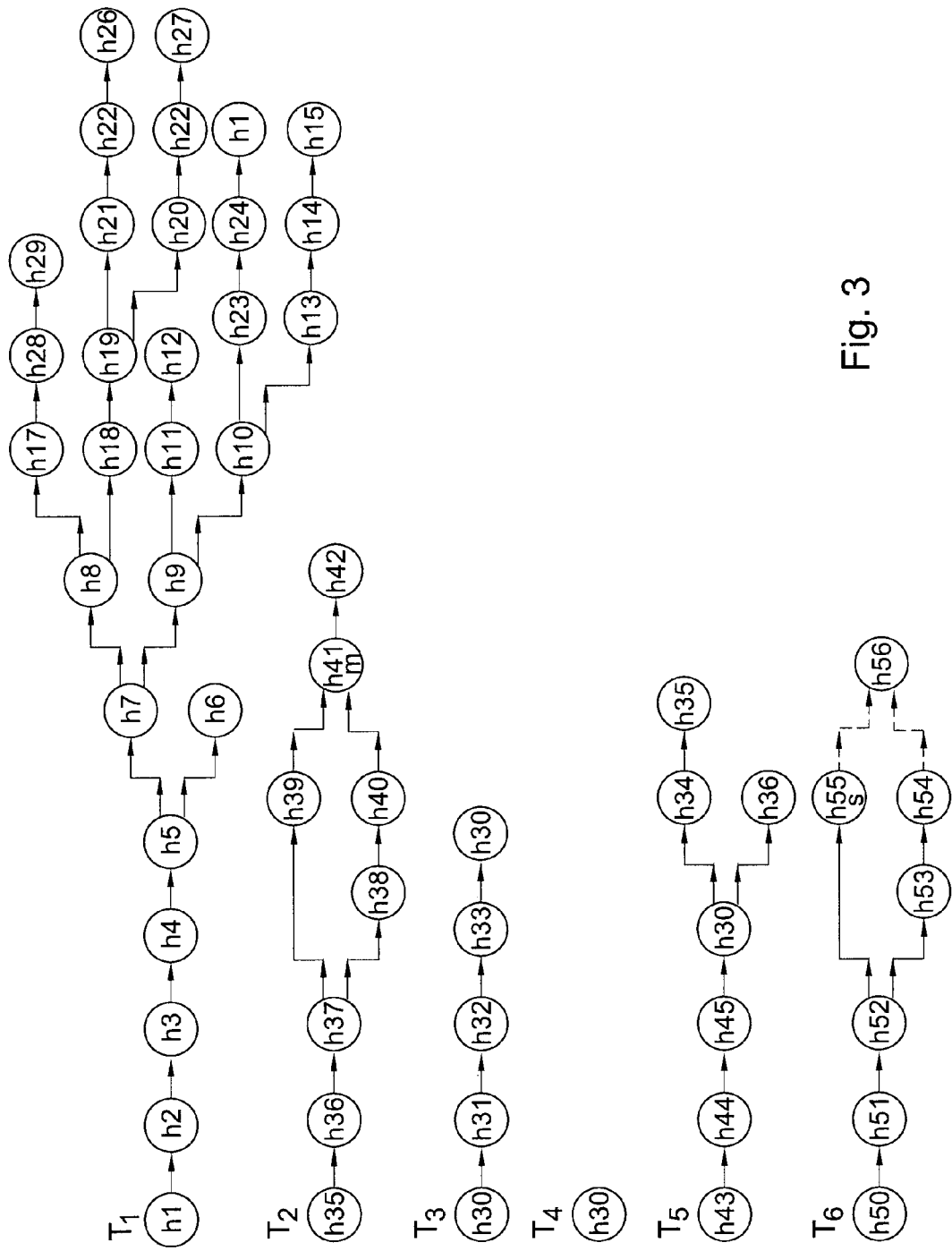
FIG. 3 illustrates examples of version history logs, in accordance with an embodiment of the invention.

Turning now to FIG. 3, this illustrates examples of a revision history log, in accordance with an embodiment of the invention. In the following discussion the revision history log examples in FIG. 3 are utilized to demonstrate features of the invention. FIG. 3 includes 6 hierarchical trees or directed graphs denoted T1, T2, T3, T4, T5 and T6, each illustrating different examples of possible representations of scenarios and situations in the revision history log. In some embodiments, T1 to T6 ("T1-T6") may be implemented as a single unified data entity, while in other embodiments they may be implemented as 6 separate data entities. Each vertex in T1-T6 shows a content hash-code which was computed for a respective revision. It should be noted that FIG. 3 is given as an example and should not construed as limiting. As would be apparent to any person skilled in the art, revision-entries as illustrated in FIG. 3 show only part of the information which is stored in an actual entry.

For clarity and readability, in the explanation of the following examples, hash-codes designated as 'h1', 'h2' and so forth as content hash-codes. However, in other embodiments, metadata-hash codes may be used, in addition or instead of content-hash codes, for tracking revision entries within progression paths.

T1 shows an example of a part of a revision history log which corresponds to a given earliest known file F1. Initially, a contents hash-code h1 is computed from the content of the original file F1 (i.e. earliest known revision). A revision-entry is created for this file, containing its current content hash h1 and additional metadata in respect of the file (such as e.g. revision identifier(s), file name, creation time, most earliest content hash in the history log etc). Later, the file content and/or the file metadata of F1 are modified as a result of modification events. According to certain embodiments, when modification events take place, if the file content is modified on the file system, a new hash-code h2 is computed for the content of the new file version, and a new revision-entry is created. Similarly, if metadata hash code is used, a new revision-entry may be created when metadata is modified on the file-system, and a new metadata hash code may be computed and stored within the new revision-entry. The new revision-entry includes the new hash-code h2 of the new content and/or metadata, and is linked to the previous revision-entry which includes hash-code h1. Subsequent revisions of the file are recorded in the same manner, as indicated in element T1 in FIG. 3, which demonstrates a progression path extending from h1 to h5. It should be noted that modification events may result in the creation of a new revision-entry even if the content of the file remains unchanged, as explained in detail below.

A characteristic of the configuration of the revision history log, as disclosed in the present invention, is that a file may branch into a number of progression paths. This may occur in various situations, which are especially common in the context of a file sharing environment. For example, two or more subscribers to the same channel may each change a given an instance of the same shared file while offline, and then become online. In yet another example, a single user may login at different occasions to different offline nodes and modify an instance of the same file stored in each node (e.g. a user may edit and modify a file at work and then modify another copy of the same file at home, without an update between the computer at home and the computer at work). According to certain embodiments of the invention, after being updated, a revision history log will contain revision-entries for the new revisions created by the two users or by the same user in different nodes. Or as mentioned above, a split into multiple progression paths can occur when a user requests to revert a file to one of its past-revisions, and then continues modifying that file, resulting in a new progression path branching from the selected past-revision.

This scenario is illustrated in FIG. 3; see for example revision-entry h5 which branches into two progression paths, one continuing with h7 and the other with h6.

T1 is an example showing an initial progression path which forms the basis for 7 progression paths, running from one earliest known revision-entry (containing h1), to 7 revision-entries, each representing (in this example) a different current-revision of the same file (represented here as revision entries containing h6, h15, h1, h12, h27, h26 and h29). Each of these progression paths represents a different revision of the file, where there are currently seven different progressions.

In this example, each progression ends at a current-revision-entry representing an alternative, but current, version of the file. Thus, in the proposed invention, all of these versions are considered valid, and no conflict resolution is required to determine which version is inferior or superior to another.

This is contrary to operation of common synchronization and revision control systems, which are typically configured to initiate a conflict resolution process when there is more than one available current-revision to a given file, e.g. in case two different users have changed the file in two different manners. Common revision control systems in a file sharing environment, and P2P based file synchronization systems, typically require one or more users to resolve such a conflict, or the system may attempt to resolve the conflict automatically, according to some conflict resolution policy. Unlike the revision control system disclosed herein, regardless of the specific conflict resolution method used in such prior art methods, not every instance of the file is maintained and considered as part of the progression path of a file, as some instances are typically discarded, e.g. as a result of a conflict-resolution process.

Another characteristic of the configuration of the revision history log, as disclosed in the present invention, is that it may also enable to associate between files which are exact copies and have different file names, which are typically considered by the file system as two unrelated files. As each file is represented in a revision history log by a corresponding revision-entry, and each revision-entry contains the content-hash and/or metadata hash-codes of the corresponding file, files are not only tracked by their filename (or a different identifier), but also by their actual contents and/or metadata. Thus, in case the content hash of the two (or more) revisions is found to be identical, the relationship between the two revisions can be detected. The two revisions, when changed, may retain a separated progression path, which is recorded in the revision history log. It should be noted that in some embodiments, multiple files having identical content may be associated with a single revision-entry, and the revision-entry may be associated with a list of file names of all relevant files.

Detecting a relationship between two revisions is beneficial for many purposes. For example, consider when a first file is copied by a user to another location in the reference area, e.g. in order to provide a backup copy of the first file, the relationship between the first and backup file can be used to show the history of the backup file by retrieving the progression path(s) of the first file. Another benefit resulting from the ability to associate between different revisions having identical content is the ability to reduce storage space. Such reduction in storage space can be achieved, for example, by associating all revision-entries representing revisions with identical content, to a single copy of the content stored in the storage space, instead of maintaining a copy for each revision. According to certain embodiments, revision engine 110 is configured to identify when a new revision is created in the reference area, calculate its content hash-code, compare it to existing content has-codes recorded in the revision history log and determine whether other revisions comprising identical content are already recorded in the history log.

FIG. 4 is a flowchart 400 showing operations of a revision history log update, in accordance with an embodiment of the invention. As explained above, file revision engine 110 comprises a revision manager 115 which is configured to create and manage a revision history log in respect of files and folders which are being monitored by file revision engine 110 in revision control system 100. According to certain embodiments the revision manager 115 is configured to perform the operations described herein with reference to FIG. 4, which illustrates operations that take place in response to the identification of a modification event. Modification events include, but are not limited to, modification of content of a file, renaming a file, deletion of a file and creating a new file.

In stage 410 a modification event is identified. According to certain embodiments, revision manager 115 is notified of a modification event either by file-system monitor 120, or by a user. Alternatively or additionally, modification events may be identified by actively searching ("scanning") for such events in the file-system. Commonly used file-systems (or operating systems) typically enable a file-system monitor to obtain a file identifier used by the file-system (e.g. full path name or a file ID number) of the file that has been modified, for example, via a suitable system-call, API, system-function or by subscribing to an event-dispatcher, according to the characteristics of the implemented operating system. Often, an indication of the specific type of modification event is also obtainable from the file-system. In the less common scenarios where the type of modification event is not directly available, modification events may be deduced based on the metadata of the file, the current-revision and/or the relevant revision-entries available from the revision history log, or a combination thereof. For example, when scanning files for modifications, if a file is computed to yield a content hash-code different from the one in the current revision entry representing this file on the file system, it indicates the file has changed and may trigger a modification event. In some embodiments, revision manager 115 is also configured to verify that a notification of a modification truly represents a modification of the file, unlike for example an "access operation" which in effect does not change the content or the metadata of the accessed file, and therefore in most cases can be ignored.

As mentioned above, a modification event may result in the creation of a new revision of a modified file. Additional metadata in respect of the modified file are usually also obtainable from the file-system (e.g. via file-system monitor 120 or directly from the file-system or the operating system). For example, the time the modification event occurred, the name of user who modified the file, security information such as security descriptors in NTFS file system, hash-codes pertaining to the file, etc. According to certain embodiments, stage 420 comprises receiving additional metadata in respect of the new revision of the modified file, from the file-system or operating system, once a modification event has been identified. If content hash-codes and metadata hash-codes of the new revision are not available from the file-system or operating system, they may be calculated from the content of the file. Thus, after stage 420 is completed at least the following information is available with regard to the modified file: a unique identifier of the modified file, and if needed the updated content of the file and calculated hash code(s).

According to certain embodiments, in the following stage 430 the relevant revision-entry is obtained from the revision history log (e.g. by revision manager 115). The "relevant revision-entry" is an existing revision-entry corresponding to the revision upon which the modification event, giving rise to the new revision, was implemented. The revision-entry can be located based on any type of available identifier (or combination of identifiers) which is available and used for indexing (e.g. as key of) the revision entries within the revision history log.

A revision-entry may be indexed by a plurality of keys, to allow retrieving the revision-entry in different scenarios. Some keys may be unique (at least within the domain of the revision history log as mentioned above), other keys may be substantially unique (e.g. UUID), while yet other keys may not be unique and correspond to several revision entries.

For example, current-revision entries (revision entries associated with current revisions) may be also indexed by the full path of the corresponding revision and/or content hash-code and/or metadata hash-code. Thus, as there is only one current revision-entry in respect of each current-revision in the reference area, in case current-revision entries are indexed according to the full path of the corresponding revisions, a current revision-entry may be retrieved for example by searching, from among current revision-entries in a revision history log, an entry which is associated with the relevant full path. In another example, each file on the reference area is assigned with a unique identifier. This unique identifier may be retrieved during stage 420, and be subsequently used to retrieve the relevant revision-entry by its unique key.

In case the modification event is a rename or move event, where an existing file is given a new name and/or a different path, the metadata which is obtained from the file-system, may include both the old file name (or another type of identifier) and the new file name. In case the file was moved between folders, this information may also contain details pertaining to the old folder in which it used to reside, and the new folder in which it now resides. The relevant revision-entry of the modified file can be located based on its keys, including its old path or its content hash-code or any other available identifier as explained above. In case revision entries are indexed only by a content hash-code and a single content hash-code is associated with several current-revision entries, the relevant revision-entry can be located by using the content hash-code together with additional identifiers, such as a path to the searched file name or another available identifier as explained above.

According to a certain embodiment, in stage 440, a new revision-entry is created for the new file revision, and the metadata pertaining to the new revision is computed and allocated to the new revision-entry, including available identifiers of the new revision-entry such as for example, its content-hash.

In case of a delete event (i.e. a file is deleted), there may be other methods of denoting the event, in addition or instead of creating and linking a new revision-entry to the current-revision-entry as described in stages 440 and 450 below. For example, instead of creating a new revision-entry or in addition to it, an indication that the associated file has been deleted may be added to the relevant revision-entry of the deleted file. The deletion indication may be any type of metadata including for example, a specific deletion time stamp and a deletion flag. Alternatively, the entire progression-path may be deleted, and may optionally be stored in an exclusion list, listing the deleted progression paths, for example in order to remember which of the files should no longer be monitored by revision manager 115. The specific manner in which a file-deletion should be handled may be indicated by the policy stored in the revision policy unit 140.

Next in stage 450, the new revision-entry is linked in the revision history log in the appropriate position, so that the new revision-entry becomes the current-revision-entry in a progression path representing the current revision. According to certain embodiments, the new revision-entry is linked to the current-revision-entry of the file, thereby continuing the progression path in the revision history log.

After being successfully linked in the revision history log, the new revision-entry becomes the "current revision-entry" of the file. According to certain embodiments, after the revision history log is updated with a new revision-entry, the process may be either terminated or instead revert to stage 410 to handle a new modification event.

In case of a file-rename event, as an alternative for linking the new-revision-entry to the current-revision-entry, the new revision-entry may be left un-linked, starting in effect a new progression path within the revision history log. More specifically a rename event may be also interpreted as a sequence of "delete" and "create" events. Thus, in some embodiments, revision manager 115 may handle a rename event by executing the operations of a delete event and the operation of a create event.

In a create event, a new file is created on the reference area, revisions engine 110 begins monitoring that file, and a new revision-entry is created for the new revision including at least one identifier (e.g. metadata-hash). In this case, the metadata-hash of the newly created file is associated with the file name of the new revision and the new revision-entry begins a new separate progression path. Thus for example, a rename event can be implemented by creating a new revision-entry that is disconnected from previous revision entries, but contains identical content hash-code and other relevant data as in the revision-entry of the previous revision (before the rename-event). Since identical content hash-code is contained in the new and previous progression path, the two (or more) progression paths of the modified file can be associated and accessed using the same contents hash-code.

See for example elements T3 and T4 in FIG. 3 which demonstrates a possible result of a rename event. T3 represents one progression path where the most recent revision has the content hash h30, while T4 shows another progression path which is separated from T3 and contains only one revision-entry with identical content-hash h30. T4 may thus represent the new revision of the current-revision in T3 after a rename event. Since the content of a file after a rename event, (or a copy operation), is identical to its previous content, even if the new revision-entry is not directly linked to the previous revision-entry, and rather starts a new progression path (as shown by T3 and T4 in FIG. 3), the revision history of the renamed file can be obtained from the revision history log based on the content-hash, and optionally based on other identifiers. For example, consider that a revision history of a revision represented by T4 is searched. The content hash of the relevant file is h30, however, the same content-hash applies to the current-revision in T4 as well. Accordingly it would be possible to associate T4 with T3 and obtain the history of T4 which is available in T3.

To indicate that a folder-rename has occurred, the files and folders residing inside may also be managed to retain their history. Several notations are possible to designate that a folder-rename event occurred. In one example, each of the files and folders within the renamed folder may be represented as having a modification event of "rename", to indicate that the path to each of the files and folders has been modified. In another example, if folders are also represented by revision-entries as files are, then it may be sufficient to designate the folder as "renamed", by creating and associating a new revision-entry to its progression-path. In the two examples described above, the history of files contained within the folder is retained, so that the rename operation does not disconnect the file when identified by a new name from its known history in the revision history log.

According to certain embodiments, in addition to handling modification events as described above, the present invention is directed for analyzing modification events in view of past events and other information stored in the revision history log, and providing interpretation for such operations in respect of the recorded file revision history. For example, revision manager 115 may be configured to identify a revert event. In a revert event, a file may be modified to include an identical copy of the content of a past revision which is recorded on its progression path. According to certain embodiments, revision manager 115 is configured to perform the following operations: Calculate the content hash of the new file (or use the content-hash which was calculated before in stage 440) and compare the calculated content hash with content hash codes which are stored in the revision entries of the revision history log. In case an identical content hash is found in a revision-entry representing a past revision in the same progression path of the current-revision, revision manager 115 may notify that a revert-event has occurred. A revision-entry representing the new revision may be updated to include a notation, indicating that this revision is a result of a possible revert event, and optionally directing to the previous revision-entry in the revision history log.

For example T3 in FIG. 3 where the last (current) revision in the progression path (h30) is identical to the first revision in the same progression path (h30), and thus represents a revert event. In case the identical content hash is found in a different progression path of the revision history log (i.e. the file cannot be located by retracting backwards on the revision history log from the new revision-entry), revision manager 115 may identify that a copy-event has possibly occurred. The revision entry representing the new revision may be updated to include a notation indicating that this revision is a result of a possible copy event and possibly directing to the (one or more) previous revision entries in the revision history log.

Revision engine 110 may also be configured to identify and handle a merge event. Consider two progression paths originating from the same branch and progressing in parallel with different revisions. At some point, revisions corresponding to revision entries in both progression paths may be modified to include the same content. According to some embodiments, revision manager 115 is configured to identify that (e.g. in response to a modification event or by scanning for modifications) the content-hash of two current-revisions-entries in two different progression paths is identical. According to certain embodiments, revision engine 110 may be configured to unify their progression into a single progression path. Revision manager 115 may be configured to create a new revision-entry unifying the two separated revision entries, where the revision history log includes a notation indicating that this revision-entry is a result of a possible merge event. For example, this indication may be implemented with notations on the new revision-entry, or with a notation in the two (or more) previous revision entries of the new revision-entry. See for example T2 in FIG. 3 where two progression paths are unified into a single progression path (h41).

According to certain embodiments, once a modification-event has occurred and was analyzed by revision engine 110 to possibly represent a revert event, a copy event, a surrender event etc., system 100 is configured to indicate this to the user, e.g. via display 160. Thus, the user can be notified about the history of new revisions and the historical connections between new revisions and their past revisions. For example, a message may be displayed on display 160 indicating that a certain file has reverted back to a previous revision, that the contents of a revision were copied to a file, and so on.

By performing the aforementioned recoding of modification events, and maintaining a revision history log, the proposed system can also associate previously unassociated files in the file-system. According to certain embodiments, revision engine 110 is configured to associate between revision-entries representing files which are not necessarily associated in the file-system and to perform a variety of operations in respect of the associated revisions, for example: show all copies of a certain revision, copy to another storage location redundant copies of certain revisions, remove from past-revisions repository 135 such redundant revisions, open relevant revision locations in an operating-system Shell environment (e.g. Windows Explorer—explorer.exe—on Windows operating system), retrieve revisions modified by a certain author, retrieve revisions modified within a certain timeframe and so on. Some of these operations and associations can be achieved for example by utilizing a content hash-code for comparing between the content of different revision entries within a revision history log. According to certain embodiments, these operations can be managed and performed by a user with the help of user interface 150 and display 160.

According to certain embodiments, revision engine 110 is configured to perform additional operations in response to a command, using the data and information contained in the revision history log or in respect of it. Such operations include, but are not limited to revert, replace, surrender and merge. Previously it was described how the revision engine can analyze a modification event and thereby associate these events with other operations, while here these operations are executed in response to a specific command. Commands may be issued automatically, or by another system interacting with system 100, or by a user via e.g. user interface 150.

In response to a revert-command, revision engine 110 (e.g. via revision manager 115) utilizes available information from the revision history log, and possibly also from past-revisions repository 135, to replace contents and/or metadata of a file with one of its past-revisions. The revert-command may indicate a specific past-revision that is requested and possibly the type of data that should be retrieved (e.g. content, metadata, etc.). Past-revision-entries may be identified by some type of unique identifier as described above and these identifiers may be used for retrieving a specific past-revision-entry. In some embodiments, a command may be issued in respect of a specific current-revision-entry. For example, a revert-command may include a current-revision in which the data should be replaced. In other embodiments, a command may be issued without specifying a current-revision. Revision engine 110 may obtain a past-revision from past-revision repository 135, if available, and replace the relevant data (e.g. part or all of its content) of a file corresponding to a current-revision (e.g. in the file-system) with the respective data of the past-revision, ultimately creating a new revision containing part or all of the data of the part revision. Instead or in addition to replacing data in an existing revision, revision engine 110 may be configured for creating a new revision with the data retrieved from the past-revision.

According to certain embodiments, the creation of a new revision on the file-system in response of a revert command, may trigger a modification event which will eventually create a new revision-entry for the new revision, indicating that this revision is a result of a revert event and optionally directing to the past-revision-entry in the revision history log. According to certain embodiments the new revision-entry is linked to the revision history log in the appropriate position as explained above.

In response to a replace-command, revision engine 110 (e.g. by revision manager 115) utilizes available information from the revision history log, and may also use past-revisions repository 135, and/or the monitored file-system 125, to locate a requested past-revision or current-revision. A replace-command is similar to a revert-command; however, it is not limited to one of the past-revisions of a current-revision but may include other revisions as well.

In response to a merge-command, two or more progression paths ("merged progression paths") are converged by revision engine 110 (e.g. by revision manager 115) to form a single revision-entry ("merged revision-entry") which continues the merged paths in one progression path. According to certain embodiments, a merge-command may include a specification of the two or more progression paths to be merged and a specification of an existing revision-entry which is designated to be the merged revision-entry. Thus, a merge-command may include one or more identifiers for identifying the different revision entries to be merged (or progression paths). According to certain embodiments, a new revision-entry is created in order to serve as the merged revision-entry for the merged progression paths. The merged progression paths are then linked with the merged revision-entry, to indicate that they now converge into a single merged progression path. Alternatively, another notation may be used within the revision history log to indicate that certain paths are now merged, provided that the notation sufficiently identifies the merged paths. According to certain embodiments, a merge-command may include data to be incorporated in the merged revision-entry e.g. file contents data, file metadata, or a combination of the above. In case the merged revision-entry is associated with a revision stored in the past-revisions repository, a merge-command may trigger a "replace operation" in order to retrieve the relevant data from past-revision repository 135 and store it in repository 125 to ensure that the merged revision-entry is associated with a revision on the monitored file-system 125.

In response to a surrender-command, one or more progression paths are designated by revision engine 110 (e.g. by revision manager 115) to be discontinued ("surrendered progression paths") in favor of one progression path ("preferred progression path"), once a new revision-entry is available in the preferred progression path. Unlike a merge-command, at the time a surrender-command is executed, there is no need to indicate a preferred (or winning) revision. According to certain embodiments, once a surrender-command is executed, a preferred progression path is monitored by revision engine 110 and once a new revision is available continuing the preferred progression path, the surrendered progression paths all converge (e.g. are linked) with the new revision-entry corresponding to the new revision on the preferred progression path. The surrendered progression paths may be updated to include an indication that these are surrendered progression paths.

A surrender-command is exemplified in T6 of FIG. 3, where a progression path containing h55 (marked with an "s") is surrendered in favor of a progression path containing h53 and h54. When a new revision is available continuing h54 into h56 (the new current-revision-entry for the file), the surrendered progression path containing h55 may also point to (continue into) the new revision-entry h56.

As further explained below, the reference areas containing files and folders and their revision history logs on one peer, may be compared with the reference areas of other peers, also containing files, folders and revision history logs of the same channel. When such a comparison determines that there are revision-entries that need to be updated by one peer, an update process may begin between that peer, and at least one additional peer in the overlay.

FIG. 5 is a flowchart showing operations of an update cycle in the context of a P2P network, in accordance to an embodiment of the invention. As explained above with reference to FIG. 2, revision control system 100 may operate in the context of a P2P network, where a revision history log, current and past-revisions of files and folders stored on one node in a P2P network, may be updated and synchronized with the revision history log, current and past-revisions of files and folders stored on other nodes, which are peers in the same network, or more specifically, members of the same channel.

In the context of FIG. 5, an "update cycle" is the process of receiving information with regard to available updated revisions of files or file parts, and folders in a channel, and optionally using this information in order to obtain part or all of the new revisions from other members of the channel. This process allows members of a channel to comprise a substantially-identical revision history log, and ultimately to obtain the available revisions of files and folders which are stored on the reference areas of other nodes which are associated with the specific channel. Thus potentially, all members of a channel may have the same exact copies of revisions, files and folders.

In the first stage 510 an update cycle is initiated. According to certain embodiments, the update cycle may be initiated in response to various events. An update cycle may be initiated manually in response to an explicit manual request of a user, e.g. via user interface 150. Alternatively or additionally, an update cycle may be initiated automatically according to a predefined policy. For example, an update cycle may be initiated according to a predefined schedule, or it may be initiated in case a member of a channel was disconnected from the channel overlay for a predefined period of time. According to some embodiments, the conditions and policy for initiating an update cycle may be stored in the channel configuration unit 235.

According to certain embodiments, in stage 520 in response to the initiation of an update cycle, an update-query is issued. The update-query is a "pull" type communication, in which a member (originating member) of a channel searches for updates from other members of the same channel. An update-query may include different criteria defining the query, for example, which entities (e.g. specific folders and/or files) are being investigated, the date of the last update made by the originating member, known contents hash codes for the entity, known metadata hash codes for the entity, partial or full progression-paths known to the originating member, and so on. In case the update-query does not specify criteria, a default criteria may be used, e.g. to retrieve all updates since the last update. According to certain embodiments, the network revision control system 210 may be configured to issue outgoing update queries via P2P engine 240. Such queries may be issued, e.g. in response to a predetermined condition specified in the channel configuration unit 235 which has been fulfilled. An update-query propagates through the channel overlay, possibly to all members of the channel, or to part of the members, according to the specific overlay geometry and technology used. Where a single member is linked to more than one other member, updated queries may branch into different propagation paths.

In response to an update-query, members of the channel which receive the update-query, check whether any relevant updates occurred in their revision history log, and in case such updates occurred, they send a "update-response" back to a querying member. A update-response is a message indicating that one or more updates occurred by one or more members of the same channel, and thus one or more new revisions are available.

According to certain embodiments, the update-query continues to propagate through the channel overlay until it fulfills some type of a predetermined condition, for example it has reached a predefined number of members, it has fulfilled an overlay property (for example, exhausting a certain number of DHT lookups) or it has expired. For example, an update-query may include a counter configured to countdown and indicate discontinuation of further propagation of the update-query when it reaches zero. Another such example is the use of a timer, where an update-query is given a limited life-time and the update-query is configured to expire once its life-time is over.

According to certain embodiments, an update-response may comprise a set of data elements, which enables a receiving member to identify the type of modification(s) that occurred, to create one or more new revision entries and to associate the one or more new revision-entries with the correct location within its revision history log. For example, an update-response may include part or all of the following: metadata of any new file revisions and/or folder revisions including the hash of the modified contents and modified metadata, relative paths of any new file revisions and/or folder revisions, identifiers pertaining to the new revision, information about full or partial progression-paths modified on a certain member or members, and possibly the entire revision history log.

According to certain embodiments, the communicated data in an update-response should be sufficient to correctly associate the new updated revision entries received to the relevant existing revision-entries within the responder's revision history log. In some embodiments, for a single new revision-entry, the communicated data in an update-response may include, for example, a unique parent-ID identifying the predecessor revision-entry in the progression path. In other embodiments, the communicated data in an update-response may include a unique ID identifying the progression-path containing the new revision-entry, or an ID identifying the "earliest-known" revision-entry (corresponding to the earliest revision) in the progression-path containing the new revision-entry.

Thus, for example, in order to indicate that a certain progression path has new revision entries, it is sufficient to communicate one or more identifiers of the new revision entries, or the actual contents of new revision entries, together with data indicating where the new revision-entry should be located (e.g. by providing parent-ids and/or progression-path ids they relate to) in the revision history log. According to certain embodiments, if the information received in an update-response is insufficient in order to associate the new revision with the revision history log, (e.g. the provided parent-id is not found in the revision history log of the querying member) a new update-query may be initiated for retrieving the missing information.

Instead or in addition to being triggered by a query message, a message indicating an available update may also be the outcome of "push" type communication, initiated by another member of the channel. This type of message is referred herein as an "update-message". In some embodiments, a member of a channel which has updated one or more of its monitored files or folders (or due to another reason) may send an update-message to members of the same channel informing that an update occurred and new revisions are available. Thus, in some embodiments, the update cycle may begin in stage 530 after an update-message is received by a member. According to certain embodiments, in response to an update of a revision history log, (e.g. in the case revision engine 110 has processed modification events) channel manager 230 may send an update-message via P2P engine 240 to other members of the channel.

As both update queries and update-messages are typically initiated by one member and transmitted to a plurality of members in a channel, both types of messages may propagate through the overlay in a similar manner. Various methods of transferring messages from one ("originating") member to other ("receiving") members in a channel overlay are known in the art, and therefore they will not be discussed herein in detail. In principle, depending on the type and geometry of the channel overlay, messages may be transferred to one or more members of the same channel. One example is typical to an "unstructured overlay", where transferring messages is performed to members which are immediately connected to the sending member via the channel overlay. In an example commonly termed in the art as "expanding ring" method, messages may be continuously forwarded to further connected members in the same channel overlay and thus it may propagate through a part of the overlay, or possibly through the entire channel overlay.

In other geometries, such as exemplified by structured-overlays and DHT-based overlays, messages may be forwarded to specific members of the channel, for example, to members functioning as "super-peers", to members that satisfy a certain P2P-overlay condition, to members that are assigned with a role to contain the specific information transferred in messages, and/or members that satisfy a certain distance-function. In P2P networks, the term "super-peer" commonly refers to a peer that has elevated status, for example due to being connected for a long period of time, and/or having sufficient bandwidth, which therefore can be used by peers in the P2P network in situations that require higher persistency of data and accessibility than when interacting with peers that are not elevated to "super-peer" status. Super-peers are discussed in length in Buford, Yu and Lua (2009, pp. 12, 37-38, 55-56f, 63-64, 129-131, 153).

According to certain embodiments in the next stage 530, update-responses may recur along a return-path, so that each of the members originating an update-query receives a response, possibly with added results from each peer along the return-path of the query. During its propagation back to the originating peer through the channel overlay, an update-response may undergo a modification and enrichment process in order to eventually include the most updated information available to members in its path. As the update-response propagates back through the overlay to the originating member, it may pass through other members. Such members ("receiving members") therefore receive an update-response, and may then compare their own revision history log (with the assistance of revisions manager 115) to the information within the incoming update-response. The comparison may indicate that the current state of revision history log of a receiving member is less updated, more updated, or equally updated in comparison to the revision history status which is apparent from the update-message. According to one embodiment, in case the update-response proves that the state of the history log of the receiving member is less updated, the receiving member updates a list of available updates and may send the update-response to the other members (e.g. in an unstructured overlay, to peers which are directly connected to it). Thus, an update-response which was triggered by one member issuing an update-query may be used to update many members in a channel.

According to another embodiment, in case the update-response proves that the revision history log of the receiving member is more updated, the update-response may be enriched with the more updated data, so it comprises the more updated data which is available from the receiving member. The revised update-response may be then sent from the receiving member to other members for further propagation in the network.

According to a further embodiment, in case data in the update-response indicates that the update-response is equally updated as the revision history log of the receiving member, the update-response may be kept without any change. According to yet another embodiment, the update-response and the revision history log of the receiving member may both have non-overlapping updated data. That is, the update-response may indicate that there is data which is new in respect of a receiving member, and at the same time, the receiving member may have new data which is new in respect of the most recent update, as it appears from the update-response. According to certain embodiments, in such case the receiving member may update its list of available updates according to data available in the update-response and may also modify the update-response to include, in addition to its original data, the new data which is now available from the receiving member. This way, in effect a more updated update-response is created. It should be noted that an update-message may undergo the same type of comparison and update process, which is described above in respect of response messages, as it propagates to different members of the channel. After being compared and possibly updated, an update-response may be further propagated to other members of the channel based on the propagation return-path of the query message.

To exemplify a case where the revision history log and the update-response have non-overlapping data, consider a case where a member P10 has a file F10 that has been modified offline several times since its last online update. Also consider that in this case, another member P20 has also changed file F10 in a different manner, and propagated this modification to the rest of the members of the channel to which P10 and P20 are subscribed. Then, at a later time, P10 and P20 become online, and P10 may participate in an update-query initiated by P20 asking for updates for F10. P10 may learn, while participating in the propagation path of this update, that it is missing revisions of P20, while at the same time P10 has updates for P20. P10 may then issue a update-response which includes its revisions that P20 is missing, and also update its list of available updates to include the revisions which P20 has. In another example, in case P10 needs addition updates other than the ones provided in the update response, P10 may issue its own update-query to learn more about missing updates regarding F10, in addition to issuing an update-response. Thereby both P10 and P20 are ultimately updated.

It may occur that an update-query which was propagated by different propagation paths, initiated a number of returning update-responses, returning from each path, where some update-responses are more updated or differently updated than other update-responses. According to certain embodiments, such converging messages are modified and updated, at their convergence point, in order to produce the most updated update-message from the collection of all incoming messages. For example, if two update-responses are received by a member, each updated with non-overlapping data in respect to each other, the relevant data from the two update-responses may be merged by the receiving member into a new update-response to now include the relevant data of both messages. Finally, the most updated messages reach the initiating member in the overlay. Once the update-response reaches the originating member in the channel, its revision history log can be updated if needed.

Update-responses (or update-messages) accumulate in the originating member (member who initiated the query), and a list of available updates is created in the originating member, and may be created in other members along the return-path. Available updates are the file- and folder-revisions and/or revision-entries which are missing from the member of a channel. The list of available updates may be stored on a storage device e.g. repository 125, 130 and/or 135 or in the member's node memory.

In some embodiments, the received one or more updates are used for updating the revision history log of the originating member (or optionally any other member that received the updates). New revision entries may now be created and added to the revision history log, representing new revisions which are available on other members and are missing from the revision history log. The revision entries can include an indication that the corresponding revisions are currently not available among the revisions stored in association with the updated node.

The one or more criterions which are used to define the update query can be formulated to request different types of data. For example, an update query may be directed to search for one or more of the following types of data: specific one or more revision entries, specific one or more progression paths, an entire revision history log, revision entries corresponding to current revision only, and so forth. An update query can also specify whether corresponding revisions should be retrieved together with their entries or not. The formulation of an update query can depend on different characteristics of the system, such as available memory, communication bandwidth, processing power and current processing load, the number of members in a channel, the number of members currently connected in the channel overlay, etc. The formulation of the update query can also depend on other factors such as the preferences of the user (or administrator) and the method or algorithm implemented. The exact format of the update query can be configured for example, in channel manager 230.

The update response which is generated in return to an update query is formulated in accordance with the requirements which are specified in the update query.

Once an update response is received by the querying member (the member who initiated the update query), the information in the response is compared with the information which is already available to the querying member. Revision manager 115 of a querying member can be made operable to receive the information in respect of available revision entries from network control unit 210 and compare the received entries with the entries in its corresponding revision history log, to determine whether the received revision entries are missing from its revision history log. In case they are missing, revision manager 115 can be operable to link the missing revisions in the revision history log. In order to do so, revision manager 115 can use information in respect of the previous revision entry of each received revision entry (e.g. using a revision entry unique ID, metadata hash-codes, or by other suitable identifier provided with the revision entry data and identifying its previous revision) and search for revision entries containing substantially-identical information (e.g. identical identifiers) to identify previous revisions in the revision history log. If the previous revision entries are found, revision manager 115 can link a received revision to its corresponding previous revision in the revision history log.

However, it may occur that revision manager 115 is unable to link a received revision to the revision history log, in case a previous revision of a received revision is also missing from the revision history log.

In case revision manager 115 fails to associate a new revision entry in the revision history log in its progression path, it may identify the missing revision entry by using an identifier of the previous revision available with the information obtained with the received revision entry. Another update-query can then be issued, containing a criterion set to retrieve the previous revision entry based on its identifier.

This may occur for example in case the update query is limited to request only updates of revision entries corresponding to current revisions. This limitation can be necessary, for example, in order to reduce network traffic, especially in a crowded channel overlay connected to a large number of users, in situations where insufficient network-bandwidth is available, where network-bandwidth is expensive, etc.

Additional update queries can be repeatedly initiated until all the data which is required in order to link all missing revision entries to the revision history log are obtained.

In other cases, instead of limiting the update query to retrieve only specific revision entries (e.g. corresponding to current revisions) request updates may be formulated to retrieve full progression paths. Such an update query can be issued, for example, in case the previous revision entries of the received entries are missing, as described above. Once a progression path is received, revisions manager 115 can determine which revision entries in each progression path are missing, and add the missing part of the progression path to revision history log.

However, communicating progression paths (and entire revision history logs) may incur significant load on the communication infrastructure and may also result in considerable redundancy of the data transmitted over the network. Therefore, in some cases it is more efficient to request only certain segments of a progression-path.

For example, a first update query may be limited to retrieve available updates in respect of revision entries corresponding to current revisions. When receiving an update-response, revision manager 115 may be unable to associate a received revision entry in the revision history log, in case for example, its previous revision entry is missing from the revision history log as well. When such previous revision entries are missing from the revision history log, a new update query can be generated requesting for a segment of a progression path of the received revision entry. A segment includes information in respect of a plurality of revision entries, and therefore may reduce the amount of transactions required to obtain the list of available updates.

In this example the segment is defined as the part of the progression path from the received revision entry up to the closest junction. A "junction" in this context refers to a revision entry which progresses into more than one progression path. See for example in FIG. 3, in T1 progression path extending from h1 to h29 includes three junctions, h8, h7 and h5. In case the received revision entry in an update response includes revision entry h29, the closest junction would be h8, and accordingly the segment of the progression path to be retrieved would be defined as 'a segment ending with h29' in the criteria of an additional update query. The response update for this update query would extend from h8 to h29. In case more information is still needed in order to link the received revision entries (h8 to h29) to the revision history log, a new update query requesting for the next progression path segment (up to h7) can be generated, sent and processed as described above. This can be repeated until all required data is obtained.

Once the list of available updates is formed, the operation turns to the next stage 540 in which updated files (i.e. revisions) and folders may be retrieved from other members of the channel and/or other peers of the P2P network. It should be noted that there are well known methods of search and retrieval of data in a P2P network which may be implemented during this stage, for more details see for example, Buford, Yu and Lua (2009, pp. 163-181, 183-202).

By comparing and combining data from received updates, the updated revision history log, and the list of available updates, a member obtains information in respect of missing revisions among its revisions, files and folders. According to certain embodiments, in stage 550 it is determined which of the updates within the list of available updates should be retrieved. Files, revisions, file parts and folders may be retrieved based on a predefined policy, which may be configured, for example, in the channel configuration unit 235. Network revision control unit 210 may be configured, for example, to retrieve all new revisions from the channel or only subset of the new revisions, which may be limited by criteria, for example, only to the latest revision, or to revisions modified after a predefined creation date, or to revisions modified by one or more specific members of the channel.

According to certain embodiments in the next stage 560 it is determined from which members in the channel the updated are to be retrieved. Network revision control unit 210 may be configured to communicate with other members within the channel, in order to select members within the channel to which a request for updated revisions, files and folders should be addressed. Members may be selected depending, inter alia, on overlay communication preferences and the availability of the relevant file-parts. Members may also be selected based on further overlay-specific communications between an originating member requesting the update, and other members in the overlay, in order to determine a list of suitable members for sending the revisions, files, folders or file parts. For example, in case a DHT is used in the overlay, DHT-specific communications may be involved to determine the availability of relevant revisions, files, folders or file-parts. Different members of a channel may be addressed by the same single member for updating different files, different folders or different reference areas. According to certain embodiments, different file-parts of a single file may be retrieved from different members of the channel. In some embodiments, retrieval of updated revisions may be limited only to members of the same channel. In other embodiments, peers that are not members of the same channel as the originating member may also be used for the retrieval of updated revisions.

In stage 570 the requested updated files, revisions, file parts and/or folders are retrieved from the selected member or peers. According to certain embodiments, a member requesting to update files, revisions, file-parts or folders may continue and locate additional members having the relevant updates. For example, this is useful when members leave and join the channel overlay, or in case a DHT implemented in the overlay has been updated from the time the update-query was transmitted in the overlay. In case revision-entries include partial hash codes corresponding, for example, to a specific modified part of a file, these partial hash codes can be used to locate and retrieve specific file parts from content sources (e.g. other members in the channel).

According to certain embodiments, the process of updating the files, revisions and folders may continue until all files, revisions and folders which have been designated for retrieval have been successfully retrieved. The updating process may be terminated before completion, for example, in response to an explicit user request, a policy configuration (e.g. configured within channel configuration unit 235 and controlled by channel manager 230), and/or by another process requesting it to stop. The updating process may also be terminated by overlay maintenance considerations such as for example, overlay bandwidth overload, insufficient members containing requested file-content parts, and/or by local considerations of the node, such as insufficient storage space on a local repository, etc. According to other embodiments, retrieval of the files may be fully controlled by the user where only new revisions which are explicitly requested by the user are retrieved from other members of a channel. According to certain embodiments, the returning update-response or update-message may include, in addition to the updated revision history log, the updated files, revisions and folders themselves. Thus, the revision history log update and the file and folders update may be completed in a single operation.

The retrieved files, revisions and folders are stored in the member's data-repositories. According to certain embodiments, files and folders which correspond to current-revisions are stored in data-repository 125, in order to be monitored by the file system monitor 120. Other retrieved files, revisions and folders corresponding to past-revisions may be stored in the past-revisions repository 135.

According to certain embodiments, after a revision or a part of a file-revision is successfully retrieved, it is checked e.g. by computing its contents hash code and comparing it with the content hash of the corresponding revision-entries in the updated revision history log. When one or more revision is successfully retrieved, the received revision is placed in its designated repository. If a past-revision has been retrieved, it may be stored within the past-revisions repository, e.g. by network revision control unit 210 interacting with revision engine 110 which is configured to store the revision within data-repositories 125 or 135, and store the revision metadata and/or revision location in respect of the revision history log within data-repository 130. If a current-revision (file) is successfully retrieved, it may be stored within the monitored file-system (e.g. in the reference area), e.g. by directly placing the files and folders in repository 125 or alternatively by network control unit 210 transfer to revision engine 110 the revision contents and/or revision metadata and/or revision location in respect of the revision history log, e.g. using a replace-command.

According to certain embodiments, once one or more revisions are retrieved, their corresponding revision-entries are created and linked to the revision history log in the appropriate location, if not already linked in a previous stage. If a new current-revision is stored within the reference area, the corresponding revision-entry is created and linked to the revision history log, if not already linked in previous stage. According to certain embodiments, if a revision-entry of a new revision is not yet available on the peer, the revision-entry is created (e.g. by revision manager 115). A linked revision-entry contains the relevant metadata in respect of the corresponding revision.

After process 500 is completed the updated revision history log is consistent with received revisions. At the end of the process, the updated revision history log comprises information in respect of existing revisions within the peer, and possibly also information in respect of revisions existing on other peers and members. In other words, in summary, by receiving message-updates and receiving update responses, system 205 provides members with information regarding modifications occurring on other members, and potentially also provides the modifications and updates as well. This information facilitates the system as a distributed revision control system, in which peers can be aware of modifications occurring on other members, thus providing them with knowledge about activities of other members in regard to monitored files and folders in channels, as explained above in length.

Figure 6A:
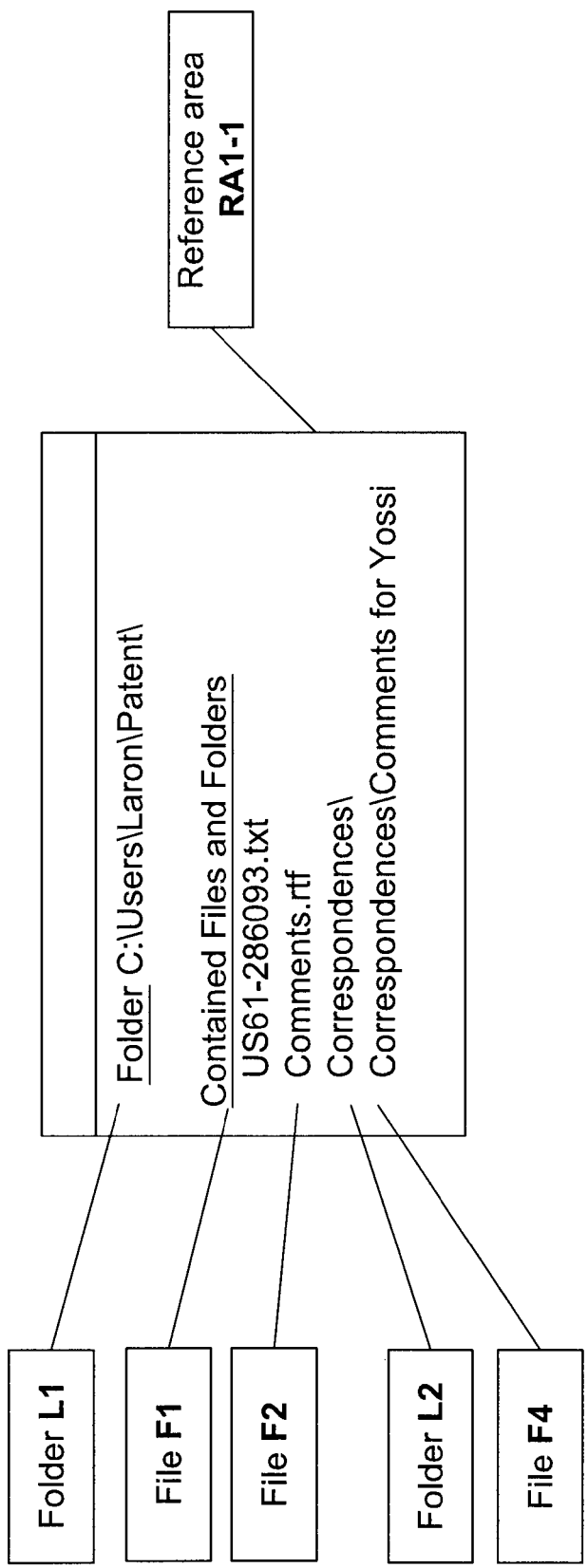
FIG. 6A-FIG. 6N and FIG. 6P schematically illustrates a reference area and revision history logs shown for the purpose of demonstrating the operations of a revision control system, in accordance with an embodiment of the invention.
Figure 6B:
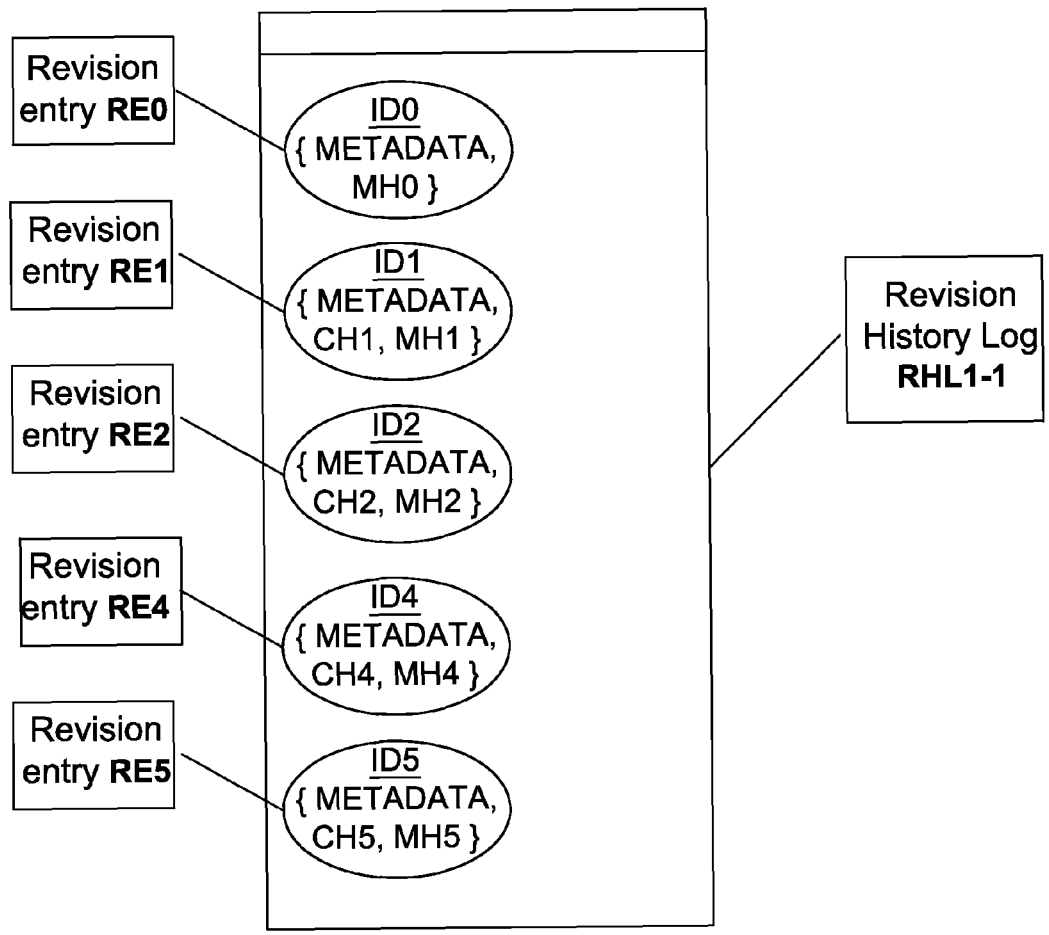
Figure 6C:
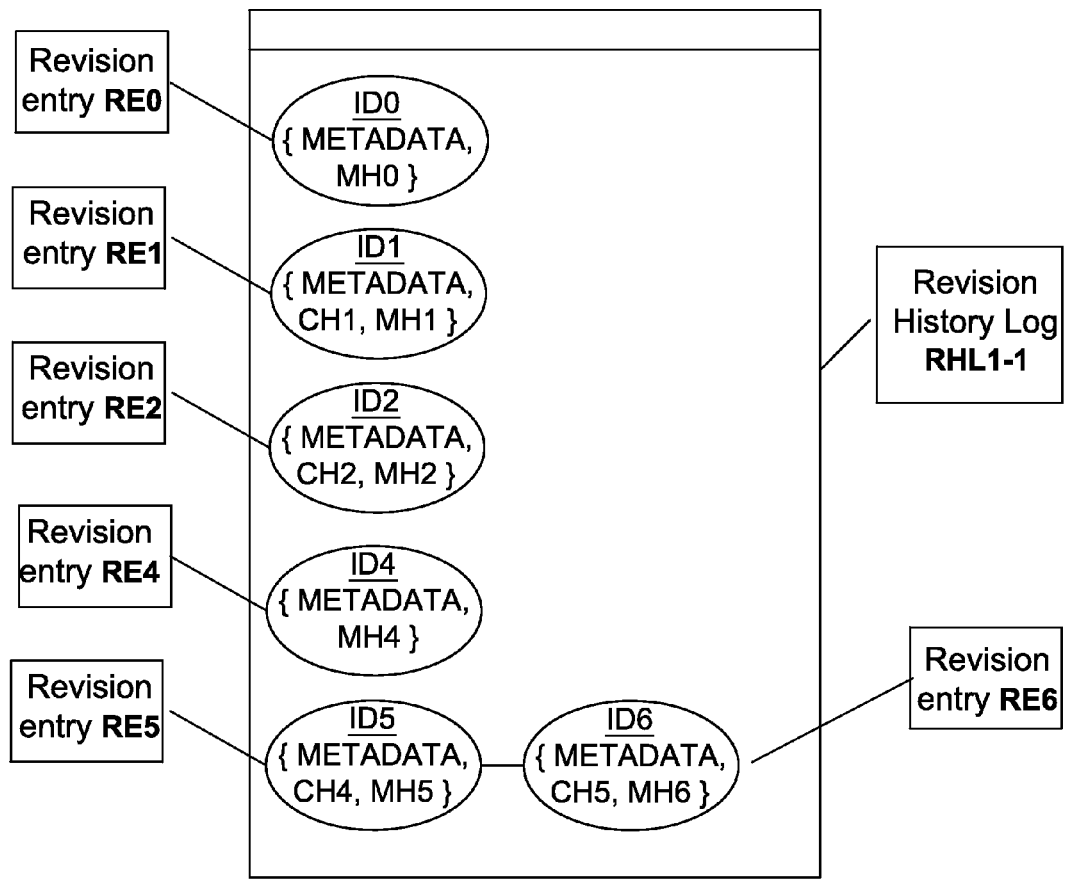
Figure 6D:
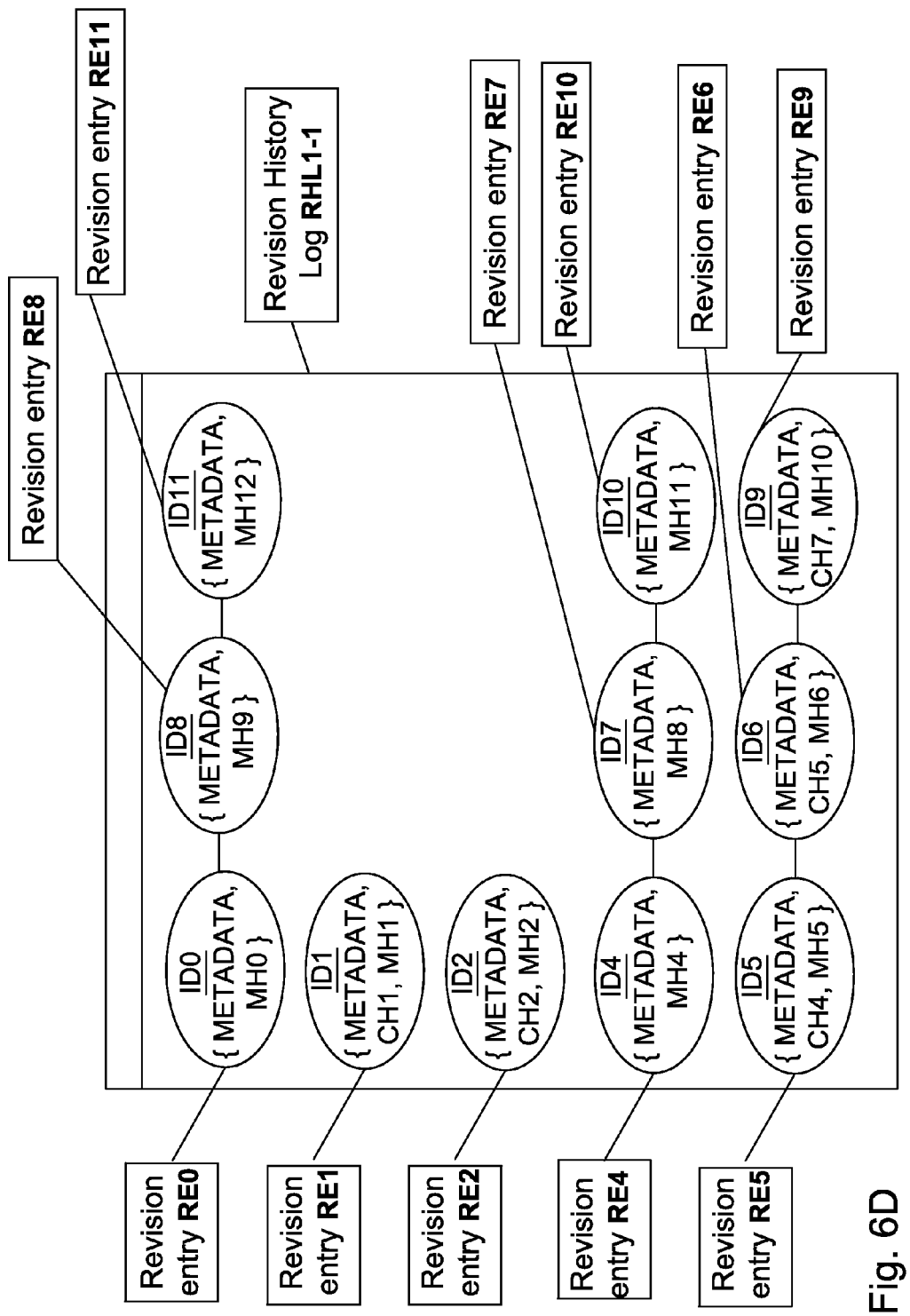
Figure 6E:
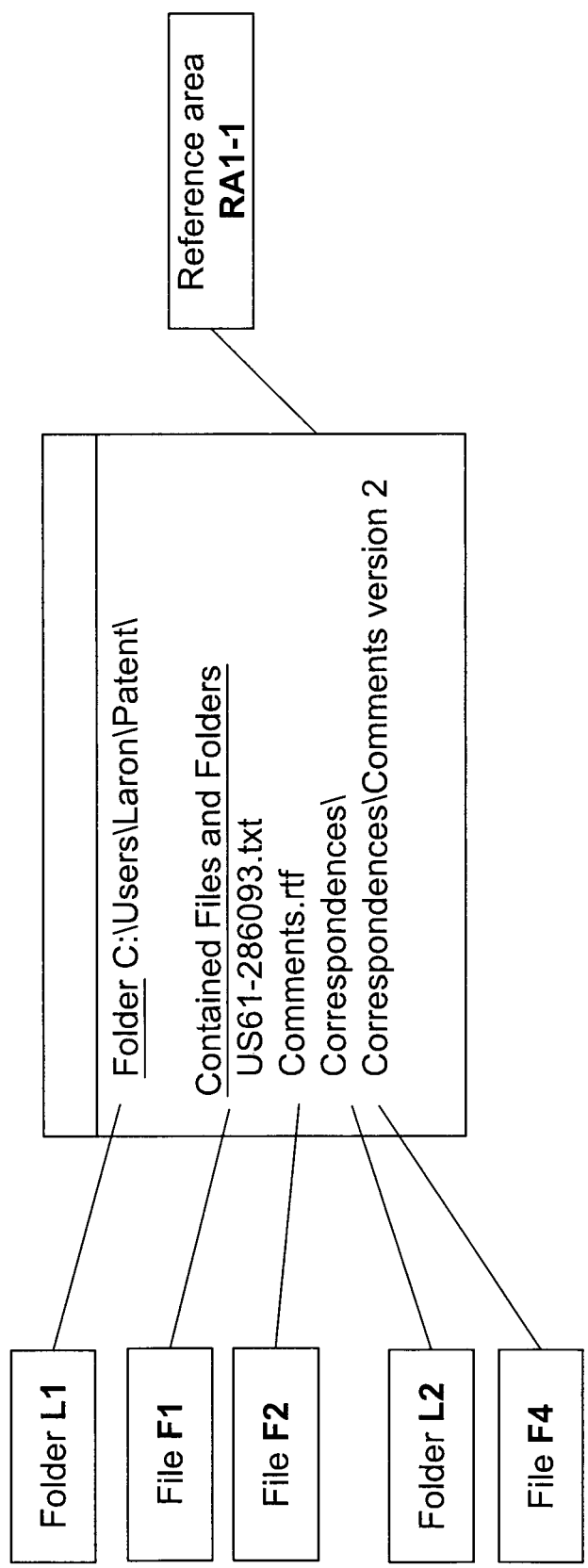
Figure 6F:
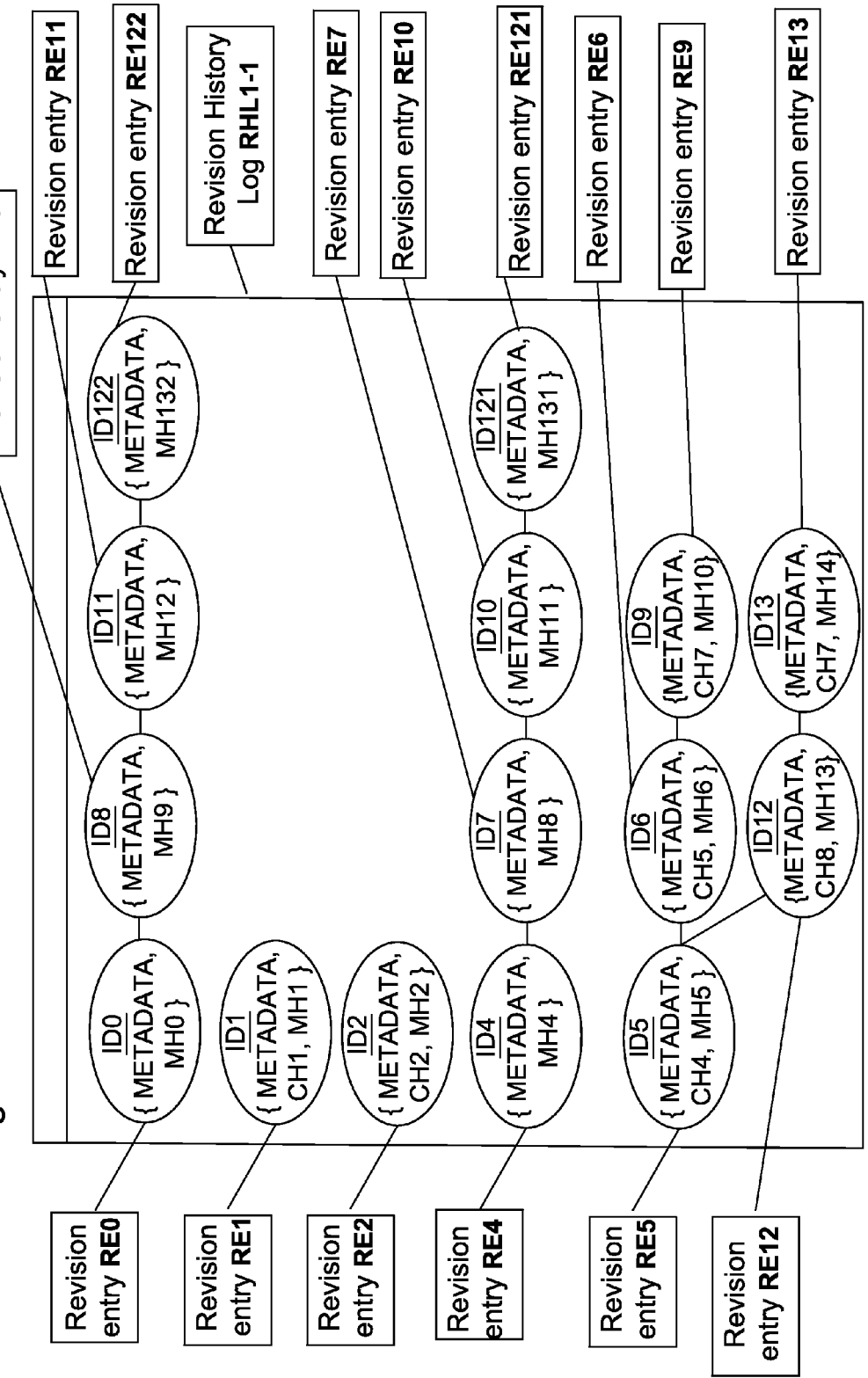
Figure 6H:
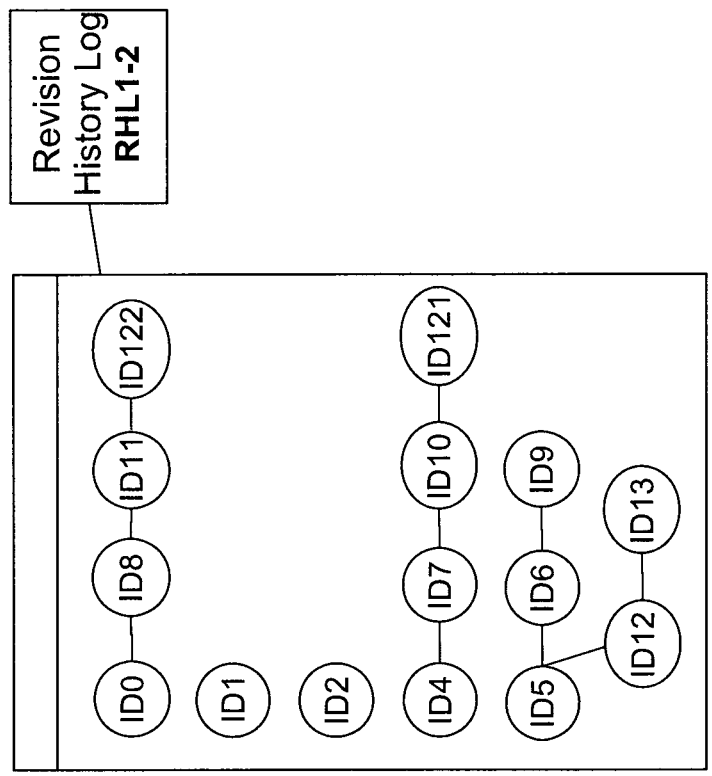
Figure 6G:
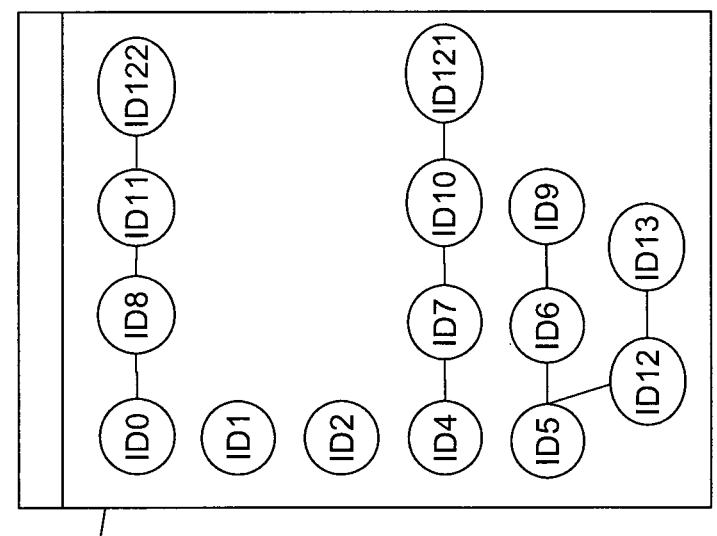
Figure 6J:
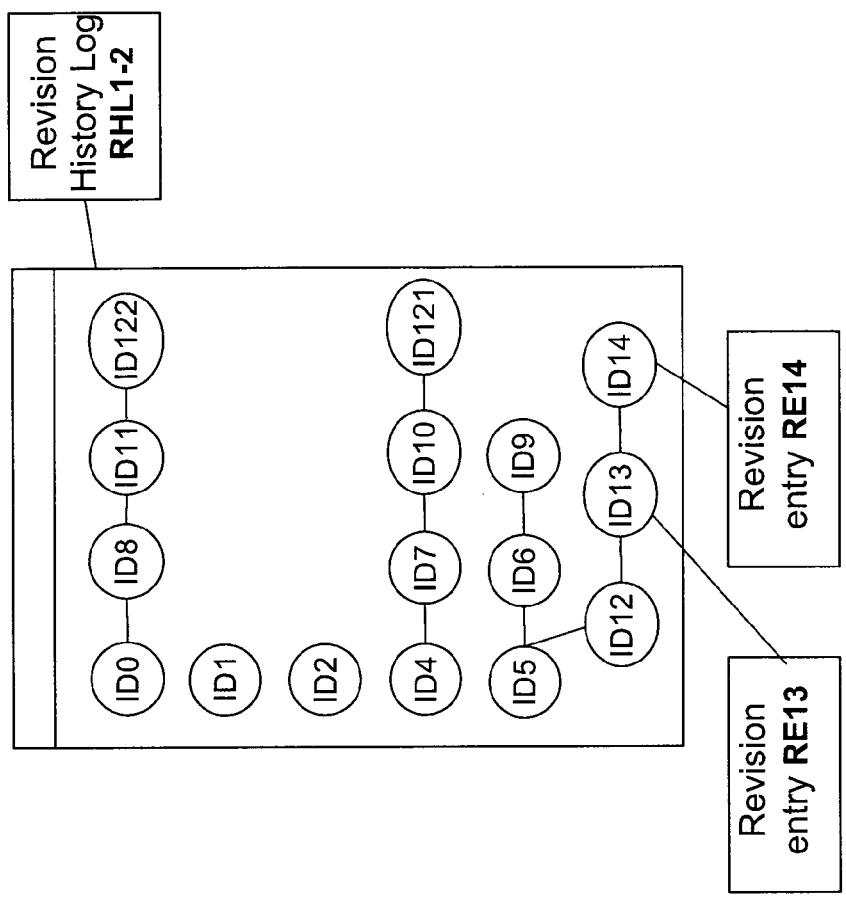
Figure 6I:
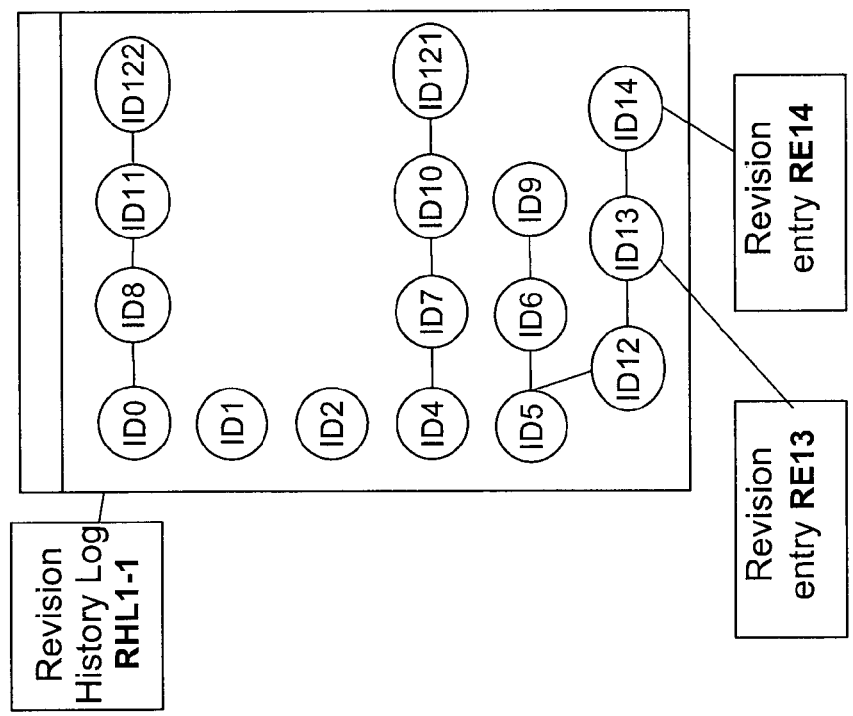
Figure 6L:
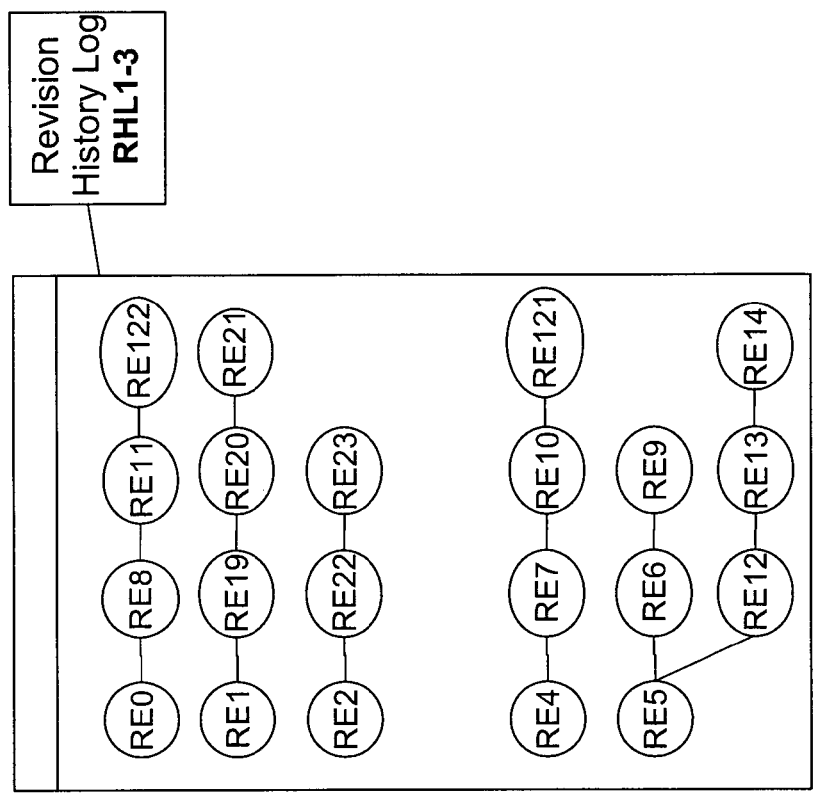
Figure 6K:
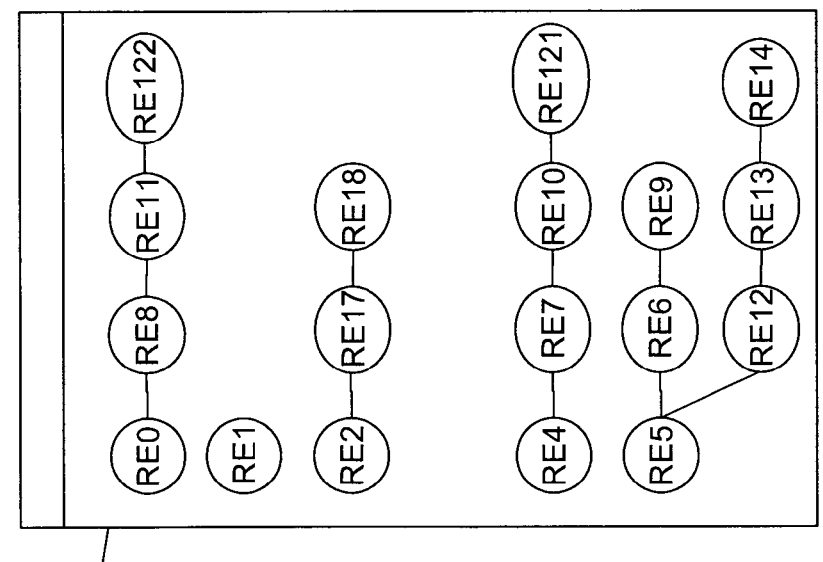
Figure 6N:
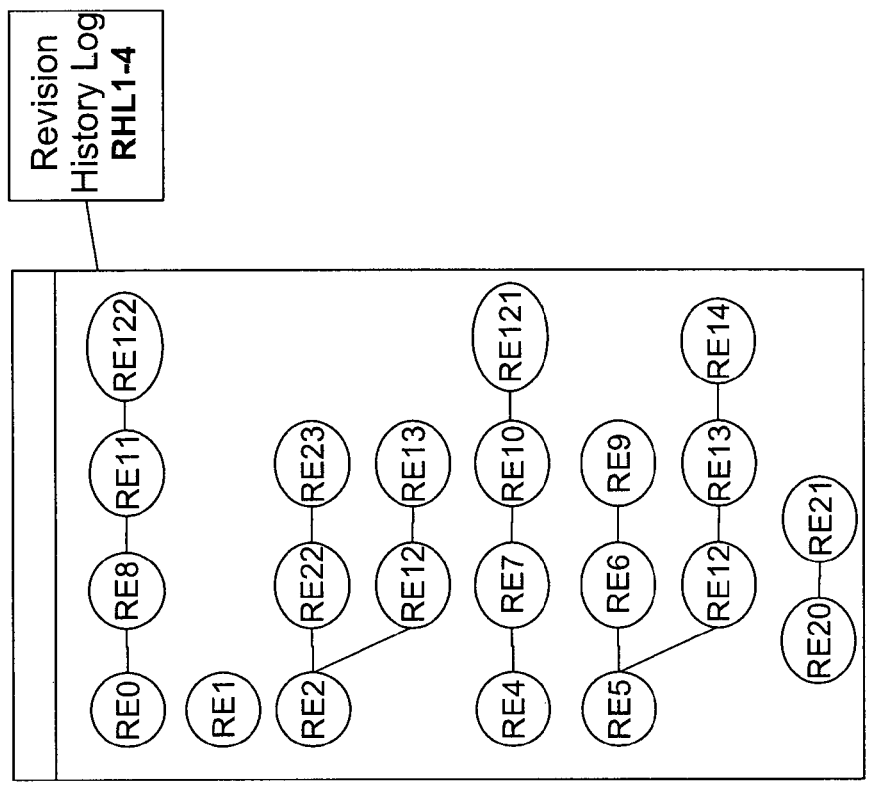
Figure 6M:
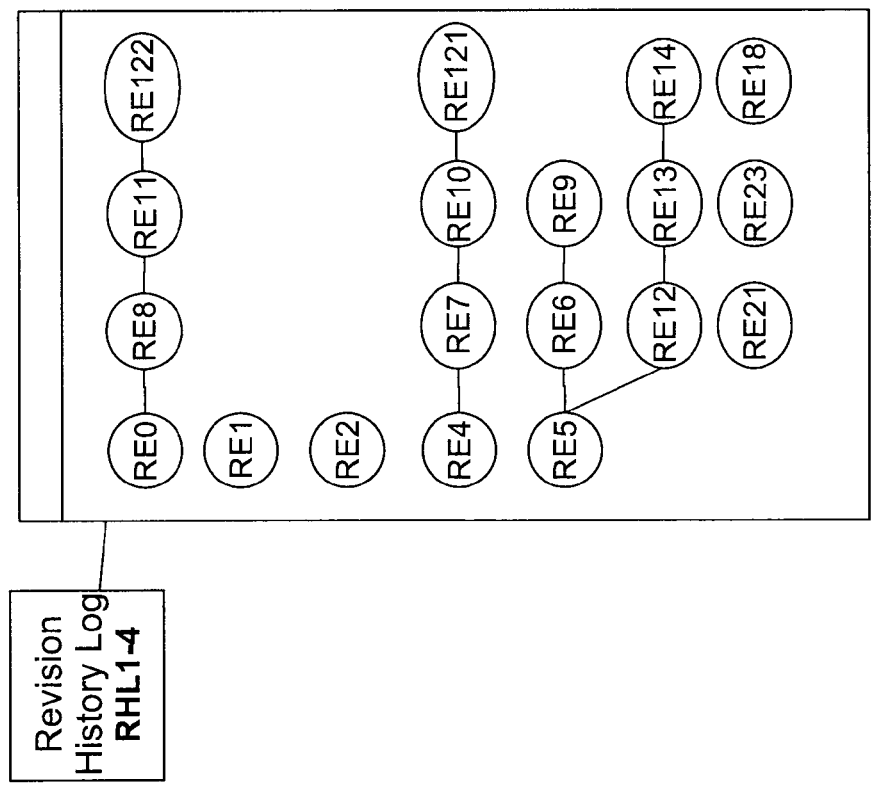
Figure 6P:
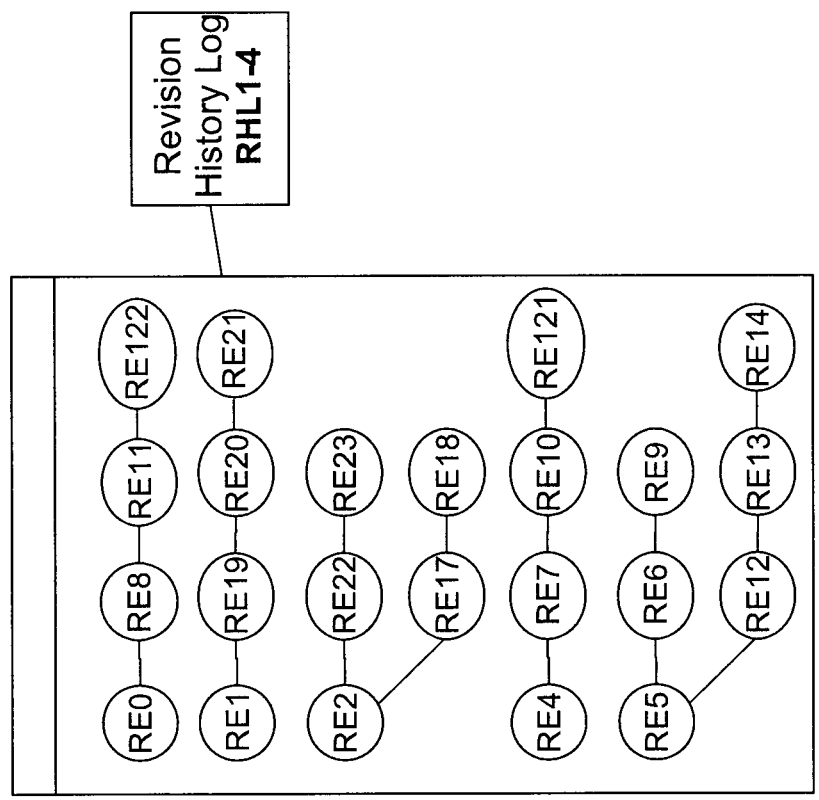

FIGS. 6A-6P schematically illustrate a reference area and revision history logs shown for the purpose of demonstrating the operations of revision control system, in accordance with an embodiment of the invention. The operations which are exemplified with reference to FIGS. 6A-6P include operations performed in respect of modification events, in the context of a single node (or device), and operations which are performed in the context of a file sharing environment where two or more nodes (or devices) communicate and are enabled to share content. Such file sharing environments include, for example, two or more devices which are directly connected (e.g. a smart phone directly connected via a USB cable to a personal computer), two or more nodes connected via a network (e.g. on the same logical network defined by an Active Directory) or two or more peers connected over a communication network (e.g. peers in a peer to peer network). It should be noted that although some of the details described with reference to the examples below may be specific by nature, the following example is for illustrative purposes, and should not be construed as limiting in any way.

For the purpose of the following non-limiting example, revision control system 100 (or 205) can be illustrated as implemented on device P1. Device P1 can be for example, a personal computer consisting of one or more central processing units (CPUs), bus, memory (RAM), a hard-drive, a user interface 150 comprising a keyboard and a mouse, a display 160 comprising a graphical LCD screen, one or more universal serial bus (USB) ports, and a network interface card (NIC). Device P1 further operates an operating system, and has its hard-drive configured to operate as a logical file-system "C:" by operating a file-system thereon, the file-system containing a folder "CAUsers\Laron\Patent" L1, containing three files "US61-286093.txt" (F1), "Comments" (F2). According to the current example, initially revision control system is not operating e.g. is turned off, powered off, or otherwise not activated.

A user operating node P1 can instruct the node to activate revision control system 100 (or 205). The user defines a reference area RA1-1 (e.g. via policy unit 140) for the revision control system with the help of user interface 150. FIG. 6A is a schematic illustration of reference area RA1-1 showing all its files and folders.

In response, revision control system 100 (or 205) creates revision history log RHL1-1 and allocates past-revisions repository 135 on data storage. Once the reference area is defined, revision engine 110 begins to track modification events which are performed in respect of files and folders which are stored within reference area RA1-1 (in this case folder L1). As mentioned above, information in respect of modification events may be obtained by revision engine 110 from the operating system, the file-system of node P1 or from the user interacting with the revision control system e.g. through user input 150.

At the onset of its operation revision engine 110 performs a scan over reference area RA1-1, with a searching criterion set (e.g. defined in policy unit 140) to search for all files and folders in the reference area, in order to identify modification events in respect of existing revisions in reference area RA1-1. However, since at this stage there are no existing revision entries in revision history log RHL1-1 representing the files and folders in reference area RA1-1, every file or folder which is identified within reference area RA1-1 triggers a modification event. As there is no existing information in the revision history log RHL1-1 in respect of the files and folders in reference area RA1-1, the files and folders which are identified can trigger a "create" modification event.

For each modification event, which is identified during the scan, the system creates an initial revision entry, by following process 400.

In response to each modification event a first (or "earliest") revision entry is created in respect of the corresponding file or folder, by following process 400 described above with reference to FIG. 4. The following stages are an example of process 400 illustrated with reference to file F1:

At stage 410 the revision control system identifies that a modification event has occurred in respect of file F1.

At stage 420, revision engine 110 obtains metadata and/or content in respect of F1. To obtain metadata, the revision control system extracts existing metadata fields from the file-system where file F1 is stored. In addition, content hash-code HC1 (e.g. SHA1 hash code) is computed for F1. Content hash-code HC1 is added to the obtained metadata, and then a metadata hash-code MH1 is computed for the entire metadata obtained in this stage. In this example, a unique identifier ID1 (e.g. UUID) is also generated at this stage. Alternatively or additionally, an appropriate set of metadata fields of file F1 may be used as a substantially unique identifier as explained above.

At stage 430 the revision engine finds that there is no relevant revision entry in the revision history log. Next in stage 440 a new revision entry RE1 is created in respect of F1. The metadata obtained in stage 430 is added to this revision entry.

At stage 450 revision control system has already indicated there is no previous revision entry, and thus the new revision entry is associated in the revision history log as a first revision entry in respect of F1.

At stage 460 revision engine repeats the process for each additional file in reference area RA1-1, in this example file F2, creating new revision entry RE2, until no further file-modification events are identified, and process 400 terminates.

Folder L1 itself has no corresponding revision entry in the revision history log, therefore process 400 will be carried out in response to a modification event ME0 triggered by the mere existence of folder L1 in the monitored reference area. When processing folder L1, the revision control system obtains metadata, indicating that this modification event refers to a folder rather than a file, creates a corresponding revision entry RE0 (stage 440) and populates revision entry RE0 with information (metadata) in respect of folder L1 and associates revision entry RE0 within revision history log RHL1-1 (stage 450).

In this example, the revision control system computes a metadata hash-code MH0 for folder L1 which includes metadata describing the folder itself, as obtained from the file-system, as well as metadata of its contained files F1 and F2. To facilitate this computation, the computation can be processed after the files contained within L1 (F1 and F2) have been processed.

Next, the user operating node P1 creates a new folder named "Correspondence" (L2) within folder L1. This action again triggers a modification event ME4 which is captured by file-system monitor 120. Modification event ME4 undergoes the processing in accordance with process 400. As described above with reference to folder L1, the revision control system obtains metadata indicating that this file-modification event refers to a folder rather than a file, creates a corresponding revision entry RE4 (stage 440) and populates revision entry RE4 with information (metadata) in respect of folder L2 (as explained above regarding processing for folder L2) and associates revision entry RE4 within revision history log RHL1-1 (stage 450).

The user further creates a new file F4 named "Comments for Yossi" within folder L2. Again, this action triggers a modification event ME5 captured by file-system monitor 120. File F4, undergoes the sequenced stages of process 400 as exemplified for files F1-F2 above, such that a new revision entry RF5 is associated in the revision history log in respect of F4. FIG. 6B illustrates the state of revision history log RHL1-1 after completing all processes thus far. In the following description and in FIGS. 6B, 6C, 6D, and 6F, 'CH' refer to content hash codes, 'MH' refer to metadata hash codes, ID refers to an identifier of an entry and 'metadata' refers to any other metadata and information of a revision entry.

In some implementations, for each file processed in respect of the above mentioned modification events, revision control system stores a revision, including a copy of the file in its associated past-revisions repository 135, and indicates the location of the file in the past-revisions repository in its corresponding revision entry.

Continuing with the example, consider that the user operating device P1 adds new content to file F4. File-system monitor 120 identified the addition of content as modification event ME6. The processing of modification event ME6 begins in accordance with the operation rules and configurations which are defined in respect of reference area RA1-1, in revision policy unit 140. In this example the processing of modification event ME6 does not start immediately after it is identified but is rather executed according to a predefined schedule. Once it is determined, it is time to process file F4. Modification event ME6 is processed in accordance with the stages of process 400:

At stage 410 revision engine 110 identifies that a file modification event ME6 has occurred in respect of file F4. At stage 420, revision engine 110 obtains metadata and content respect of F4, computes content hash-code HC5 for F4 adds content hash-code HC4 to the obtained metadata, and then computes a metadata hash-code MH6 for the entirety of obtained metadata.

At stage 430, the revision manager 110 (with the help of revision manager 115) retrieves the relevant revision entry RE5 corresponding to file F4, upon which the modification event ME6 was implemented, from the revision history log. Next at stage 440 a new revision entry RE6 is created in respect of F4. The metadata obtained on stage 420 is added to this revision entry. A unique identifier ID6 is added to the entry as well.

At stage 450, revisions manager 110 links the new revision entry RE6 to the previous revision entry RE5, thereby extending the progression path within revision history log RHL1-1, representing the progression of revisions of file F4. FIG. 6C is a schematic illustration showing the state of revision history log RHL-1 after the processing of modification event ME6 is completed.

Assume that the user on node P1 has continued to modify files on reference area RA1-1, which continued to trigger modification events in response to these modifications. In response, revision control system 100 creates further revision entries in a manner similar to the process described above in respect of file F4. For brevity, the example now turns, to a resulting situation of a sequence of modification events as illustrated in FIG. 6D.

Following the above modification events, the user operating device P1 is interested in viewing the history of file F4, possibly in order to interact (e.g. review) with the various revisions that has thus far accumulated in the progression path(s) of the file.

The user can interact with revision engine 110 by utilizing user interface 150 and display 160 in order to command it to perform one or more of the following actions: select reference area RA1-1; view a list of files and folders having revision entries in the corresponding revision history log RHL1-1; select file F4 from the list of files and folders; view the history of F4. In response to the last command, revision control system 100 can, for example, display the requested information on display 160. The requested information can be displayed to the user in a variety of formats. For example, the information can be displayed as a directed graph, such as the one shown in FIG. 6D, beginning at RE5 and forming a progression path extending from RE5 through RE6 to RE9.

By, for example, pointing and clicking a mouse or by using keyboard commands and/or shortcuts, or touching the screen in case display 160 is a touch-screen, the user operating node P1 is also able to select specific revisions and command revision engine 110 to perform actions in respect of the selected revisions.

Next, in the current, example, the user operating device P1 may wish to revert (return) to one of the past revisions of the file F4, for example in case the user feels that a past revision of a file is better than the current revision, or in case the user wishes to view this past revision side by side on display 160 for comparison, review or any other purpose. According to the current example, in order to command the system to revert to a past revision, the user uses user-interface devices 150 as explained above and selects a specific revision to which he wishes to revert. In this example the user selects the revision which is represented by revision entry RE5 in revision history log RHL1-1, which is the first (or earliest), revision of file F4 currently recorded in revision history log RHL1-1. The user then issues a revert-command instructing revision engine 110 to revert to this revision.

In the specific example illustrated herein, in response to the revert-command revisions manager 115 identifies the revision associated with RE5 as the current revision for file F4 and modifies the contents and metadata of file F4 stored on the reference area to match the contents of the revision corresponding to revision entry RE5 which is currently stored in the past-revisions repository, and to match the metadata of the revision corresponding to revision entry RE5. At least part of the metadata is stored in revision entry RE5.

Assuming now that the user modifies file F4, and in response a new modification event ME7 is identified. In this case the relevant revision entry, which is associated with the current revision of file F4 is RE5. Processing of modification event ME7 (in accordance with process 400) begins, during which a new revision entry RE12, representing the new revision of file F4 is created by revision engine 110 (with the help of revision manager 115). Revision entry RE12 is linked to revision entry RE5 representing file F4 before the last modification event thereby creating a new progression path in the revision history log in respect of F4, extending from RE5 to RE12.

At this stage, there are two progression paths extending in respect of file F4 in the revision history log RHL1-1, the first progression path containing {RE5, RE6, RE9} and the second progression path containing {RE5, RE12}.

Since file F4 was modified, the metadata of its containing folder L2 (such as last modification date and time and last modification user ID) has also been modified, and thus the metadata of folder L1 which contains folder L2 may also change to reflect the change in folder L2. These modifications on the file-system result in modification events ME7-1 and ME7-2 respectively. Process 400 begins first for modification event ME7-1 to create revision entry RE121 corresponding to modifications of folder L2, and after completion of this process, process 400 begins next for modification event ME7-2 to create revision entry RE122 corresponding to modifications of folder L1.

The user next renames file F4 to a new filename "Comments version 2", issuing a rename event. In response, a modification event ME8 is identified by revision engine 110, depicting that file F4, having a relevant revision entry RE12, has been modified in its metadata field 'filename' to a new value. Again process 400 is executed in order to process modification event ME8 and results in creating revision entry RE13 and associating it with RE12, to extend the progression path now containing {RE5, RE12, RE13}. FIGS. 6E and 6F are schematic illustrations showing the state of reference area RA1-1 and revision history log RHL1-1 at the end of these processes.

Continuing now to FIGS. 6G-6P which exemplify some operations performed by revision control system 205 in the context of a file sharing environment. The following example continues the previous example, and shows how different revision history logs which are stored on separate devices are maintained with similar content by sharing information between the devices and updating the revision history log in each device, and possibly also the corresponding revisions. The example illustrated herein refers to two possible scenarios of file sharing. In the first scenario, device P1 communicates with a second device P2 via a direct communication facility (e.g. via a USB communication line). In a second scenario, device P1 communicates with device P3 over a peer-to-peer network. Devices P1 and P2 both comprise revision control system 205 which, inter alia, enables communication between the devices.

Assume that the same user operating device P1 also operates a second device P2 with a revision control system RCS2 implemented thereon. Device P2 can be for example a smart phone with a revision control system RCS2 implemented thereon, a USB communication component, at least one central processing unit (CPU), sufficient memory (RAM), a display 160 such as a built-in LCD display, and user interface 150 such as a QWERTY-type keypad, or touch-sensitive hardware for its LCD display, and a storage repository accessible organized as a file-system. In this example, channel configuration unit 235 on revision control system RCS2 is preconfigured with operation rules which include a rule to initiate an update query every time it connects to another device.

The user then connects device P2 to device P1 with a USB cable, and after appropriately operating the two devices to establish communications via USB, revision control system RCS1 on device P1 and revision control system RCS1 on device P2 can exchange information, as discussed in length in respect of process 500 above.

The user can define on revision control system RCS1 a channel C1, which includes reference area RA1-1, using its user interface 150. The user of device P1 then interacts with revision control system RCS1 to send an invitation to device P2 to subscribe to channel C1. In some cases channel C1 can be automatically assigned with a preset default policy configuration.

Channel manager 230 of revision control system RCS2 receives the invitation and displays it to the user on its display 160, enabling the user to select whether to accept or reject the invitation. In the current example, the user accepts the invitation and in response revision control system RCS2 designates a storage space as a reference area RA1-2 on device P2 which is associated with channel C1, creates a new revision history log RHL1-2 in respect of reference area RA1-2, and defines a storage repository for keeping past-revisions. At this point, devices P1 and P2 are both members of channel C1.

Upon successfully completing the above mentioned operations, RCS2 now initiates the update cycle which is described above with reference to FIG. 5. During the update cycle process, revision history log RHL1-2 is updated with revision entries, and reference area RA1-2 and past revisions repository 135 can be populated with revisions retrieved from device P1.

At stage 510, revision control system RCS2 initiates an update cycle. In this example an update query is created (at stage 520 e.g. with the help of revision control unit 210), and an initial searching criteria is defined. As explained above with reference to FIG. 5 the criteria define the conditions for the update query. In this example a criterion is set to 'all existing entities', defining that any available revision entries and revisions on other members of channel C1 are to be retrieved. The update query is then issued via channel manager 230 and is propagated to the only other member of this channel, device P1.

Device P1 receives via its channel manager 230 the update query from device P2, reads the criteria from the update query, and checks (in accordance with the specification of the received criterion) whether any relevant updates exist in its revision history log RHL1-1. Device P1 then creates a response-update. Since the criterion is defined as 'all existing entities', device P1 finds that all revision entries in revision history log RHL1-1 comply with the criterion, generates a response-update with information in respect of all relevant revision entries, and sends the response-update back to the querying member, device P2.

Device P2 now receives the response update via channel manager 230 (stage 530) from device P1. As device P2 is the last member in the return-path of the response-update (channel C1 comprises only 2 members), device P2 does not further propagate this response-update to other devices. Network revision control unit 210 on device P2 is configured to compare, with the help of file revision manager 110, its own revision history log RHL1-2 with revision entries in the received response-update. Since at this stage of the example there are no other revision entries in the revision history log RHL1-2, each of the received revision entries is used to update a list of available updates on device P2.

Network revision control unit 210 on device P2 now proceeds to operate its associated file revisions engine 110 to create revision entries in its revision history log RHL1-2 for each revision entry listed in the list of available update, and link the created revision entries in their progression paths as indicated by the information contained within the revision entries received from device P1.

With the list of available updates ready, device P2 now proceeds to stage 540, which comprises stages 550, 560, and 570. At stage 550, a list of required updates (selected from the listed available updates) is determined which in the current example comprises all updates, as there are no revisions in revision history log RHL1-2.

At stage 560, device P2 determines, by consulting the response-update and the device's channels and subscriptions manager 230, which members have the required updates. In the current example, the only member with required updates is member P1. Therefore, at stage 570, network revision control unit 210 on device P2 communicates with member P1 which has the required updates, and requests to retrieve the required updates. The required updates include revisions, files and folders.

For each update retrieved from P1 at stage 570, revision control system RCS2 stores retrieved files and folders on data-repository 125 in order to monitor the file by member P2's file-system monitor 120, and stores retrieved revisions in the past-revisions repository 135.

FIGS. 6G and 6H are schematic illustrations showing the state of revision history logs RHL1-1 and RHL1-2, respectively, after the process in accordance with FIG. 5 is completed. As illustrated in FIGS. 6G and GH both RHL-1 on device P1 and RHL-2 on device P2 are substantially identical. In addition, both devices can comprise substantially-identical files, and substantially-identical folders on their reference areas and in their data repositories.

Continuing with the example, assume that the user modifies a revision of file F4 corresponding to revision entry RE13 on device P2, while device P2 is connected to device P1. Revision control system RCS2 identifies this modification of file F4 as file modification event ME9, and in response creates a new revision entry RE14 on revision history log RHL1-2 as described above. As discussed above with reference to stages 520 and 530 in FIG. 5, a member may utilize its channel manager 230 to send an update-message to other members of the channel. In this example, member P2 creates an update-message after revision entry RE14 has been created, including information from RE14 such as the ID of revised revision and metadata describing the revision, hash-codes calculated in respect of the revision and so on.

Revision control system RCS1 on device P1 receives the update-message, and begins the update-cycle at stage 530 as described above, updating the list of available updates on RCS1 with the information from the update-message, and creating a revision entry RE14 on revision history log RHL1-1 which includes the information regarding F4 from the update-message, as well as an indication that this revision entry has no corresponding revision neither in -reference area RA1-1 nor in the past-revisions repository 135. Furthermore, in response to the update-message, device P1 can now display on display 160 a message indicating that a monitored file on channel C1 has been modified on device P2. The status of the revision history logs RHL1-1 and RHL1-2 after these operations is illustrated in FIGS. 6I and 6J respectively.

Revision control system RCS1 on device P1 can next advance to stage 540, and proceed to retrieve the actual available revision as we have described above. However, for the sake of the current example, let us assume that this did not take place yet, and the actual revision corresponding to RE14 has never been updated on device P1 and only information about its existence is known to RCS1.

Next, the user disconnects device P2 from device P1 by removing the USB cable connecting the two devices. After disconnecting the devices, the user modifies on device P2 a revision of file F4 represented by revision entry RE13 in revision history log RHL1-2. This results in a modification event ME10 and triggers process 400 which results in a new revision entry RE15 identified by substantially-unique ID ID15. RE15 is linked to RE14 in revision history log RHL1-2. The user then further modifies the file, again resulting in a modification event ME11 which triggers process 400 once more resulting in a new revision entry RE16 identified by substantially-unique ID (at least in the context of the channel) ID16. RE16 is linked to RE15 in revision history log RHL1-2.

The next part of this example is directed to a file sharing scenario in the context of a peer-to-peer network implementing overlay management functions. In this example, the peer-to-peer network is characterized by an unstructured channel overlay geometry, the network comprising device P1 described above, devices P3 and P4 and a presence service PS1 all accessible to each other via Internet links. Devices P1, P3 and P4 all comprise revision control system 205 which, inter alia, enables communications in a file sharing environment. Device P3 has revision control system RCS3 implemented thereon and comprises a USB communication component, at least one central processing unit (CPU), sufficient memory (RAM), a display 160 such as a built-in LCD display, and user interface 150 such as a QWERTY-type keypad, and a storage repository accessible organized as a file-system. Channel configuration unit 235 on revision control system RCS3 is preconfigured with operations rules, which includes a rule to initiate an update query every time it connects to another device. Device P4 is similar in configuration to device P3, and comprises revision control system RCS4.

At the onset of this example, devices P3 and P4 are online and independently communicate with presence service PS1. At the same time device P1 attempt to communicate with presence service PS1. In this example, before attempting the communications, RCS1 on device P1 generates two encryption keys to be used in future communications with other members in the channel (e.g. using the well-known RSA method, to produce a private key and a corresponding public-key).

The user connects device P1 to the Internet, and instructs revision control system 205 on device P1 to connect to a presence service PS1 via the Internet, and attempts to log onto presence service PS1 by supplying it a username and password, as well as the generated public-key.

Presence service PS1 facilitates peers identity management for a plurality of peers, as described above with reference to FIG. 2. In this example, presence service PS1 stores a username and password pair in its users-database 260, in respect of each member. The password and username supplied by device P1 are authenticated by presence service PS1 against the information stored in users-database 260, and upon successfully authentication of the password and username, presence service PS1 stores information identifying device P1 on the Internet (such as an IP address, NAT traversal ports, and so on) in online-database 265, adding device P1 to the list of peers currently online.

The user on device P1 interacts with revision control system 205 using user interface 150 to invite other members to channel C1. In this example, the user types a list of usernames, email addresses, or other data identifying other members on presence service PS1. In other examples, the user may use other methods to indicate which other members he wishes to invite to channel C1, for example, selecting user from a list of user, graphically displayed on display 160, selecting from an address book displayed on display 160, and so forth.

Once the list of members is ready, the user instructs revision control system 205 to send the invitation to the selected potential members. Device P1 proceeds to storing the invitations on channel configuration unit 235 in respect of channel C1 for subsequent operations.

In order to obtain contact information of these potential members, which is required in order to communicate the invitation to the correct location, channel manager 230 communicates with presence service PS1 to request a service of tracking the list of peers which are currently online. In response, presence service PS1 queries its users-database 260 and its online-database 265 for information relevant to the peers indicated by the request from channel manager 230. The relevant information is communicated from presence service PS1 back to channel manager 230 on device P1.

In this example, assume the information retrieved from presence service PS1 refers to the following peers: device P3 and device P4, and that the information communicated in respect of each of the devices P3, P4, comprises their IP address, their TCP/IP port, their NAT address, their public encryption key and possibly other fields.

Revision control system RCS1 then communicates with presence service PS1 in order to register channel C1 with the registrations-database 270, in order to maintain active invitations for peers which are currently offline and cannot receive the invitation immediately. Presence service PS1 also maintains the registration status of members (membership in the channel) once they reconnect.

Revision control system RCS1 uses the information retrieved from presence service PS1 in respect of the peers (i.e. potential members) to generate an invitation to each potential member, containing information in respect of the channel and communicates the invitations to each of the corresponding potential members through P2P engine 240 which is responsible for establishing communications and interacting with other peers. In some cases each invitation is encrypted (e.g. with a public key calculated for each of the invited peers).

Next in this example, each of the potential members P3 and P4 receives the invitation, and performs a set of activities in order to be able to exchange updates on the channel, and effectively become a member of channel C1. Revision control system RCS3 on device P3 displays the received invitation to the user on its display 160, enabling the user to select whether to accept or reject the invitation. In the current example, the user accepts the invitation and in response, revision control system RCS3 designates a storage space as a reference area RA1-3 on device P3 which is associated with channel C1, creates a new revision history log RHL1-3 in respect of reference area RA1-3 (assuming, as illustrated in the current example, that a corresponding revision tree does not exists), and indicates a storage repository for keeping past-revisions. Device P3 is now ready to communicate as a member of channel C1, and communicates to presence service PS1 that it has accepted the invitation for channel C1. Presence service PS1 validates that such an invitation existed in its registration database 235 and registers device P3 as a member of channel C1.

Revision control system RCS4 on device P4 receives an invitation as well, and proceeds as described in the above paragraph to designate storage space as reference area RA1-4 associated with channel C1, create a new revision history log RHL1-4 and indicate a storage space for keeping past-revisions. Then RCS4 communicates to presence service PS1 that it has accepted the invitation, and after presence service PS1 validates that such an invitation existed, it registers device P4 as a member of channel C1 as well. At this point, devices P1, P3, and P4 are all members of channel C1 and may connect in a channel overlay between them, however they still have not yet established a connection or exchanged communications between them.

For clarity of this example, assume that all channel managers 230 on all three devices P1, P3, and P4 have equally-determined their respective device should connect with two other members of channel C1 when propagating messages and sending queries. It will be appreciated that in some implementations, each device in a channel may selectively connect with various numbers of members in a channel. In such case channel manager 230 on each device can consult with its respective P2P engine 240, in order to determine an optimal, maximal or another number of required connections and their characteristics.

Once device P1, obtains the contact information of the other devices being member of channel C1, it may proceed to establish a connection with devices P3 and P4 which have been indicated by presence service PS1 as online. Device P1 may attempt to connect to devices P3 and P4, which in turn may communicate with presence service PS1 to verify that device P1 is indeed a member of channel C1, for security reasons. After successfully verifying membership of device P1, both devices P3 and P4 may connect to device P1.

In this example, each of devices P3 and P4 has determined it needs two connections, but currently only device P1 is connected to the two devices P3 and P4, while each of devices P3 and P4 is still only connected to P1. By communicating with presence service PS1 to request a list of connected members for channel C1, device P3 may identify that device P4 is a possible connection, and device P4 may identify that device P3 is a possible connection. After successfully receiving the response from presence service PS1, device P3 connects to device P4. A race condition may occur in which both devices P3 and P4 attempt to connect to the other, and one of them succeeds while the other fails. Either way, a connection is formed, and the two devices are connected, fulfilling the request defined by their respective P2P engine 240 to connect with two members.

The connectivity status for each device is determined based on its capabilities, its connection-bandwidth capacity, P2P overlay requirements, and so on. In this example, the devices may stay disconnected until an actual request to connect is issued, but in other P2P overlay geometries such as a DHT, connections can be established as long as the device is connected to the overlay to assist in activities of managing the DHT, for example, responding to queries for entity IDs and locations. In this example, the channel overlay is as follows:

Device P1 can connect via the Internet to devices P3 and P4, and can communicate with these devices. In addition device P1 may also connect and communicate with presence service PS1 as needed.

Device P3 can connect via the Internet to devices P1 and P4, and can communicate with these devices. In addition device P3 may also connect and communicate with presence service PS1 as needed.

Device P4 can connect via the internet to devices P1 and P3, and may communicate with these devices. In addition device P4 may also connect and communicate with presence service PS1 as needed.

For the purpose of clarity, an unstructured peer-to-peer geometry is employed in this example for the channel overlay maintained by the respective channel managers 230 and P2P engines 240 communicating in respect of channel C1 on all participating devices P1, P3 and P4. It will be appreciated that the propagation of communications described herein using an "expanding ring" algorithm, can be implemented using DHT-lookup algorithms instead, with the required adjustments performed.

For the purpose of the current example, assume that channel configuration units 235 on each device are set to issue a pull type update-query every full hour and also to communicate, every full hour, information to other members in respect of available updates (e.g. via a push type update-message). In addition, all channel configuration units 235, on P1, P3 and P4, are set with a rule limiting the propagation of update-queries to other members to a predefined number. For example, a counter (referred herein as "forward counter") in the update query can be set with a value and this value can be decremented by one every time the update query is propagated to a member. Once the counter equals zero propagation of the update query is terminated.

Once RCS3 has connected at least with one other device, (in this example with device P1), RCS3 may now initiate an update cycle which is described above with reference to FIG. 5 in order to update its revision history log RHL1-3 with revision entries of other members in channel C1.

At stage 510, revision control system RCS3 initiates an update cycle. In this example an update query is created (at stage 520), and the initial searching criteria in the update-query is defined to facilitate the 'expanding ring' overlay search algorithm as follows: the criterion defining the condition for searching for revision entries, is set as 'all existing entities', and a forward counter is given a value of 5. The update query is then issued by device P3 (with the help of channel manager 230) and is propagated to the connected device P1.

RCS1 on device P1 receives (via its channel manager 230) the update query from device P3, reads the criteria from the update query, and with the help of revision manager 115, retrieves all relevant updates existing in its revision history log RHL1-1 (note that the criteria is defined as 'all existing entities') by locating revision entries which comply with the criteria. RCS1 on device P1 consults with the P2P engine 240 to see whether the employed geometry (unstructured) requires forwarding or re-issuing the update-query to further peers. At this point, P2P engine 240 indicates that the forward counter is greater than zero, but at this stage, device P3 is the only other connected peer, and thus the update-query is not propagated any further.

RCS1 is now ready to create a response-update. Network revision control unit 210 in RCS1 populates the response-update with information in respect of all relevant revision entries, and then sends them back to RCS3 on the querying member, P3.

RCS3 now anticipate a response-update at stage 530, and once the response update is received from RCS1, network revision control unit 210 on device P3 is configured to compare, with the help of its associated revisions engine 110, its own revision history log RHL1-3 with the information in respect of revision entries which are received with the response-update. Since at this stage of the example there are no other revision entries in the revision history log RHL1-3, each of the received revision entries is used to update a list of available updates on device P3. Next, file revisions engine 110 (e.g. with the help of revision manager 115) proceeds to create new revision entries in its revision history log RHL1-3 for each revision entry listed in the list of available update, and link the new revision entries in their progression paths as indicated by the information contained within the revision entries.

RCS3 now proceeds to stage 540, which comprises stages 550, 560, and 570. At stage 550, a list of required updates is determined which in the current example comprises all updates, as all revisions which are represented by the revision entries in RHL1-3 are missing. At stage 560, RCS3 determines, by consulting the response-update and the device's channels and subscriptions manager 230, which members have the required updates. In the current example the only member with required updates is member P1. Therefore, at stage 570, network revision control unit 210 on device P3 communicates with RCS1 on member P1 which has the required updates, and requests to retrieve the required updates. The required updates include revisions (to be stored on past revision data repository), files (revisions to be stored on the reference area) and folders.

For each update retrieved from RCS1 at stage 570, revision control system RCS3 stores retrieved files on data-repository 125 in order to monitor the file by RCS3's file-system monitor 120 and stores retrieved revisions in the past-revisions repository 135. At this point, members P1 and P3 have a substantially-identical revision history log, and store substantially identical revision entries.

Before an hour elapses from the last issued update cycle, the user on device P1 modifies file F2 (represented by RE2) twice, triggering modification events ME12 and ME13 resulting in revision entries RE17 and RE18 respectively, in RHL1-1. In this example, these modification events were not yet forwarded to other members since as noted, an hour has not yet elapsed from the last update cycle issued by RCS1. As described above the policies on each revision control system were set to send an update message only every full hour. The user on device P3 modifies file F1 (represented by RE1) three times, triggering modification events ME14, ME15 and ME16 resulting in revision entries RE19, RE20 and RE21. The user on device P3 also modifies file F2 (represented by RE2) twice, where the implemented modifications are different than the ones made by the user on device P1. The two modifications, implemented on file F2, trigger modification events ME17 and ME18 resulting in revision entries RE22 and RE23 respectively, in RHL1-3. According to the set up of configuration unit 235 on each of the devices, no update is sent as a full hour did not elapse since the last update. FIG. 6K shows the state of RHL1-1, and FIG. 6L shows the state of RHL1-3 after the above modifications took place.

Consider that at this point, a user operating device P4 interacts with the revision control system RCS4 via its user interface 150 to begin an update cycle. Revision control system RCS4 now begins an update cycle by formulating an update query UQ1. In this example the criteria defining the query is set, to retrieve only the revision entries corresponding to current revisions (i.e. the revision entry corresponding to the most updated revision in respect of an earliest file (or earliest revision), which is currently available for a given progression path) modified within the last hour. These revisions have not yet been sent to RCS4 as they are scheduled to be sent only once an hour elapses from last update. It should be noted that in other examples the criteria of the update query may be differently defined. For example, it may include information indicating which is the most updated revision entry in respect of a given progression path which is available in RHL1-4 and request for any one or more revision entries which are more updated.

RCS4 connects to RCS3 and RCS1, and communicates to them update query UQ1. Both revision control systems RCS1 and RCS3 receive and begin to process update query UQ1.

On RCS1, one revision entry {RE18} matching the criteria in update query UQ1 is retrieved (e.g. with the help of revisions manager 115), and a response update RU1 is created and populated with information in respect of the revision entry.

Next, RCS1 identifies (via P2P engine 240 or channels manager 230) that its connected members are P3 and P4. RCS1 creates an update query UQ2, populates it to contain the same information as UQ1, decrements the value of the included forward counter by one, and proceeds to propagate update query UQ2 to its other connected members, namely device P3.

On RCS3, revision entries {RE21, RE23} matching the criteria in update query UQ1 are retrieved (e.g. with the help of revisions manager 115), and a response update RU2 is created and populated with information in respect of these revision entries. RCS3 then identifies (via P2P engine 240 or channels manager 230) that its connected members are P1 and P4. However, as by this time it has received the update query forwarded to it by P1 as well as the original update query from P4, revision control system RCS3 can identify that all its connected members have sent the same criteria in their update query, and therefore all connected members have already received this query, and accordingly determines that there are no further members to which the query should be propagated.

Revision control system RCS3 returns response-update RU2 to each member requesting the same update query, namely members P1 and P4. The response update containing {RE21, RE23} is sent to revision control system RCS1 and to revision control system RCS4.

When revision control system RCS1 receives response-update RU2 from member P3, it identifies (with the help of revisions manager 115) that revision entries RE21 and RE23 are missing from its revision history log. RCS1 adds revision entries RE21 and RE23 to its response-update RU1, which now contains entries {RE18, RE21, RE23}. It then returns response-update RU1 to member P4 which originated update-query UQ1. In addition, since these revision entries are missing in its revision history log RHL1-1, it updates its list of available updates to include RE21 and RE23.

Revision control system RCS4 now has two response-updates, RU1 and RU2. It identifies that it is missing revision entries RE18, RE21 and RE23, and thus updates its list of available updates with the revision entries. It also creates corresponding revision entries to be placed in its revision history log RHL1-4. The state of revision history log RHL1-4 is schematically illustrated in FIG. 6M. Note that the new revision entries are currently not associated to any progression path in revision history log RHL1-4.

If the previous revision entries of the missing revision entries are identified within RHL1-4, revision engine 110 can link the received revision entries (RE18, RE21 and RE23) which were received in the response updates, to the corresponding identified previous revision entries in RHL1-4. If on the other hand, one or more previous revision are not found in RHL1-4, revision engine 110 can issue a new update query requesting the missing revision entries. In order to determine whether the relevant previous revision entries exist in RHL1-4 revision engine 110 (e.g. with the help of revision manager 115) in RCS4, can be made operable to utilize the information found in the received revision entries, in respect of their previous revision entries, and search for these previous revision entries in RHL1-4 by their ID, by metadata hash-codes, or by other suitable criteria provided with the revision entry data and sufficient for identifying the missing revision entries. In accordance with the current example, revision engine 110 fails to associate the new revision entries in the revision history log in their progression paths, since, the previous revision entries of RE18, RE21 and RE23 are missing.

In this example, revision control system RCS4 now initiates another update cycle by formulating an update query UQ3 with the searching criteria set, this time, to retrieve the missing previous revision entries of RE18, RE21 and RE23. If, such as in the present example, the IDs of the missing previous revision entries are known from the 'parent' data of each received revision entry, the searching criteria in update query UQ3 can specifically indicate it is searching for revision entries RE17, RE20 and RE22, which are the parent (previous) revision entries of RE18, RE20 and RE22, respectively. Next the update query UQ3 is communicated to RCS1 and RCS3.

On RCS1, one revision entry {RE17} matching the criteria in update query UQ3 is retrieved, and a response update RU3 is created and populated with the revision entry. Next, RCS1 identifies that its connected members are P3 and P4. Since the update-query has arrived from P4, it decreases the value of the counter indicating the number of remaining forwards in UQ1 by one, essentially creating an update-query UQ4, and proceeds to propagate update query UQ4 to its other connected members, namely device P3.

On RCS3, revision entries {RE20, RE22} matching the criteria in update query UQ3 are retrieved, and a response update RU4 is created and populated with these revision entries. Next, RCS3 identifies that its connected members are P1 and P4. However, as before, by this time it has received the update query forwarded to it by P1 as well as the original update query from P4. Revision control system RCS3 then identifies that all members in the channel have sent the same criteria in their update query, and thus determines that it has no further members to propagate this message to.

Revision control system RCS3 returns response-update RU4 to each member requesting the same update query, namely members P1 and P4. The response update containing {RE20, RE22} is sent to revision control system RCS1 and to revision control system RCS4.

When revision control system RCS1 receives response-update RU4 from member P3, it identifies that it is missing revision entries RE20 and RE22. It adds the revision entries to its response-update RU3, which now contains entries {RE17, RE20, RE22}. RCS1 then returns response-update RU3 to member P4 which originated update-query UQ1. In addition, since these revision entries are missing in its revision history log RHL1-1, it updates its list of available updates to include RE20 and RE22.

Once again, revision control system RCS4 now has two response-updates, RU3 and RU4. It identifies that it is missing revision entries RE17, RE20 and RE22, and thus updates its list of available updates with the revision entries. It also creates corresponding revision entries in its revision history log RHL1-4. This time, it can associate the new revision entries in the revision history log in their progression paths, based on the identifiers of previous revision entries of each revision entry RE17, RE20 and RE22. It also identifies that it is missing revision entry RE19, the previous revision entry of revision entry RE20, and thus updates its list of available updates with the revision entry Revisions manager 115 (on RCS4) proceeds to associate the three new revision entries corresponding to {RE17, RE20, RE22} in the revision history log RHL1-4, and associates revision entries received in response-update RU2 {RE18, RE21, RE23 } to the new revision entries created in respect of response-update RU4, each revision entry being linked to its respective previous revision. The state of revision history log RHL1-4 is schematically illustrated in FIG. 6N Note that by now, revision control system RCS4 includes only one revision entry {RE19} in its list of available updates. It may now create a new update-query UQ5 to retrieve revision entry RE19 which is missing from its revision history log RHL1-4 for associating revision entry RE20. Revision control system RCS4 may then proceed, as described above, to obtain the missing revision entry, and associate revision entries RE19, RE20 and RE21 in the correct location in its revision history log.

After updating its revision history log, revision control system RCS4 can now proceed to retrieving the actual revisions. Revision control system RCS4 has to determine which members have the required updates (stage 560). In a DHT-based overlay, this would mean crafting a query for the specific IDs of the required updates, and in response, receiving a list of members having revisions corresponding to the IDs. In this example though, an expanding-ring algorithm is used in order to exemplify inter-member communications. It should also be appreciated that in this example, separate stages are used to retrieve revision entries and their corresponding revisions, however in other implementations revision can be retrieved together with their corresponding revision entries in a single stage.

Revision control system RCS4 communicates with RCS1 and RCS3 to request a list of members having revisions corresponding to revision entries {RE17, RE18, RE19, RE20, RE21, RE22, RE23}. As explained above, revision entries can be identified by various types of identifiers including a corresponding metadata hash-code, a UUID, and so forth.

RCS1 receives the request from RCS4 and via its revision control engine 110 determines whether it has revisions corresponding to the metadata hash-codes of revision entries RE17, RE18. Revision control system RCS1 then formulates a response to RCS4 indicating it has the required revisions.

Revision control system RCS3 also receives the request from RCS4 and with the help of its revision control engine 110 determines it has revisions corresponding to the metadata hash-codes of revision entries RE19, RE20, RE21, RE22, and RE23. Revision control system RCS3 then formulates a response to RCS4 indicating it has the required revisions.

As with update-queries, in the illustrated expanding-ring algorithm, any member receiving the message may forward it to another member in case it cannot find revisions corresponding to the revision entries requested in the message.

Revision control system RCS4 then receives the two responses above. According to one implementation, for each of the revisions corresponding to a metadata hash-code of a revision entry in the list of available updates, revision control system RCS4 instructs the corresponding members P1 and P3, which contain the revisions to send the contents of the revision, or portions of the contents, and receives the contents. Note that in many cases, for example if the revision is large, a temporary file may be used to store the contents as they are sent from the corresponding members. Upon receiving the contents, revision manager 110 of RCS4 is configured to store past revisions in the past-revisions repository 135, or if the revision entry corresponding to the current metadata hash-code is a current revision, the revision is stored by revisions manager 115 of RCS4 on the monitored file-system The state of its revision history log RHL1-4, at the end of the update cycle of revision control system RCS4, is illustrated in FIG. 6P. Revision control system RCS1 also has revision entries in its list of available updates, and may proceed to stage 560 independently of the operations of revision control system RCS4, thus obtaining updates from member P3.

Revision control system RCS4 can indicate to the user operating device P4, via display 160, that it has completed an update cycle. In response, the user operating device P4 may interact with RCS4 via user interface 150, and command RCS4 to display the history of file F4. In response, revision control system RCS4 may retrieve the entirety of progression-paths for file F4, and display them to the user.

A user can issue a command to RCS4 to display part or all of the information in respect of the revisions recorded in its revision history log RHL1-4. For example a user can issue a command to display the history of file F4. In response, revision control system RCS4 (with the help of revision manager 115) can retrieve the entirety of the progression-paths corresponding to file F4. In addition, revision manager can retrieve other revision entries, located elsewhere within the revision history log, and characterized by content hash-code which is identical to the content hash-code of revision entries in the progression paths corresponding to file F4. Revision control system RCS4 can display information in respect of the retrieved revision entries on display 160.

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While various embodiments have been shown and described, it will be understood that there is no intent to limit the invention by such disclosure, but rather, it is intended to cover all modifications and alternate constructions falling within the scope of the invention, as defined in the appended claims.

It should be understood that the use of the terms "first", "second", "third" and so forth in the following claim is done for the more clearly differentiating between similar elements within the claims and is not intended in any way to imply anything about the order or importance of these elements.

The invention claimed is:

1. A revision control system comprising:
a revision engine operatively connected to at least one processor configured to access at least one file system and comprising:
a file system monitor configured to access and monitor said file system and identify a modification event which occurred in respect of a file or folder within a reference area in said file system;
a revision manager configured responsive to said modification event to:
create a new revision entry in a revision history log, the new revision entry corresponding to the modification event;
identify a relevant revision entry in said revision history log representing a revision of said file or folder with respect to which said modification event was implemented; and
link said new revision entry with said relevant revision entry, thereby extending a first progression path representing a progression of revisions of said file or folder;
wherein said revision manager is configured to identify that along a second progression path which comprises said relevant revision entry, an additional revision entry exists, which corresponds to a modification of a revision represented by said relevant revision entry; said first progression path being another progression path linking said relevant revision entry with said new revision entry; and
maintain both said first progression path and said second progression path associated with said relevant revision entry, said relevant revision entry being indicative of a past revision common to both progression paths, thereby enabling to continue and monitor both progression paths, each being indicative of modifications of a common file or folder.

2. A method of revision control, the method comprising:
with the help of a processor:
accessing and monitoring a file system and identifying a modification event which occurred in respect of a file or folder within a reference area in said file system;
in response to said modification event:
creating a new revision entry in a revision history log, the new revision entry corresponding to the modification event;
identifying a relevant revision entry in said revision history log representing a revision of said file or folder with respect to which said modification event was implemented; and
linking said new revision entry with said relevant revision entry, thereby extending a first progression path representing a progression of revisions of said file or folder;
identifying that along a second progression path comprising said relevant revision entry, an additional revision entry exists, which corresponds to a modification of a revision represented by said relevant revision entry; said first progression path being another progression path linking said relevant revision entry with said new revision entry; and
maintaining both said first progression path and said second progression path associated with said relevant revision entry, said relevant revision entry being indicative of a past revision common to both progression paths, thereby enabling to continue and monitor both progression paths, each being indicative of modifications of a common file or folder.

3. A revision control system comprising:
a revision engine operatively connected to at least one processor and configured to access at least one file system and comprising:
a file system monitor configured to access and monitor said file system and identify a modification event which occurred in respect of a file or folder within a reference area in said file system;
a revision manager configured, responsive to said modification event to:
create a new revision entry in a revision history log, the new revision entry corresponding to the modification event;
identify a relevant revision entry in said revision history log representing a revision of said file or folder with respect to which said modification event was implemented; and
link said new revision entry with said relevant revision entry, thereby extending a first progression path representing a progression of revisions of said file or folder;
identify that along a second progression path which comprises said relevant revision entry, a second revision entry exists, which corresponds to a modification of a revision represented by said relevant revision entry; said first progression path being another progression path linking said relevant revision entry with said new revision entry; and
maintain both said first progression path and said second progression path associated with said relevant revision entry, said relevant revision entry being indicative of a past revision common to both progression paths;
wherein a revision entry in said revision history log includes at least one data element; said revision engine is further configured to identify within said revision history log, at least one other revision entry with at least one respective data element which is identical to said at least one data element, wherein one of, said revision entry and said at least one other revision entry, is located in said first progression path and the other is located in said second progression path; and determine, based on at least said at least one identical data element, a historical relationship between revisions represented by said revision entry and said at least one other revision entry.

4. A non-transitory program storage device readable by a computer, tangibly embodying a program of instructions executable by the computer to perform revision control, comprising:

accessing and monitoring a file system and automatically identifying a modification event which occurred in respect of a file or folder within a reference area in said file system;

in response to said modification event:

creating a new revision entry in a revision history log, the new revision entry corresponding to the modification event;

identifying a relevant revision entry in said revision history log representing a revision of said file or folder with respect to which said modification event was implemented; and linking said new revision entry with said relevant revision entry, thereby extending a first progression path representing a progression of revisions of said file or folder;

identifying that along a second progression path which comprises said relevant revision entry, a second revision entry exists, which corresponds to a modification of a revision represented by said relevant revision entry; said first progression path being another progression path linking said relevant revision entry with said new revision entry; and maintaining both said first progression path and said second progression path associated with said relevant revision entry, said relevant revision entry being indicative of a past revision common to both progression paths, thereby enabling to continue and monitor both progression paths, each being indicative of modifications of a common file or folder.

5. A revision control system comprising:

at least one processor operatively connected to a computer memory, the computer memory comprising instruction for the at least one processor for:

accessing at least one file system; and responsive to a modification event which occurred in respect of a file or folder within a reference area in said file system, for;

creating a new revision entry in a revision history log, the new revision entry corresponding to the modification event;

identifying a relevant revision entry in said revision history log representing a revision of said file or folder with respect to which said modification event was implemented; and linking said new revision entry with said relevant revision entry, thereby extending a first progression path representing a progression of revisions of said file or folder;

identifying that along a second progression path which comprises said relevant revision entry, a second revision entry exists, which corresponds to a modification of a revision represented by said relevant revision entry; said first progression path being another progression path linking said relevant revision entry with said new revision entry; and maintaining both said first progression path and said second progression path associated with said relevant revision entry, said relevant revision entry being indicative of a past revision common to both progression paths.

6. The system of claim 1 further comprising a revision policy unit comprising information in respect of a policy defining rules for creating revision entries in said revision history log, said revision manager being configured to create said new revision entry in accordance with said policy.

7. The system of claim 1 wherein a revision entry in said revision history log includes at least one data element and wherein said revision engine is further configured to identify within said revision history log, at least one other revision entry with at least one identical data elements; and determine, based on at least said identical data elements a historical relationship between revisions represented by said revision entry and said at least one other revision entry.

8. The system of claim 1 wherein a revision entry in said revision history log includes at least one data element and wherein said revision engine is further configured to identify within said revision history log, at least one other revision entry with at least one respective data element which is identical to said at least one data element, wherein one of said revision entry and said at least one other revision entry is located in said second progression path and the other is located in said first progression path; and determine, based on at least said at least one identical data element, a historical relationship between revisions represented by said revision entry and said at least one other revision entry.

9. The system of claim 1 wherein said revision engine is further configured to execute a copy-command in respect of a first revision; said copy-command including a first identifier, identifying a revision entry corresponding to said first revision and a second identifier, identifying a second revision entry corresponding to a second revision;

said revision manager is configured, responsive to said copy-command for:

replacing one or more data elements in said first revision with corresponding data elements of said second revision, thereby creating a new revision;

creating a new revision entry in respect of said new revision; and linking said new revision entry to said revision history log.

10. The system of claim 1 wherein said revision engine is further configured to execute a merge-command executed in respect of two or more progression paths in said revision history log; said merge-command includes at least information indicative of two or more progression paths within said revision history log and information identifying a merged revision-entry;

said revision manager being responsive to said merge-command for:

converging said two or more progression paths into said merged revision-entry, such that said two or more progression paths continue in a single progression path and maintain said two or more progression paths linked to said merged revision entry in said revision history log.

11. The system of claim 1 further comprising a network revision control unit configured to enable said revision engine to communicate over a communication network with a second revision engine connected to a second data repository; said second data repository is defined with a second reference area;

said revision engine being configured to receive from said second revision engine an indication with respect to at least a first revision entry in a second revision history log, said second revision history log is managed by said second revision engine; said first revision entry representing a respective revision generated in response to a modification event in said second reference area;
said revision manager being configured, responsive to the indication with respect to the first revision entry to:
determine whether said first revision entry is missing from said revision history log associated with said revision engine, and in case it is,
obtain a second revision entry, the second revision entry corresponding to said respective revision; and
link said second revision entry to a third revision entry within the revision history log, said third revision entry representing a previous revision of said respective revision, thereby extending a progression path representing a progression of revisions generated in response to modification events in the reference area and in the second reference area.

12. The system of claim 1 wherein said revision engine is operatively connected to a data repository and configured to store in said data repository one or more revisions represented by one or more respective revision entries in said revision history log.

13. The method of claim 2 further comprising:
obtaining information in respect of a policy defining rules for creating revision entries in said revision history log, said creating of said new revision entry is performed in accordance with said policy.

14. The method of claim 2 wherein a revision entry in said revision history log includes at least one data element the method further comprising:
identifying within said revision history log, at least one other revision entry with at least one identical data elements; and
determining, based on at least said identical data elements a historical relationship between revisions represented by said revision entry and said at least one other revision entry.

15. The method of claim 2 wherein a revision entry in said revision history log includes at least one data element the method further comprising:
identifying within said revision history log, at least one other revision entry with at least one respective data element which is identical to said at least one data element, wherein one of said revision entry and said at least one other revision entry is located in said second progression path and the other is located in said first progression path; and
determining, based on at least said at least one identical data element, a historical relationship between revisions represented by said revision entry and said at least one other revision entry.

16. The method of claim 2 further comprising:
executing a copy-command in respect of a first revision, said copy-command including data indicative of at least an identifier for identifying a second revision entry corresponding to a second revision, and one or more data elements characterizing said revision;
and responsive to said copy-command:
replacing said data elements in said first revision with corresponding data elements of said second revision, thereby creating a new revision;
creating a new revision entry in respect of said new revision; and linking said new revision entry to said revision history log.

17. The method of claim 2 further comprising:
executing a merge-command executed in respect of a two or more progression paths in said revision history log; said merge-command includes at least information indicative of two or more progression paths within said revision history log and information identifying a merged revision-entry;
and responsive to said merge-command:
converging said two or more progression paths into said merged revision-entry, such that said two or more progression paths continue in a single progression path and maintain said two or more progression paths linked to said merged revision entry in said revision history log.

18. The method of claim 2 further comprising:
communicating over a communication network with at least one node connected to a data repository the data repository is defined with a second reference area;
receiving from said at least one node an indication with respect to at least a first revision entry in a second revision history log, said second revision history log is managed by said at least one node, said first revision entry representing a respective revision generated in response to a modification event in said second reference area;
responsive to the indication with respect to the first revision entry:
determining whether said first revision entry is missing from said revision history log associated with said revision engine, and in case it is,
obtaining a second revision entry, the second revision entry corresponding to said respective revision; and
linking said second revision entry to a third revision entry within the revision history log, said third revision entry representing a previous revision of said respective revision, thereby extending a progression path representing a progression of revisions generated in response to modification events in the reference area and in the second reference area.

19. The system of claim 6 wherein said at least one data element is a content hash code calculated from at least part of the content of a corresponding revision; and wherein said revision engine is further configured to determine that the historical relationship between said revisions is a result of a copy event in case said revision entry and said at least one other revision entry contain identical content hash-codes.

20. The system of claim 11 wherein said revision manager is further configured to identify that along a given progression path comprising said third revision entry, an additional revision entry exists, which corresponds to a modification of a revision represented by said third revision entry, and wherein by said linking of said second revision entry to said third revision entry, said revision manager extends another progression path including said third revision entry and said second revision entry; and maintain both said given progression path and said another progression path associated with said third revision entry, being indicative of a past revision common to both progression paths, thereby enabling to continue and monitor said both progression paths, each being indicative of modifications of a common file or folder.

21. The system of claim 11 wherein said revision engine is configured to request, from said second revision engine, said revision represented by said first revision entry, receive said revision from said second revision engine, and store said revision in a data repository connected to said revision engine.

22. The system of claim 11 wherein in case said revision manager fails to identify said third revision entry in said revision history log, the revision engine is configured to:
create a query requesting missing information in respect of at least said third revision entry;
send said query to at least one other revision engine being member of the same channel as said revision engine; and receive another indication, from at least said second revision engine, indicative of at least one additional revision entry corresponding to said third revision entry.

23. The system of claim 11 wherein a revision entry in said revision history log includes at least one data element and wherein said revision engine is further configured to:
identify within said revision history log, at least one other revision entry with at least one identical data element; and
determine, based on said at least one identical data element a historical relationship between revisions represented by said revision entry and said at least one other revision entry;
wherein one of said at least one other revision entry and said revision entry is a revision entry generated by said revision engine in response to a modification event in said reference area, and the other revision entry, of said at least one other revision entry and said revision entry, is a revision entry generated by said second revision engine in response to a modification event in said second reference area.

24. The method of claim 14 wherein said at least one data element is a content hash code calculated from at least part of the content of a corresponding revision, the method further comprising:
determining that the historical relationship between said revisions is a result of a copy event in case said revision entry and said at least one other revision entry contain identical content hash-codes.

25. The method of claim 18 further comprising:
identifying that along a given progression path which comprises said third revision entry, an additional revision entry exists which corresponds to a modification of a revision represented by said third revision entry, and wherein by said linking of said second revision entry to said third revision entry, a new progression path including said third revision entry and said second revision entry is being extended; and
maintaining both said first progression path and said new progression path associated with said third revision entry, being indicative of a past revision common to both progression paths.

26. The method of claim 18 further comprising:
requesting, from said at least one node, said revision represented by said first revision entry;
receiving said revision from said at least one node; and
storing said revision in a data repository.

27. The method of claim 18 further comprising:
in case said third revision entry is not found in said revision history log:
creating a query requesting missing information in respect of at least said third revision entry;
sending said query to one other revision engine being member of the same channel as said revision engine; and
receiving another indication from at least said at least one node indicative of at least one additional revision entry corresponding to said third revision entry.

28. The method of claim 18 wherein each revision entry in said revision history log includes at least one data element, the method further comprising:
identifying within said revision history log, at least two revision entries with at least one identical data elements; and
determining, based on at least said identical data element a historical relationship between revisions represented by said at least two revision entries; wherein one of said at least two revision entries is a revision entry generated in response to a modification event in said reference area and one of said at least two revision entries is a revision entry generated in response to a modification event in said second reference area.

\* \* \* \* \*